United States Patent
Takaki et al.

(10) Patent No.: US 9,584,857 B2
(45) Date of Patent: Feb. 28, 2017

(54) DIGITAL BROADCAST RECEIVER AND INFORMATION UPDATING METHOD THEREFOR

(71) Applicant: MITSUBISHI ELECTRIC CORPORATION, Tokyo (JP)

(72) Inventors: Kazuya Takaki, Tokyo (JP); Keiichi Shirasuka, Tokyo (JP); Soichiro Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 21 days.

(21) Appl. No.: 14/771,115

(22) PCT Filed: Mar. 24, 2014

(86) PCT No.: PCT/JP2014/057961
§ 371 (c)(1),
(2) Date: Aug. 27, 2015

(87) PCT Pub. No.: WO2014/167986
PCT Pub. Date: Oct. 16, 2014

(65) Prior Publication Data
US 2016/0007076 A1 Jan. 7, 2016

(30) Foreign Application Priority Data
Apr. 10, 2013 (JP) .................. 2013-081929

(51) Int. Cl.
*H04H 60/33* (2008.01)
*H04N 21/438* (2011.01)
(Continued)

(52) U.S. Cl.
CPC ........ *H04N 21/4384* (2013.01); *H04H 20/57* (2013.01); *H04H 60/42* (2013.01);
(Continued)

(58) Field of Classification Search
CPC ......... H04N 21/4524; H04N 21/44227; H04N 21/422; H04N 21/41422; H04N 21/41407; H04N 21/4126
See application file for complete search history.

(56) References Cited

U.S. PATENT DOCUMENTS

| | | | |
|---|---|---|---|
| 6,181,921 B1 * | 1/2001 | Konisi .................. | H03J 1/0016 348/725 |
| 2002/0075294 A1 | 6/2002 | Izumi et al. | |

(Continued)

FOREIGN PATENT DOCUMENTS

| | | |
|---|---|---|
| CN | 1357982 A | 7/2002 |
| CN | 102110136 A | 6/2011 |

(Continued)

*Primary Examiner* — Pankaj Kumar
*Assistant Examiner* — Timothy Newlin
(74) *Attorney, Agent, or Firm* — Birch, Stewart, Kolasch & Birch, LLP

(57) ABSTRACT

A digital broadcast receiver includes: a receiver that receives a broadcast signal of a physical channel in digital broadcasting; a current position detector that detects a current position; a current region determiner that determines, as a current region, a region to which the current position belongs; a receivability determiner that controls the receiver to determine whether the broadcast signal of the physical channel can be received; a storage unit that stores receivable area information indicating a receivable area where the broadcast signal of the physical channel can be received; and an updating unit that, when the receivability determiner determines that the broadcast signal can be received, obtains, out of the stored receivable area information, receivable area information for the current region indicating a receivable area in the current region, and performs an update process to update the receivable area information for the current region based on the current position.

13 Claims, 29 Drawing Sheets

(51) Int. Cl.
  *H04N 21/414* (2011.01)
  *H04N 21/426* (2011.01)
  *H04N 21/45* (2011.01)
  *H04H 20/57* (2008.01)
  *H04H 60/42* (2008.01)
  *H04N 21/435* (2011.01)

(52) U.S. Cl.
  CPC . *H04N 21/41407* (2013.01); *H04N 21/41422* (2013.01); *H04N 21/4263* (2013.01); *H04N 21/435* (2013.01); *H04N 21/438* (2013.01); *H04N 21/4355* (2013.01); *H04N 21/4524* (2013.01)

(56) References Cited

U.S. PATENT DOCUMENTS

| | | | | |
|---|---|---|---|---|
| 2005/0264700 | A1* | 12/2005 | Matsuo | H04N 5/4401 348/570 |
| 2006/0105787 | A1* | 5/2006 | Seo | G08G 1/096716 455/456.5 |
| 2006/0227255 | A1* | 10/2006 | Yang | H04B 7/0814 348/837 |
| 2007/0143779 | A1* | 6/2007 | Kaarela | H04N 7/17318 725/25 |
| 2010/0023978 | A1* | 1/2010 | Garg | H04N 7/173 725/87 |
| 2010/0220818 | A1* | 9/2010 | Yamamoto | H04H 20/42 375/340 |
| 2011/0060760 | A1* | 3/2011 | Ji | H04H 60/70 707/770 |
| 2011/0159800 | A1* | 6/2011 | Ueoka | H04H 20/12 455/3.06 |
| 2011/0219406 | A1* | 9/2011 | Chen | H04N 21/41407 725/62 |
| 2012/0133840 | A1* | 5/2012 | Shirasuka | H04B 7/08 348/732 |
| 2012/0236933 | A1 | 9/2012 | Saitoh et al. | |
| 2013/0072107 | A1* | 3/2013 | Kitazato | H04H 20/57 455/3.01 |
| 2014/0036090 | A1* | 2/2014 | Black | H04N 21/44016 348/159 |

FOREIGN PATENT DOCUMENTS

| | | |
|---|---|---|
| CN | 102656881 A | 9/2012 |
| CN | 103026644 A | 4/2013 |
| JP | 2011-61753 A | 3/2011 |
| WO | WO 2011/030475 A1 | 3/2011 |

* cited by examiner

| REGION ID | PARAMETERS | | |
|---|---|---|---|
| | UPPER LEFT COORDINATES | WIDTH | LENGTH |
| REGION 1 | $(x_1, y_1)$ | W1 | H1 |
| REGION 2 | $(x_2, y_2)$ | W2 | H2 |
| ⋮ | ⋮ | ⋮ | ⋮ |
| REGION n | $(x_n, y_n)$ | Wn | Hn |
| ⋮ | ⋮ | ⋮ | ⋮ |

FIG. 16
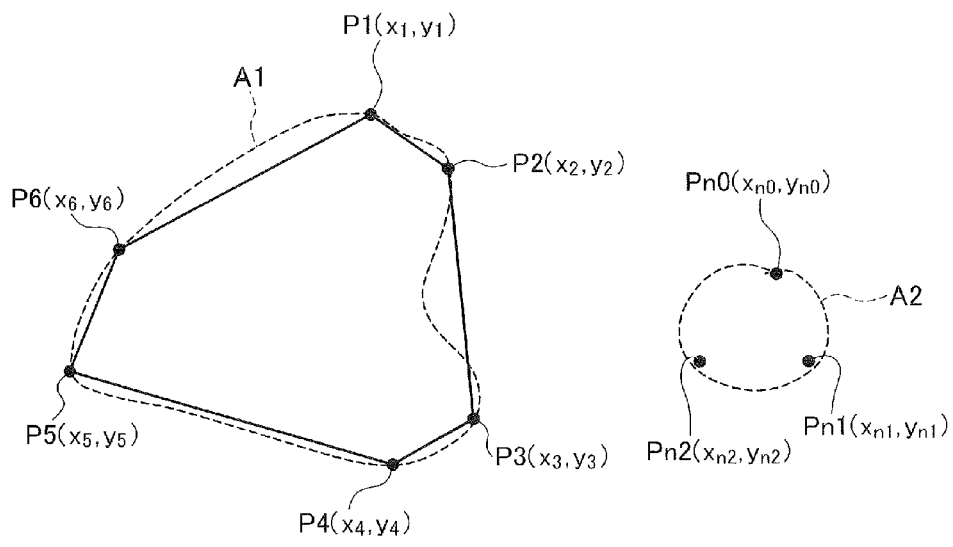
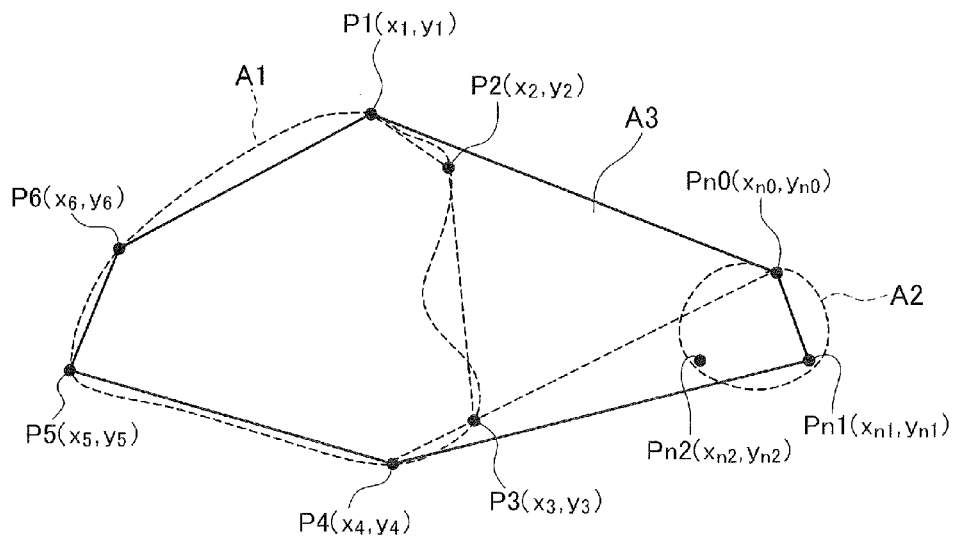

FIG. 22(a)
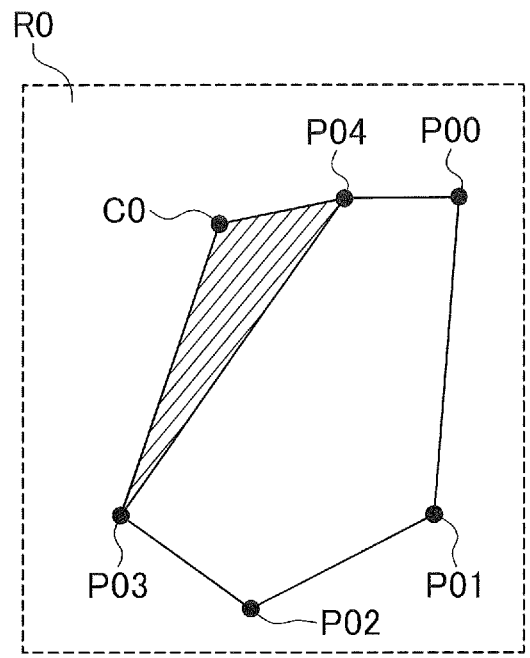
FIG. 22(b)
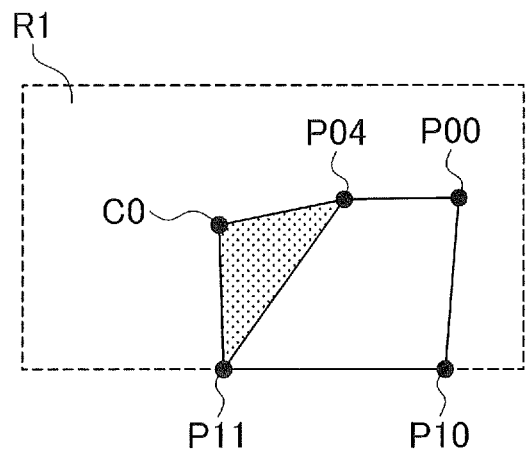
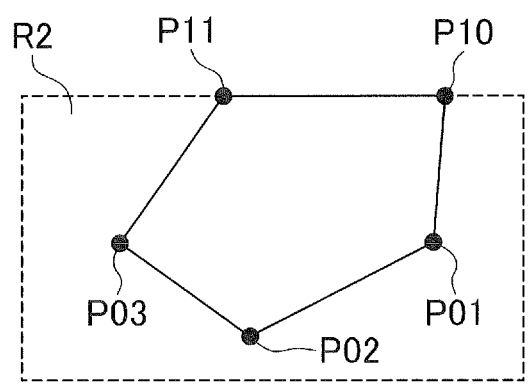

| CURRENT REGION | PERIPHERAL REGION LIST | | | |
|---|---|---|---|---|
| REGION 1 | REGION 2 | REGION 5 | ... | |
| REGION 2 | REGION 1 | REGION 6 | — | |
| REGION 3 | REGION 5 | REGION 6 | REGION 7 | |
| ... | ... | | | |

DIGITAL BROADCAST RECEIVER AND INFORMATION UPDATING METHOD THEREFOR

TECHNICAL FIELD

The present invention relates to a digital broadcast receiver and an information updating method therefor.

BACKGROUND ART

While a digital broadcast receiver receives a broadcast signal of a physical channel, if it moves from a receivable area of the physical channel to an unreceivable area of the physical channel, it becomes unable to receive the broadcast signal of the physical channel, which had been received normally. Thus, a conventional digital broadcast receiver is configured so that a user manually operates the digital broadcast receiver to perform a channel scan to detect physical channels receivable at the current position, and selects, from among the physical channels, a physical channel providing the same program as the currently viewed program.

However, it is troublesome for the user to be required to perform such manual operation, and it is not always possible to start such operation immediately when the broadcast signal becomes unreceivable. Thus, the conventional digital broadcast receiver is inconvenient for the user.

Patent Document 1 discloses a digital broadcast receiver that does not require the above-described manual operation and has a function of automatically selecting a broadcast signal. The digital broadcast receiver includes a channel scan controller that, in a channel scan in which a first tuner/demodulator performs channel selection for program viewing and a second tuner/demodulator sequentially selects physical channels, detects physical channels receivable by the second tuner/demodulator, and a broadcast area map generator that generates a broadcast area map including a receivable physical channel, broadcast service information regarding broadcast content of the physical channel, and a current position. The digital broadcast receiver can generate a broadcast area map indicating a receivable area of each physical channel, and automatically switch to another physical channel receivable at the current position.

PRIOR ART REFERENCES

Patent References

Patent Document 1: Japanese Patent Application Publication No. 2011-61753

SUMMARY OF THE INVENTION

Problems to be Solved by the Invention

In a digital broadcast receiver that updates, on the basis of a result of reception of a broadcast signal of a physical channel at a current position, receivable area information for the physical channel, if a receivable area indicated by the receivable area information is broad, the update process requires a long time.

An object of the present invention is to provide a digital broadcast receiver and an information updating method therefor capable of reducing the time required for the update process of the receivable area information.

Means for Solving the Problems

A digital broadcast receiver according to the present invention includes: a receiver that receives a broadcast signal of a physical channel in digital broadcasting; a current position detector that detects a current position; a current region determiner that determines, as a current region, a region to which the current position detected by the current position detector belongs; a receivability determiner that controls the receiver to determine whether the broadcast signal of the physical channel can be received; an area information storage unit that stores receivable area information indicating a receivable area where the broadcast signal of the physical channel can be received; and an area information updating unit that, when the receivability determiner determines that the broadcast signal of the physical channel can be received, obtains, out of the receivable area information stored in the area information storage unit, receivable area information for the current region indicating a receivable area in the current region determined by the current region determiner, and performs an update process to update the receivable area information for the current region on a basis of the current position detected by the current position detector. The area information storage unit includes: a first storage area that stores the receivable area information; a second storage area that stores receivable area information corresponding to a partial region out of the receivable area information stored in the first storage area; and a region information storage area that stores region information indicating the region corresponding to the receivable area information stored in the second storage area. When receiving a request for receivable area information corresponding to a region included in the region indicated by the region information stored in the region information storage area, the area information storage unit provides a source of the request with the receivable area information that is stored in the second storage area and corresponds to the region for which the request is made. When receiving a request to update receivable area information corresponding to a region included in the region indicated by the region information stored in the region information storage area, the area information storage unit stores, in the second storage area, updated receivable area information corresponding to the region for which the request is made. When receiving a request for receivable area information corresponding to a region outside the region indicated by the region information stored in the region information storage area, the area information storage unit applies the receivable area information stored in the second storage area to the receivable area information stored in the first storage area, and then stores in the second storage area and provides to a source of the request the receivable area information that is stored in the first storage area and corresponds to the region for which the request is made.

An information updating method according to the present invention is an information updating method for a digital broadcast receiver including a receiver that receives a broadcast signal of a physical channel in digital broadcasting, and includes: a current position detection step for detecting a current position; a current region determination step for determining, as a current region, a region to which the current position detected in the current position detection step belongs; a receivability determination step for controlling the receiver to determine whether the broadcast signal of the physical channel can be received; and an area information updating step for, when the receivability determination step determines that the broadcast signal of the physical channel can be received, obtaining, out of receivable area information that is stored in an area information storage unit and indicates a receivable area where the broadcast signal of the physical channel can be received, receivable area information for the current region indicating a receivable area in the current region determined in the current region determination step, and performing an update process to update the receivable area information for the current region on a basis of the current position detected in the current position detection step. The area information storage unit includes: a first storage area that stores the receivable area information; a second storage area that stores receivable area information corresponding to a partial region out of the receivable area information stored in the first storage area; and a region information storage area that stores region information indicating the region corresponding to the receivable area information stored in the second storage area. When receiving a request for receivable area information corresponding to a region included in the region indicated by the region information stored in the region information storage area, the area information storage unit provides a source of the request with the receivable area information that is stored in the second storage area and corresponds to the region for which the request is made. When receiving a request to update receivable area information corresponding to a region included in the region indicated by the region information stored in the region information storage area, the area information storage unit stores, in the second storage area, updated receivable area information corresponding to the region for which the request is made. When receiving a request for receivable area information corresponding to a region outside the region indicated by the region information stored in the region information storage area, the area information storage unit applies the receivable area information stored in the second storage area to the receivable area information stored in the first storage area, and then stores in the second storage area and provides to a source of the request the receivable area information that is stored in the first storage area and corresponds to the region for which the request is made.

Effect of the Invention

According to the present invention, by determining a current region on the basis of a current position and obtaining, out of stored receivable area information, receivable area information for the current region to update it, the time required for the update process of the receivable area information can be reduced.

BRIEF DESCRIPTION OF THE DRAWINGS

FIG. 16 is a diagram for explaining an update process by a digital broadcast receiver of a comparative example.

FIGS. 22(*a*) and 22(*b*) are diagrams for explaining advantages of the second embodiment.

MODES FOR CARRYING OUT THE INVENTION

Embodiments of the invention will now be described with reference to the drawings.

First Embodiment

Figure 1:
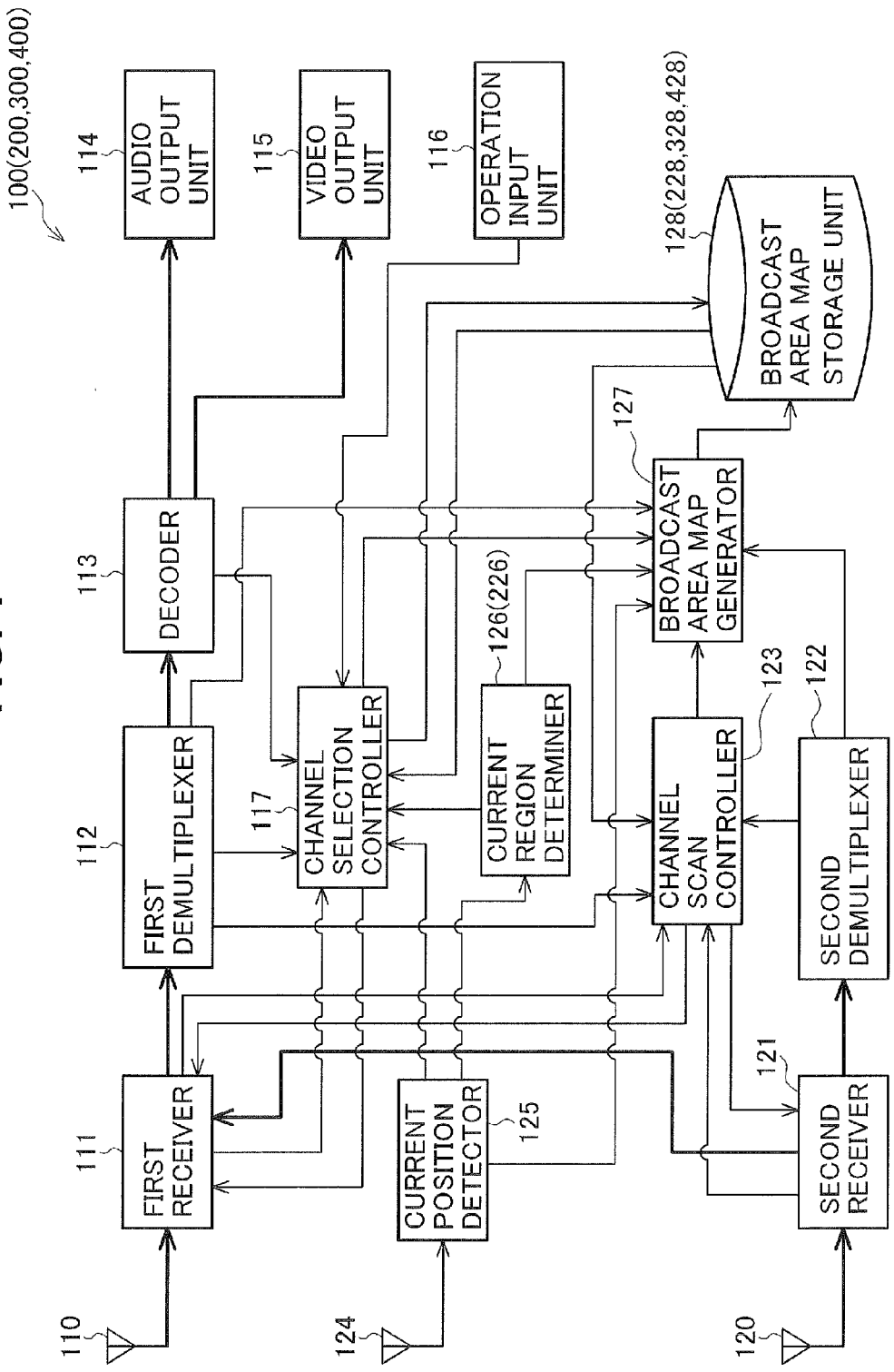
FIG. 1 is a block diagram schematically illustrating a configuration of a digital broadcast receiver according to a first embodiment.

FIG. 1 is a block diagram schematically illustrating a configuration of a digital broadcast receiver 100 in the first embodiment. The digital broadcast receiver 100 is a device that receives a broadcast signal of digital broadcasting, and is mounted on a mobile body such as a vehicle or a mobile terminal.

As illustrated in FIG. 1, the digital broadcast receiver 100 includes a first antenna 110, a first receiver 111, a first demultiplexer 112, a decoder 113, an audio output unit 114, a video output unit 115, an operation input unit 116, and a channel selection controller 117. The digital broadcast receiver 100 further includes a second antenna 120, a second receiver 121, a second demultiplexer 122, a channel scan controller 123, a third antenna 124, a current position detector 125, a current region determiner 126, a broadcast area map generator 127, and a broadcast area map storage unit 128. The reference characters in parentheses in FIG. 1 correspond to configurations in second to fourth embodiments.

The first antenna 110 and first receiver 111 constitute a first system of broadcast receiving means. The second antenna 120 and second receiver 121 constitute a second system of broadcast receiving means. The first system composed of the first antenna 110 and first receiver 111, and the second system composed of the second antenna 120 and second receiver 121 can operate independently of each other.

The first receiver 111 and second receiver 121 receive broadcast signals of multiple physical channels in digital broadcasting, through the first antenna 110 and second antenna 120, respectively. Here, a physical channel is a channel for which a particular frequency band is defined as a unit. Specifically, the first receiver 111 and second receiver 121 perform channel selection (or tuning), demodulation, and error correction on signals supplied from the first antenna 110 and second antenna 120 to generate received signals, such as Transport Streams (TSs), respectively.

The first receiver 111 and second receiver 121 operate in a single tuner mode or a double tuner mode. In the single tuner mode, the second receiver 121 sends a received signal to the first receiver 111; the first receiver 111 diversity combines a received signal generated by itself and the received signal received from the second receiver 121 to generate a single received signal with high stability and supplies this received signal to the first demultiplexer 112. In the double tuner mode, while the first receiver 111 generates a received signal from a signal supplied from the first antenna 110 to supply the received signal to the first demultiplexer 112, the second receiver 121 generates a received signal from a signal supplied from the second antenna 120 to supply the received signal to the second demultiplexer 122.

The first receiver 111 notifies the channel selection controller 117 of C/N, a bit-error rate, phase locked loop (PLL) lock information of a tuner, and orthogonal frequency division multiplexing (OFDM) frame lock information.

The first demultiplexer 112 separates video data (e.g., a video packet) and audio data (e.g., an audio packet) from a received signal received from the first receiver 111. The first demultiplexer 112 then supplies the separated video data and audio data to the decoder 113. Further, the first demultiplexer 112 supplies the channel selection controller 117 and channel scan controller 123 with a notification of disruption of section data (e.g., Program Specific Information (PSI)/Service Information (SI)). The second demultiplexer 122 separates section data (e.g., Program Specific Information (PSI)/Service Information (SI)) from a received signal received from the second receiver 121 and supplies the section data to the channel scan controller 123 and broadcast area map generator 127.

The decoder 113 decodes the video data and audio data received from the first demultiplexer 112 to generate a video signal and an audio signal. The decoder 113 then supplies the generated audio signal to the audio output unit 114 and the generated video signal to the video output unit 115. Further, the decoder 113 notifies the channel selection controller 117 of information on a decoding error rate.

The audio output unit 114 outputs audio based on the audio signal supplied from the decoder 113. For example, the audio output unit 114 can be composed of a speaker or the like.

The video output unit 115 outputs video based on the video signal supplied from the decoder 113. For example, the video output unit 115 can be composed of a display or the like. The video output unit 115 may superimpose graphics, which is not illustrated, generated in the digital broadcast receiver 100 on the video based on the video signal supplied from the decoder 113 to output it.

The operation input unit 116 receives an input of operation from a user. The operation input unit 116 then supplies operation information indicating the input operation to the channel selection controller 117.

The channel selection controller 117 totally controls processes in the digital broadcast receiver 100. In particular, the channel selection controller 117 controls a process to select a physical channel. Specifically, the channel selection controller 117 controls the first receiver 111 to select a physical channel to be viewed in accordance with operation information from the operation input unit 116, for example. Further, the channel selection controller 117 determines, on the basis of notifications from the first receiver 111, first demultiplexer 112, and decoder 113, whether a reception state of a currently selected broadcast signal is deteriorated (or whether the broadcast signal can be received), for example. If the channel selection controller 117 determines that the reception state of the broadcast signal is good (or the broadcast signal can be received), it requests the broadcast area map generator 127 to perform an update process of a broadcast area map, described later. If the channel selection controller 117 determines that the reception state of the broadcast signal is deteriorated (or the broadcast signal cannot be received), it accesses the broadcast area map storage unit 128 to search for a broadcast station having a high possibility of broadcasting the same program as that of the currently selected broadcast signal at the current position. For example, it searches for a relay station or an affiliated station of the currently selected broadcast station, or a broadcast station that is broadcasting a broadcast signal having the same broadcast service name on a different physical channel. If there is a broadcast station (or a broadcast service) that can be received at the current position and has a high possibility of broadcasting the same program, the channel selection controller 117 notifies the first receiver 111 so as to perform automatic channel selection switching.

The channel scan controller (or receivability determiner) 123 controls the first receiver 111 or second receiver 121 to determine, for each physical channel, whether the broadcast signal of the physical channel can be received. Specifically, the channel scan controller 123 controls the first receiver 111 and first demultiplexer 112, or the second receiver 121 and second demultiplexer 122 to perform a channel scan. In the channel scan, the channel scan controller 123 causes the first receiver 111 or second receiver 121 to sequentially select the multiple physical channels, detecting a receivable physical channel, i.e., a physical channel whose broadcast signal can be received.

The channel scan performed by the second receiver 121 and second demultiplexer 122 under control of the channel scan controller 123 is carried out in parallel with the channel selection for program viewing by the first receiver 111 without being noticed by the viewer (or carried out behind program viewing), and thus is also referred to as a 'background channel scan.'

Hereinafter, only when it needs to be distinguished from a normal channel scan performed using the first receiver 111 and first demultiplexer 112, it will be referred to as the 'background channel scan,' and otherwise, both will be collectively referred to as a 'channel scan.'

The third antenna 124 is an antenna for detecting a current position and composed of, for example, a GPS antenna.

The current position detector 125 receives a signal from the third antenna 124 and detects a current position (specifically, a current position of the digital broadcast receiver 100). For example, when a GPS antenna is used, it calculates, as the current position, latitude/longitude information from the GPS signal. However, other current position acquisition means may be used.

The current position detector 125 may further include another information acquisition means and thereby use, as the current position, a value obtained by correcting the latitude/longitude information. For example, when the current position detector 125 has an antenna for information communication, it may correct the latitude/longitude information calculated from the GPS signal, on the basis of information calculated from the position of a currently communicating communication base station, to obtain a value as the current position. If the current position detector 125 has means for detecting a direction or an amount of actual movement, it may correct the latitude/longitude information calculated from the most recently obtained GPS signal, on the basis of the direction and amount of movement from the point at which the GPS signal was obtained, to obtain a value as the current position. Other information may be used for the correction.

The current position detector 125 notifies the current region determiner 126, channel selection controller 117, and broadcast area map generator 127 of current position information indicating the detected current position.

The current region determiner 126 determines, as a current region, a region to which the current position detected by the current position detector 125 belongs. Specifically, the current region determiner 126 determines, on the basis of the current position information sent from the current position detector 125, which of multiple predetermined regions the current position belongs to, and notifies the channel selection controller 117 and broadcast area map generator 127 of region identification information (or region identification information item) uniquely identifying the determined region as current region identification information.

Regarding the above multiple predetermined regions, it is possible to divide a coordinate system consisting of latitude and longitude vertically by 10 Km and horizontally by 10 Km into multiple rectangles and define each of the multiple rectangles as a region, for example. In this case, it is possible to use, as the region identification information, information capable of uniquely identifying the rectangle, such as coordinate values of the upper left point or a number uniquely assigned to each rectangle sequentially from the upper left rectangle. The shapes of the respective regions may be different from each other; in this case, parameters indicating the position and shape of a region may be used as the region identification information. For example, when rectangles having different sizes are defined as the regions, a set of the upper left coordinate values, vertical width, and horizontal width of a rectangle may be used as the region identification information. For example, when circles having different sizes are defined as the regions, a set of the coordinate values of the center and the radius of a circle may be used as the region identification information. These shapes are not mandatory, and a set of parameters indicating another shape may be used as the region identification information.

Figures 2, 3:
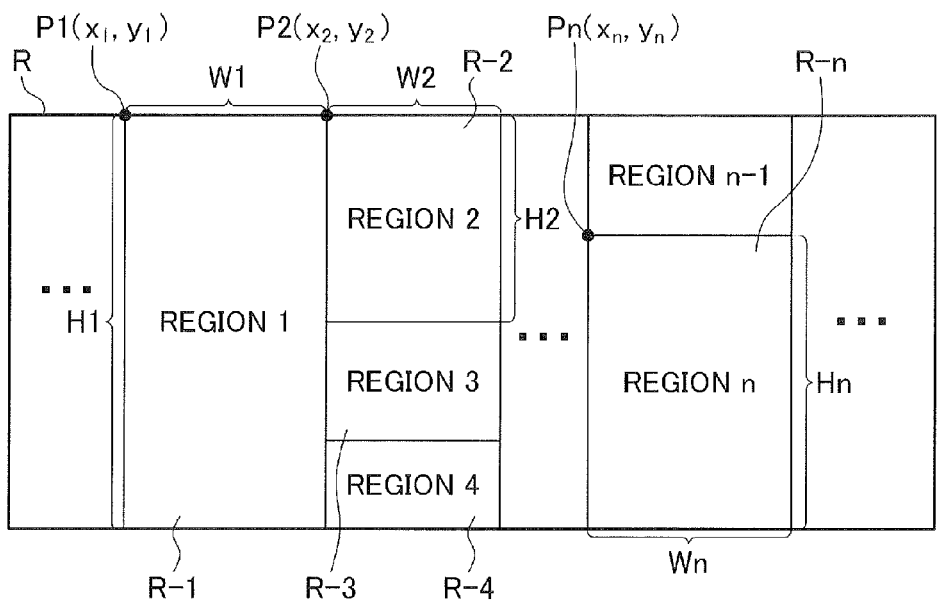
FIG. 2 is a diagram illustrating an example of regions determined by a current region determiner.
FIG. 3 is a diagram illustrating information regarding the respective regions in FIG. 2.

FIG. 2 is a diagram illustrating an example of the regions that can be determined by the current region determiner 126. In FIG. 2, regions R-1, R-2, . . . , R-n, . . . are defined in the entire region R, and are rectangles having different sizes. To the regions R-1, R-2, . . . , R-n, . . . , 'region 1', 'region 2', . . . , 'region n', . . . are assigned as region IDs (region identifying information), respectively.

FIG. 3 is a diagram illustrating information regarding the respective regions in FIG. 2. FIG. 3 describes, for each region in FIG. 2, the region ID of the region and parameters (specifically, the upper left coordinates, horizontal width, and vertical width) indicating the position and shape of the region in association with each other. As the region identification information of each region in FIG. 2, the region ID or the parameters indicating the rectangle (the set of the upper left coordinates, horizontal width, and vertical width) may be used.

The broadcast area map storage unit (or area information storage unit) 128 stores receivable area information indicating a receivable area where a broadcast signal of a physical channel can be received. Specifically, the broadcast area map storage unit 128 stores, for each physical channel, receivable area information indicating a receivable area where the broadcast signal of the physical channel can be received. The broadcast area map storage unit 128 stores the receivable area information separately for each region that can be determined by the current region determiner 126. That is, the broadcast area map storage unit 128 stores, for each physical channel and for each region, receivable area information indicating a receivable area of the physical channel in the region.

Figure 4:
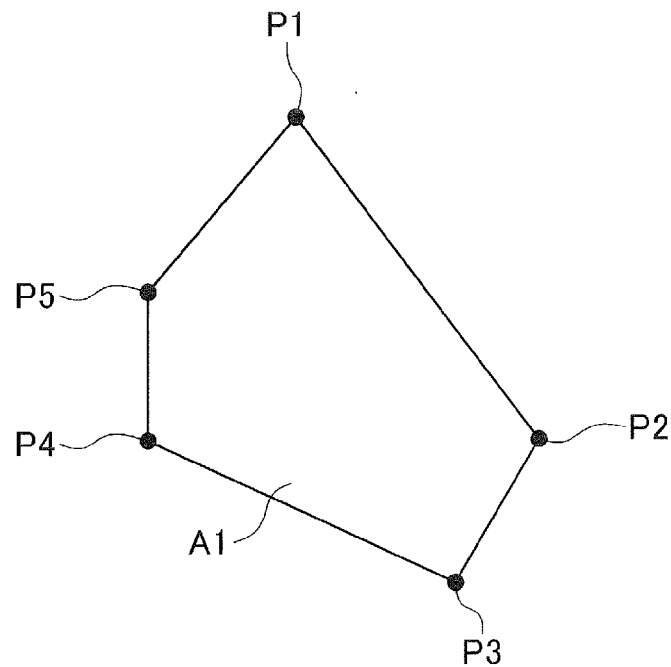
FIG. 4 is a diagram illustrating an example of a receivable area indicated by receivable area information.

For example, the broadcast area map storage unit 128 stores, as the receivable area information, information that includes three or more position information items each indicating a position where the broadcast signal of a physical channel can be received and indicates, as a receivable area, an area bounded by the three or more positions indicated by the position information items (specifically, a polygonal area having vertexes at the three or more positions). In this case, for example, as illustrated in FIG. 4, the receivable area information includes position information items of points P1, P2, P3, P4, and P5, and indicates, as a receivable area, a polygonal area A1 having vertexes at the points P1, P2, P3, P4, and P5.

The broadcast area map storage unit 128 further stores unconnection information including at least one unconnected position information item indicating a position where the broadcast signal of a physical channel can be received outside the receivable area indicated by the receivable area information. Specifically, the broadcast area map storage unit 128 stores, for each physical channel, unconnection information including at least one unconnected position information item for the physical channel. The broadcast area map storage unit 128 stores the unconnection information separately for each region that can be determined by the current region determiner 126. That is, the broadcast area map storage unit 128 stores, for each physical channel and for each region, unconnection information including at least one unconnected position information item for the physical channel in the region. Hereinafter, the position indicated by an unconnected position information item will be referred to as the 'unconnected position.'

The broadcast area map storage unit 128 further stores, for each physical channel and for each region, relay station information indicating a physical channel of a relay station of a broadcast station using the physical channel and affiliated station information indicating a physical channel of an affiliated station of a broadcast station using the physical channel.

When it is determined that the broadcast signal of a physical channel can be received, the broadcast area map generator (or area information updating unit) 127 performs update or generation of information regarding the physical channel stored in the broadcast area map storage unit 128. For example, when the channel scan controller 123 detects a physical channel whose broadcast signal can be received, the broadcast area map generator 127 performs update or generation of information corresponding to the detected physical channel. When the channel selection controller 117 determines that the broadcast signal of a physical channel currently selected as the physical channel to be viewed can be received, the broadcast area map generator 127 performs update or generation of information corresponding to the currently selected physical channel. For example, when the channel scan controller 123 determines that the broadcast signal of a physical channel can be received or when the channel selection controller 117 determines that the broadcast signal of a physical channel to be viewed can be received, the current region determiner 126 performs an update current region determination process to determine an update current region as the current region in accordance with the current position detected by the current position detector 125, and the broadcast area map generator 127 performs an update process to update the receivable area information for the physical channel corresponding to the update current region determined by the current region determiner 126, on the basis of the current position detected by the current position detector 125. More specifically, the broadcast area map generator 127 performs update or generation of the receivable area information or unconnection information for the physical channel determined to be receivable, on the basis of the current position detected by the current position detector 125 and the current region determined by the current region determiner 126, as described in the following items (a1) to (a5).

(a1) The broadcast area map generator 127 obtains, out of the receivable area information stored in the broadcast area map storage unit 128, receivable area information (referred to below as the 'receivable area information for the current region') indicating a receivable area in the current region of the physical channel determined to be receivable, and performs an update process to update the receivable area information for the current region on the basis of the current position. For example, the broadcast area map generator 127 obtains, out of the receivable area information stored for each physical channel and for each region, as the receivable area information for the current region, the receivable area information corresponding to the physical channel determined to be receivable and the current region, and performs the update process. Hereinafter, the receivable area indicated by the receivable area information for the current region will be referred to as the 'receivable area of the current region.'

(a2) When performing the update process of the receivable area information for the current region, for example, the broadcast area map generator 127 determines whether the current position is outside the receivable area of the current region, and if the current position is outside the receivable area of the current region, performs an extension process to extend the receivable area of the current region to the current position. In this case, the broadcast area map generator 127 may determine, on the basis of the positional relationship between the receivable area of the current region and the current position, whether the current position can be connected to the receivable area of the current region; if it is determined that the current position can be connected, the broadcast area map generator 127 may perform the extension process; if it is determined that the current position cannot be connected, the broadcast area map generator 127 may add a position information item indicating the current position to the unconnection information as an unconnected position information item. For example, when the current position is a predetermined distance or more away from the receivable area of the current region, the broadcast area map generator 127 determines that the current position cannot be connected.

(a3) The broadcast area map generator 127 obtains, out of the unconnection information stored in the broadcast area map storage unit 128, unconnection information (referred to below as the 'unconnection information for the current region') including at least one unconnected position information item for the current region for the physical channel determined to be receivable, and performs the update process of the receivable area information for the current region on the basis of the unconnection information for the current region. For example, the broadcast area map generator 127 obtains, out of the unconnection information stored for each physical channel and for each region, as the unconnection information for the current region, the unconnection information corresponding to the current region and the physical channel determined to be receivable, and performs the update process.

(a4) When there is no receivable area information for the current region, the broadcast area map generator 127 adds a position information item indicating the current position to the unconnection information (specifically, the unconnection information for the current region) as an unconnected position information item.

(a5) When there is no receivable area information for the current region, the broadcast area map generator 127 obtains the unconnection information for the current region, and if receivable area information can be newly generated on the basis of the unconnection information for the current region and the current position, generates receivable area information for the current region to store it in the broadcast area map storage unit 128.

In one specific aspect, the receivable area information for the current region is information that includes three or more position information items each indicating a position where the broadcast signal of the physical channel can be received and indicates, as the receivable area, an area bounded by the three or more positions indicated by the position information items, and the broadcast area map generator 127 performs the update process, as described in the following items (b1) to (b4).

Figure 5:
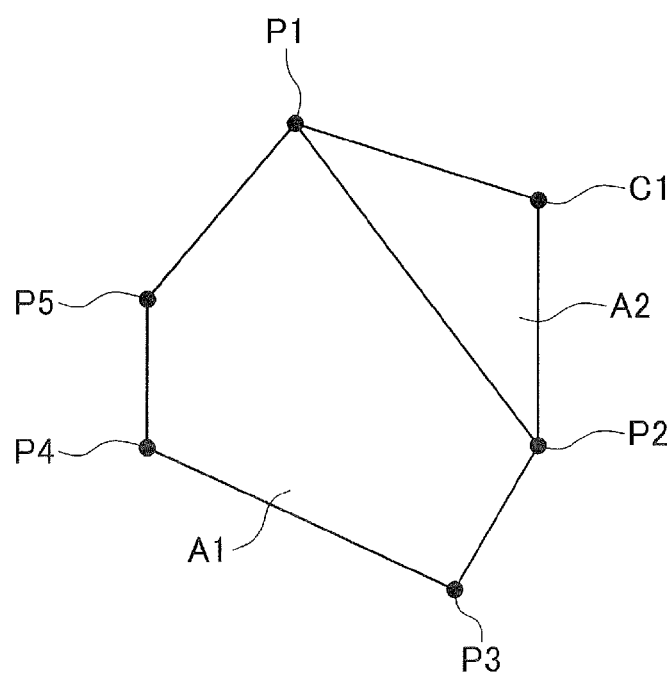
FIG. 5 is a diagram illustrating an example of a process to update receivable area information of FIG. 4.

(b1) If the current position is outside the receivable area of the current region, the broadcast area map generator 127 selects, as connecting positions, two positions from among the three or more positions indicated by the position information items included in the receivable area information for the current region, adds a position information item indicating the current position to the receivable area information for the current region, and performs an extension process to extend the receivable area of the current region to include an area bounded by the two connecting positions and current position. For example, the broadcast area map generator 127 extends the receivable area of the current region to the lines connecting the selected connecting positions and the current position. For example, in a case where existing receivable area information (before update) indicates a receivable area A1 in FIG. 4, if the current position C1 is outside the existing receivable area A1 as illustrated in FIG. 5, the broadcast area map generator 127 selects, as connecting positions, two positions P1 and P2 from among positions P1 to P5 and combines a triangular region A2 having vertexes at the connecting positions P1 and P2 and the current position C1 with the existing receivable area A1, thereby generating, as an extended receivable area, a polygonal area (A1+A2) having vertexes at the positions P1 to P5 and current position C1.

(b2) If the current position is outside the receivable area of the current region, the broadcast area map generator 127 may perform a process to find, as connecting positions, two positions from among the three or more positions indicated by the position information items included in the receivable area information for the current region; if the two connecting positions are successfully found, the broadcast area map generator 127 may perform the above extension process; if the two connecting positions are not found, the broadcast area map generator 127 may add a position information item indicating the current position to the unconnection information (specifically, the unconnection information for the current region) as an unconnected position information item.

Figure 6:
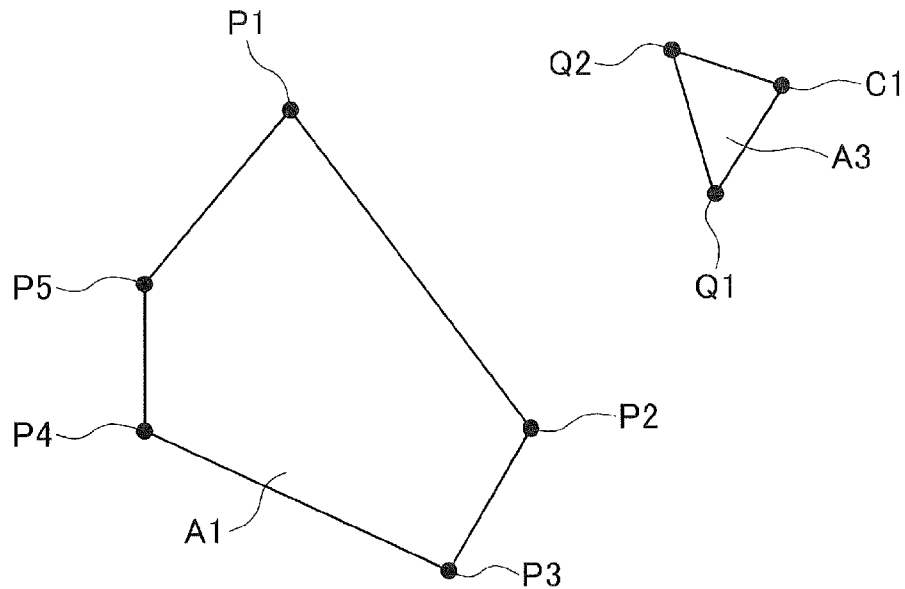
FIG. 6 is a diagram illustrating another example of the process to update the receivable area information of FIG. 4.

(b3) If the current position is outside the receivable area of the current region, the broadcast area map generator 127 may find, as connecting positions, multiple (e.g., two) positions from among the at least one position indicated by the at least one unconnected position information item included in the unconnection information for the current region, add position information items indicating the found multiple connecting positions and a position information item indicating the current position to the receivable area information for the current region, and extend the receivable area of the current region to include an area bounded by the multiple connecting positions and the current position. For example, the broadcast area map generator 127 may add, as a receivable area, an area (e.g., polygonal area) formed by connecting the multiple connecting positions and current position to the receivable area of the current region. For example, in a case where the existing receivable area information indicates the receivable area A1 in FIG. 4, when there are unconnected positions Q1 and Q2 in the current region and the current position C1 is outside the existing receivable area A1 as illustrated in FIG. 6, the broadcast area map generator 127 finds the two unconnected positions Q1 and Q2 as connecting positions, and adds, as a receivable area, a triangular area A3 having vertexes at the connecting positions Q1 and Q2 and current position C1.

Figure 7:
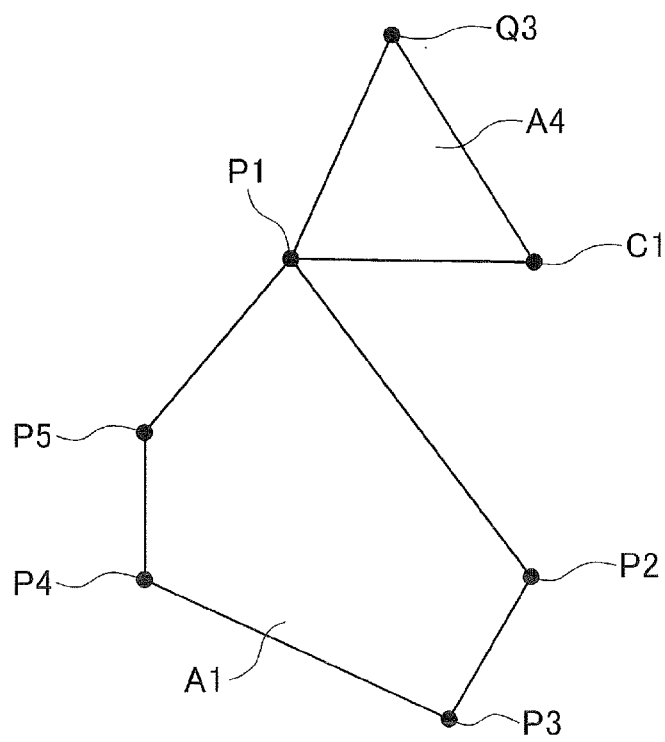
FIG. 7 is a diagram illustrating another example of the process to update the receivable area information of FIG. 4.

(b4) If the current position is outside the receivable area of the current region, the broadcast area map generator 127 finds, as connecting positions, two positions from among the positions indicated by the position information items included in the receivable area information for the current region and the at least one position indicated by the at least one unconnected position information item included in the unconnection information for the current region, adds, to the receivable area information for the current region, a position information item indicating the current position and at least one position information item indicating at least one connecting position found from the unconnection information out of the found two connecting positions, and extends the receivable area of the current region to include an area bounded by the two connecting positions and current position. For example, the broadcast area map generator 127 may extend the receivable area of the current region to lines connecting the found connecting positions and the current position, or may extend the receivable area of the current region by combining an area (e.g., polygonal area) formed by connecting the two connecting positions and current position with the existing receivable area. For example, in a case where the existing receivable area information indicates the receivable area A1 in FIG. 4, when there is an unconnected position Q3 in the current region and the current position C1 is outside the existing receivable area A1 as illustrated in FIG. 7, the broadcast area map generator 127 finds the position P1 and unconnected position Q3 as connecting positions, and adds, as a receivable area, a triangular area A4 having vertexes at the connecting positions P1 and Q3 and current position C1.

In the above items (b1) to (b4), the broadcast area map generator 127 may find, as connecting positions, from the positions indicated by the position information items in the receivable area information and at least one position indicated by the at least one unconnected position information item in the unconnection information, two positions closest to the current position, or positions at which straight lines extending from the current position are tangent to the receivable area. The broadcast area map generator 127 also may find, as the connecting positions, positions farthest from the current position out of points in the receivable area within a predetermined threshold distance from the current position. The connecting positions may be determined by other methods.

Further, the broadcast area map generator 127 performs update or generation of the relay station information and affiliated station information stored in the broadcast area map storage unit 128, on the basis of information received by the first receiver 111 or second receiver 121. For example, the broadcast area map generator 127 obtains a physical channel of a relay station and a physical channel of an affiliated station from section data received in a channel scan, and stores information indicating these physical channels in the broadcast area map storage unit 128.

The receivable area information stored in the broadcast area map storage unit 128 as described above is used to, when the reception state of the broadcast signal of a currently viewed (or currently selected) physical channel is deteriorated with movement of the digital broadcast receiver 100, automatically switch the physical channel to be viewed (or selected) to another physical channel (e.g., a physical channel on which the same broadcasting service as the broadcasting service being viewed).

Specifically, when the reception state of the broadcast signal of a physical channel currently selected as a physical channel to be viewed is deteriorated (e.g., when it becomes unreceivable), the channel selection controller 117 obtains, out of the receivable area information stored in the broadcast area map storage unit 128, the receivable area information for each physical channel for the current region, determines, on the basis of the obtained receivable area information, an alternative physical channel that can be received at the current position, and selects the determined alternative physical channel as the physical channel to be viewed. For example, when the channel selection controller 117 determines that the broadcast signal of a physical channel to be viewed cannot be received, the current region determiner 126 performs a reference current region determination process to determine a reference current region as the current region on the basis of the current position detected by the current position detector 125, and the channel selection controller 117 determines an alternative physical channel receivable at the current position on the basis of the receivable area information for the physical channel corresponding to the reference current region determined by the current region determiner 126 and the current position detected by the current position detector 125, and performs an alternative channel selection process to control the first receiver 111 to select the determined alternative physical channel. For example, the channel selection controller 117 determines, on the basis of the receivable area information for each physical channel for the current region, from among at least one physical channel of a relay station or an affiliated station of a currently viewed broadcast station using the physical channel having the deteriorated reception state, a physical channel receivable at the current position as the alternative physical channel. For example, the channel selection controller 117 refers to at least one of the relay station information and affiliated station information stored in the broadcast area map storage unit 128 to determine at least one physical channel of at least one of a relay station and an affiliated station of a currently viewed broadcast station using the physical channel having the deteriorated reception state, determines, from among the determined at least one physical channel, on the basis of the receivable area information for each physical channel for the current region, a physical channel whose receivable area includes the current position, determines whether the broadcast signal of the determined physical channel can be received by the first receiver 111 or second receiver 121, and if it is determined that the physical channel can be received, determines the physical channel as the alternative physical channel. Hereinafter, the above process to determine and select the alternative physical channel will be referred to as the 'automatic channel selection process' or 'channel selection process.'

Regarding the broadcast area map storage unit 128 and broadcast area map generator 127, a more specific example will now be described.

The broadcast area map storage unit 128 stores, for each physical channel and for each region, in a storage area inside or outside the digital broadcast receiver 100, a broadcast area map information item including the receivable area information, relay station information, and affiliated station information, and an unconnection list information item as the unconnection information. Hereinafter, the broadcast area map information item will be referred to as the 'broadcast area map,' the broadcast area maps for all the physical channels for a region will be referred to as the 'regional broadcast area map,' and the regional broadcast area maps for all the regions will be referred to as the 'entire broadcast area map.' Further, the unconnection list information items for all the physical channels for a region will be referred to as the 'regional unconnection list information item,' and the regional unconnection list information items for all the regions will be referred to as the 'entire unconnection list information item.' Further, the unconnection list information item, regional unconnection list information item, and entire unconnection list information item will be referred to as the 'unconnection list,' 'regional unconnection list,' and 'entire unconnection list,' respectively.

The broadcast area map generator 127 generates, for each region, the broadcast area maps and unconnection lists for all the physical channels, on the basis of section data received from the second demultiplexer 122, current position information sent from the current position detector 125, and current region identification information sent from the current region determiner 126, and stores them in the broadcast area map storage unit 128.

When the channel scan controller 123 detects a physical channel whose broadcast signal can be received or when the channel selection controller 117 determines that the broadcast signal of a physical channel currently selected as the physical channel to be viewed can be received, the broadcast area map generator 127 performs update of the broadcast area map or unconnection list for the physical channel for the current region.

In storing the broadcast area maps and unconnection lists, in order to hold the information after the digital broadcast receiver 100 is powered off, the broadcast area map storage unit 128 may store them in, for example, nonvolatile storage area, may include communication means (not illustrated) and communicate with a storage unit provided outside the digital broadcast receiver 100 as necessary to store them in the external storage unit, or may store storage means other than these.

When the broadcast area map generator 127 or channel selection controller 117 refers to or updates a broadcast area map stored in a storage area of the broadcast area map storage unit 128, instead of directly referring to the storage area, it may perform the processing through a work area for the broadcast area maps provided separately in a temporary storage area of the broadcast area map storage unit 128. In this configuration, when the broadcast area map storage unit 128 is requested to update the broadcast area maps, it changes the work area at this timing, and at the same time updates the storage area, for example. When a storage area requiring a long time for the update process is used, since the update process may disturb processing of the entire digital broadcast receiver, the broadcast area map storage unit 128 may control the timing for performing the update process so as to update the storage area when performing a process with a relatively small processing load.

Hereinafter, in a case where the broadcast area map storage unit 128 has the work area as described above, when it is necessary to distinguish between information stored in the storage area and information stored in the work area, information stored in the storage area will be referred to as, e.g., a storage entire broadcast area map, a storage regional broadcast area map, and a storage broadcast area map, and information stored in the work area will be referred to as, e.g., a work entire broadcast area map, a work regional broadcast area map, and a work broadcast area map. When it is unnecessary to distinguish between the storage area and the work area, the terms 'entire broadcast area map,' 'regional broadcast area map,' and 'broadcast area map' will be used simply, and descriptions thereof apply to both the storage area and work area.

Figure 8:
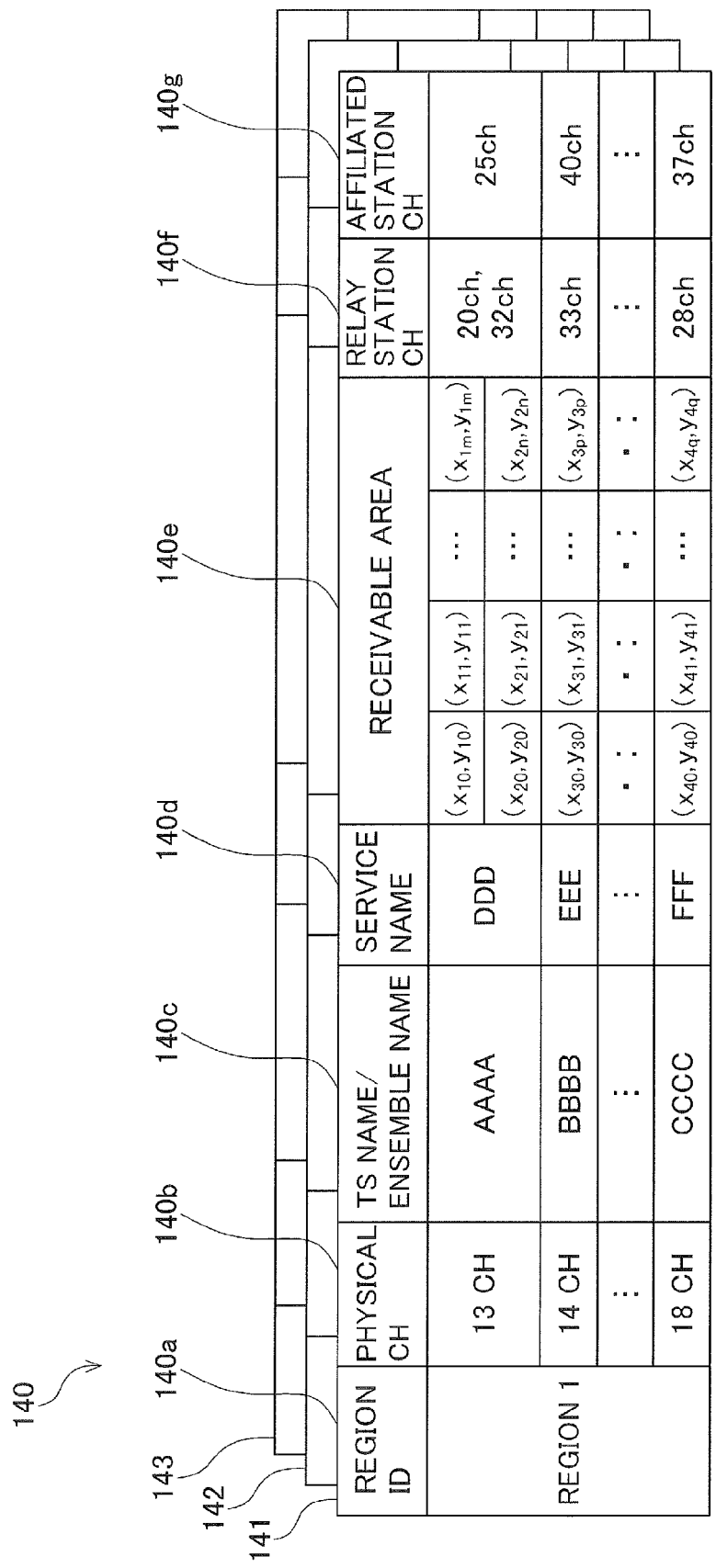
FIG. 8 is a schematic diagram illustrating an example of an entire broadcast area map.

FIG. 8 is a schematic diagram illustrating an example of the entire broadcast area map. The entire broadcast area map 140 illustrated in FIG. 8 includes regional broadcast area maps 141, 142, and 143 for different regions; each of the regional broadcast area maps is information in table form including a region field 140a, a physical channel field 140b, a TS name/ensemble name field 140c, a service name field 140d, a receivable area field 14e, a relay station channel field 140f, and an affiliated station channel field 140g.

The region field 140a stores region identification information indicating for which region the regional broadcast area map 141, 142, or 143 included in the entire broadcast area map 140 is generated. The region identification information corresponds to the region identification information determined by the current region determiner 126. In this embodiment, rectangles are defined by dividing the longitude and latitude at regular intervals; a region ID is uniquely assigned to each of the rectangles in such a manner that 'region 1,' 'region 2,' 'region 3,' . . . are assigned to the rectangles in order from the upper left; the region field 140a stores one of the region IDs.

The physical channel field 140b stores physical channel identification information for identifying a physical channel. In this embodiment, the physical channel identification information is the number of the physical channel. The TS name/ensemble name field 140c stores broadcaster identification information for identifying a broadcaster. For each of digital broadcast standards: Integrated Services Digital Broadcasting-Terrestrial (ISDB-T), Digital Video Broadcasting-Terrestrial (DVB-T), Digital Video Broadcasting-Handheld (DVB-H), Digital Terrestrial Multimedia Broadcast (DTMB), and Advanced Television Systems Committee (ATSC), a TS name is used as the broadcaster identification information. For each of digital broadcast standards: Digital Audio Broadcast (DAB), Digital Audio Broadcast plus (DAB+), and Digital Multimedia Broadcasting (DMB), an ensemble name is used as the broadcaster identification information. The service name field 140d stores service identification information for identifying a service provided by the broadcaster. In this embodiment, a service name (an organization channel name) is used as the service identification information. The information stored in the TS name/ensemble name field 140c and service name field 140d allows a broadcast station that is unit for channel selection to be identified.

The receivable area field 140e stores receivable area information indicating a receivable area where the broadcast signal broadcasted by a broadcaster specified in the TS name/ensemble name field 140c in a service specified in the service name field 140d on a physical channel specified in the physical channel field 140b can be received. Here, the receivable area information includes position information items indicating three or more positions where the broadcast signal broadcasted by a broadcaster specified in the TS name/ensemble name field 140c in a service specified in the service name field 140d on a physical channel specified in the physical channel field 140b could be received. Here, the receivable area information stores the position information items in order along a path around the boundary of the receivable area. The position information items included in the receivable area information will be detailed later with reference to FIG. 9. Hereinafter, the position indicated by a position information item included in the receivable area information will also be referred to as the 'vertex.'

The relay station channel field 140f stores relay station information indicating a physical channel of a relay station by which a broadcaster specified in the TS name/ensemble name field 140c transmits a broadcast signal of a service specified in the service name field 140d on a physical channel specified in the physical channel field 140b. The affiliated station channel field 140g stores affiliated station information indicating a physical channel of an affiliated station of a broadcaster that is specified in the TS name/ensemble name field 140c and uses a physical channel specified in the physical channel field 140b.

FIG. 8 illustrates an example in which, in each physical channel, a single TS or a single ensemble is transmitted with a single service name, but this is not mandatory. Multiple TSs or ensembles may be transmitted with one or more service names. A single TS or ensemble may be transmitted with multiple service names. The broadcaster identification information is not limited to the TS name or ensemble name. The service identification information is not limited to the service name. For example, for China Mobile Multimedia Broadcasting (CMMB) standard, a multiplex frame (MF) may be used instead of the TS or ensemble, and a multiplex sub-frame (MSF) may be used instead of the service.

FIG. 8 illustrates a case where a table of a broadcast area map is stored separately for each region, but the information may be stored in another manner. Since it is only necessary that the broadcast area map corresponding to any region can be obtained, for example, they may be combined and stored in the form of a single table, or may be stored in another form.

As illustrated in FIG. 8, the entire broadcast area map 140 stores relay station information and affiliated station information. This allows the channel selection controller 117 to easily determine, when the reception state of the broadcast signal of a currently viewed physical channel is deteriorated, an alternative physical channel having a high possibility of broadcasting the same program as the currently viewed program, thereby achieving quick automatic physical channel switching. Since it is highly likely that physical channels having the same broadcasting service name broadcast the same program, it is desirable that the entire broadcast area map 140 also should store broadcasting service names. In addition, the entire broadcast area map 140 may store other information obtainable from a broadcast wave, together with the above information.

Figure 9:
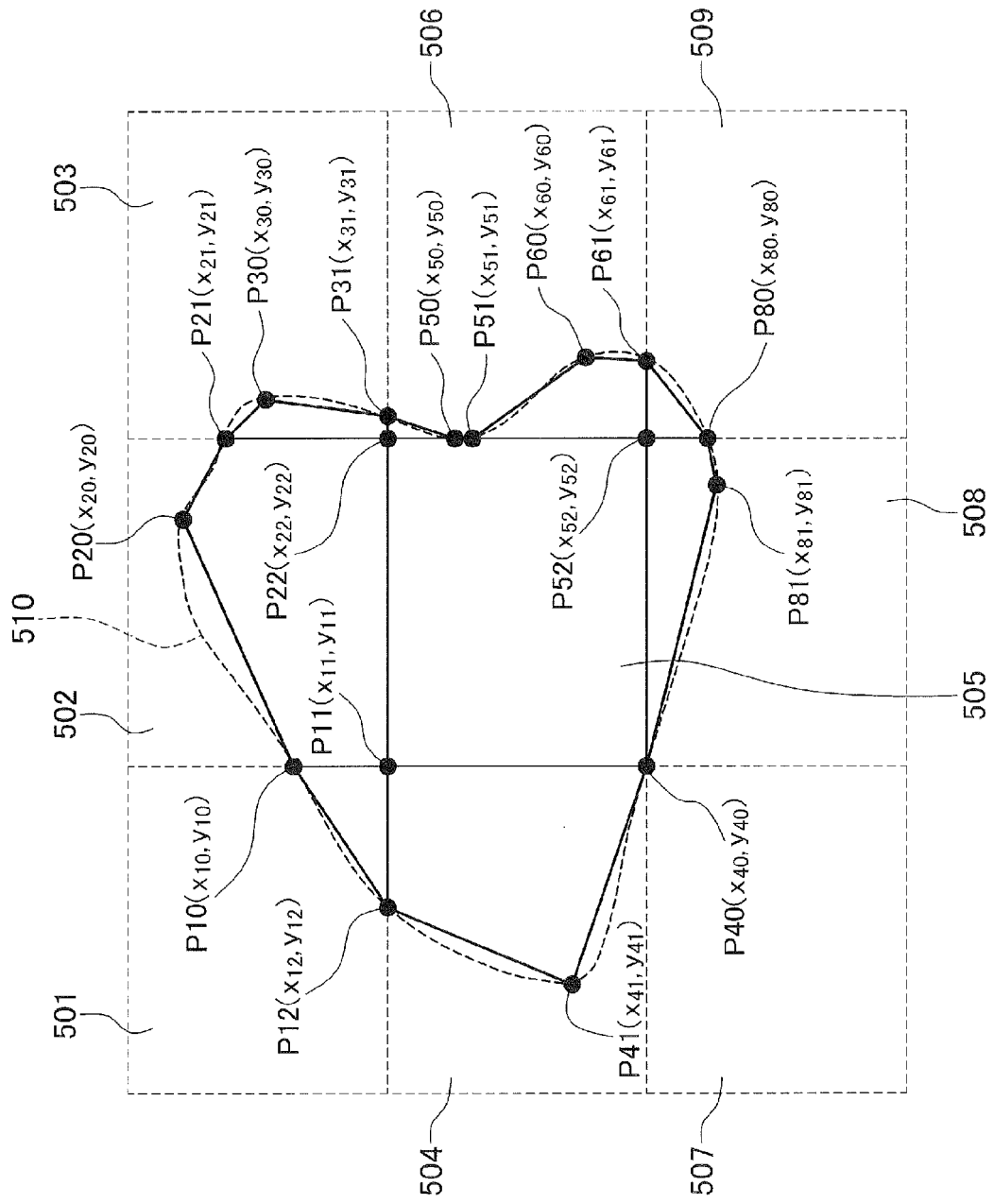
FIG. 9 is a schematic diagram for explaining position information items included in a receivable area field in the entire broadcast area map.

FIG. 9 is a schematic diagram for explaining the position information items included in the receivable area field 140e of the entire broadcast area map 140. In this embodiment, receivable areas have polygonal shapes. In the example in FIG. 9, description will be made with respect to a broadcast station having a receivable area 510 across nine regions 501, 502, 503, 504, 505, 506, 507, 508, and 509.

For example, the region 501 has, as a receivable area, an area inside a triangle having vertexes P10 ($x_{10}$, $y_{10}$), P11 ($x_{11}$, $y_{11}$), and P12 ($x_{12}$, $y_{12}$). In this case, when the region 501 has a region ID of 'region 1,' the receivable area field 140e in the regional broadcast area map 141 for 'region 1' stores position information items (coordinates) of the respective vertexes in order along a path (e.g., clockwise path) around line segments (sides) connecting these vertexes (in the order of P10, P11, and P12). Here, the position information items are indicated by using an orthogonal coordinate system having longitude as an X-coordinate axis and latitude as a Y-coordinate axis.

For example, the region 502 has, as a receivable area, an area inside a polygon having vertexes P20 ($x_{20}$, $y_{20}$), P21 ($x_{21}$, $y_{21}$), P22 ($x_{22}$, $y_{22}$), P11 ($x_{11}$, $y_{11}$), and P10 ($x_{10}$, $y_{10}$). In this case, when the region 502 has a region ID of 'region 2,' the receivable area field 140e in the regional broadcast area map 142 for 'region 2' stores position information items (coordinates) of the respective vertexes in the order of, e.g., P20, P21, P22, P11, and P10, in the same way as the receivable area field 140e in the regional broadcast area map 141.

The region 505 is completely included in the actual receivable area 510, and the receivable area indicated by receivable area information for the region 505 is a quadrangle having vertexes P22, P52, P40, and P11 that is the same as the boundary of the region. The region 506 has a receivable area including two areas: a triangle having vertexes P31, P50, and P22; and a quadrangle having vertexes P60, P61, P52, and P51.

The order in which position information items are stored in the receivable area field 140e is not limited to the clockwise order, and may be the counterclockwise order. It is possible to determine, as the head vertex stored in the receivable area field 140e, a vertex having the smallest x-coordinate value, a vertex having the smallest y-coordinate value, or a vertex closest to the positive direction of the Y-coordinate axis, for example. The head vertex may be determined by other methods.

Figure 10:
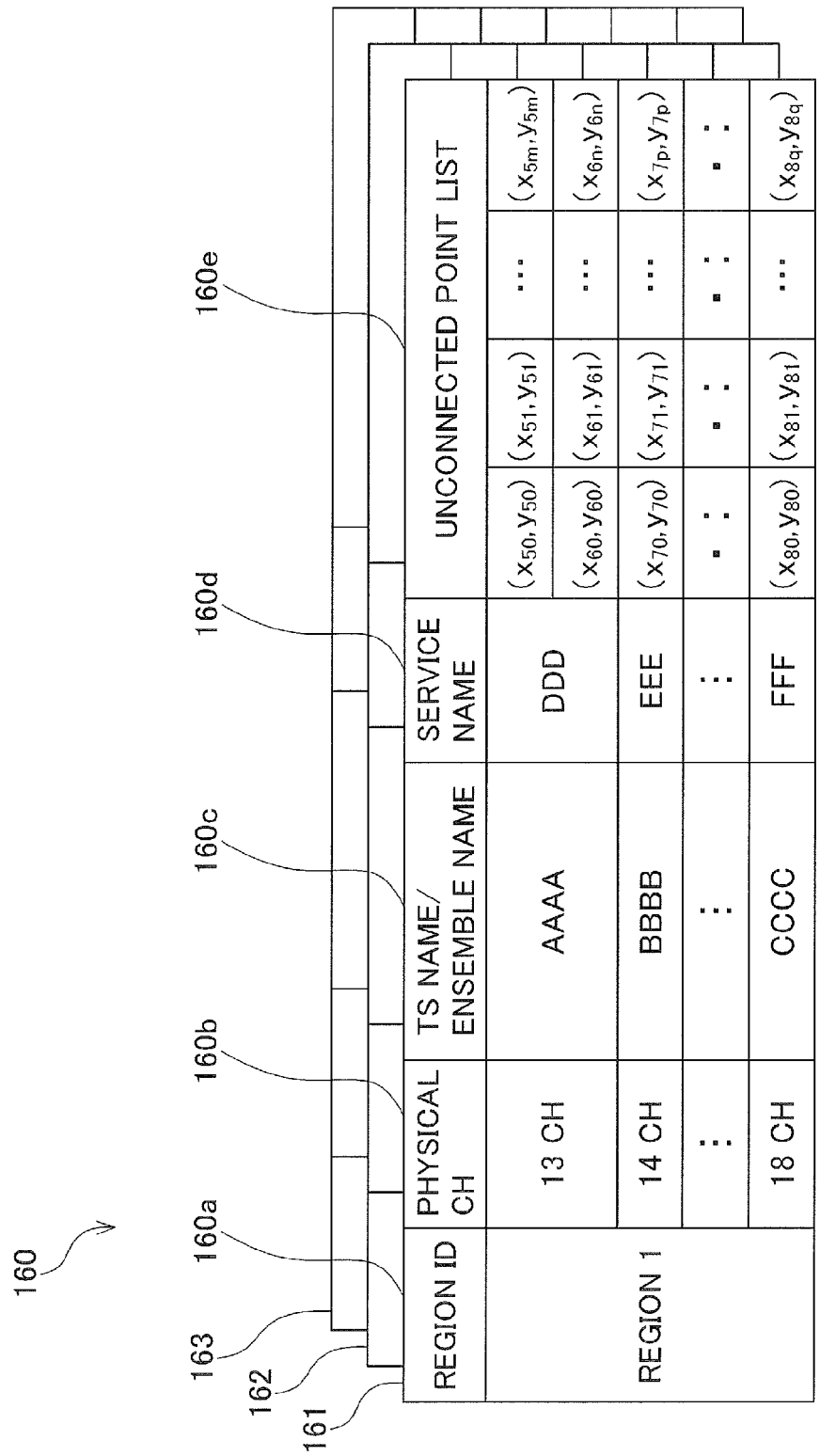
FIG. 10 is a schematic diagram illustrating an example of an entire unconnection list information.

FIG. 10 is a schematic diagram illustrating an example of the entire unconnection list. The entire unconnection list 160 illustrated in FIG. 10 includes regional unconnection lists 161, 162, and 163 for different regions; each of the regional unconnection lists is information in table form including a region field 160a, a physical channel field 160b, a TS name/ensemble name field 160c, a service name field 160d, and an unconnected point list field 160e.

The region field 160a stores region identification information indicating for which region the regional unconnection list 161, 162, or 163 included in the entire unconnection list 160 is generated. The region identification information corresponds to the region identification information determined by the current region determiner 126. In this embodiment, the region field 140a stores the value of a region ID, as in the entire broadcast area map 140.

The physical channel field 160b stores physical channel identification information for identifying a physical channel. The TS name/ensemble name field 160c stores broadcaster identification information for identifying a broadcaster. The service name field 160d stores service identification information for identifying a service provided by the broadcaster.

The unconnected point list field 160e stores unconnected position information items that are position information items indicating positions unconnected to (not included in) the receivable areas of the entire broadcast area map 140, out of positions where a broadcast signal broadcasted by a broadcaster specified in the TS name/ensemble name field 160c in a service specified in the service name field 160d on a physical channel specified in the physical channel field 160b could be received. Since a receivable area is represented by connecting three or more positions, position information items of two positions connected to each other and a position information item of one unconnected position are stored in the unconnected point list field 160e. The position indicated by an unconnected position information item stored in the unconnected point list field 160e will also be referred to as the 'unconnected point.'

Figure 11:
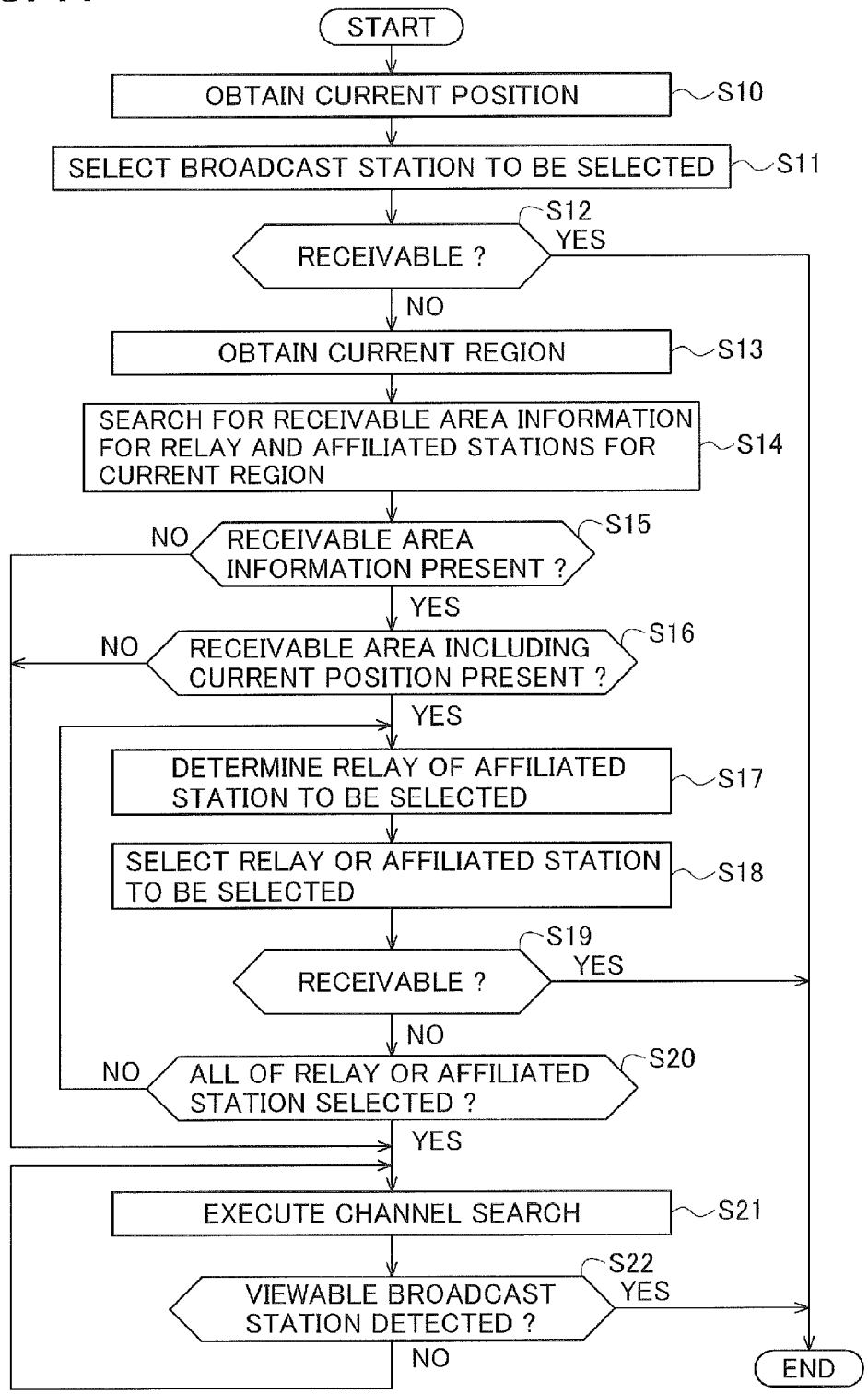
FIG. 11 is a flowchart illustrating the flow of a process of channel selection operation in the digital broadcast receiver according to the first embodiment.

FIG. 11 is a flowchart illustrating the flow of a process of channel selection operation in the digital broadcast receiver 100 according to the first embodiment. The flow of FIG. 11 is started when the operation input unit 116 receives a channel selection instruction from a user.

First, the channel selection controller 117 obtains current position information indicating the current position from the current position detector 125 (S10). Here, since the current position indicated by the current position information obtained in step S10 includes an observation error due to antenna performance in reality, a value after the decimal point of the current position information may be rounded down, for example. The channel selection controller 117 then selects, in accordance with the instruction from the user, a broadcast station to be selected (S11).

Next, the channel selection controller 117 checks whether the broadcast station to be selected can be received (S12). If it can be received (Yes in step S12), the channel selection controller 117 ends the flow. In this case, the user can view a program of the designated broadcast station. On the other hand, if it cannot be received (No in step S12), the channel selection controller 117 advances the process to step S13.

In step S13, the channel selection controller 117 obtains, from the current region determiner 126, current region identification information indicating a region to which the current position belongs. At this time, the current region determiner 126 determines the current region on the basis of the current position information obtained in step S10. Since the current position coordinates include an observation error due to antenna performance in reality, instead of determining a current region strictly including the current position, even when the current position is outside a certain region, if the current position is within a predetermined range outside the region (e.g., several meters from the region), the current region determiner 126 may determine the region as the current region in step S13. As a result, multiple regions may be determined as the current region. In this case, it is possible to determine, as the current region, a representative of the multiple regions, such as a region whose boundary is farthest from the current position of the boundaries of regions including the current position. One of the multiple regions may be determined as the current region by other methods. It is also possible to perform subsequent processing, determining that each of the found multiple regions is the current region.

Next, the channel selection controller 117 obtains, from the entire broadcast area map 140 stored in the broadcast area map storage unit 128, the regional broadcast area map corresponding to the current region identification information obtained in step S13, searches for and obtains broadcast area maps for relay stations and affiliated stations of the broadcast station to be selected, in the regional broadcast area map (S14), and checks whether there is a broadcast area map for a relay or affiliated station (S15). If there is no such broadcast area map (No in step S15), the channel selection controller 117 advances the process to step S21; if there is such a broadcast area map (Yes in step S15), it advances the process to step S16. When multiple regions are determined as the current region in step S13, the channel selection controller 117 performs, for each of the multiple regions, the search for broadcast area maps in step S14, and then advances to step S15.

In step S16, the channel selection controller 117 determines, for each of the one or more broadcast area maps obtained in step S14, whether a receivable area indicated by receivable area information in the broadcast area map includes the current position indicated by the current position information obtained in step S10. If the channel selection controller 117 determines that there is no broadcast area map that has a receivable area including the current position (No in step S16), it advances the process to step S21. If the channel selection controller 117 determines that there is a broadcast area map that has a receivable area including the current position (Yes in step S16), it advances the process to step S17. Since the current position coordinates include an observation error due to antenna performance in reality, instead of determining whether the current position is strictly within the receivable area, even when the current position is outside the receivable area, if the current position is within a predetermined range outside the receivable area (e.g., several meters from the receivable area), the channel selection controller 117 may determine that the current position is within the receivable area in step S16.

In step S17, the channel selection controller 117 determines a broadcast station to be selected, from among one or more relay or affiliated stations of the currently viewed broadcast station corresponding to the one or more broadcast area maps determined to have a receivable area including the current position in step S16. For example, the channel selection controller 117 determines, as the broadcast station to be selected, a relay or affiliated station most likely to be receivable, from among relay or affiliated stations that are related to the currently viewed broadcast station and have receivable areas including the current position. For example, the channel selection controller 117 may determine, as the relay or affiliated station most likely to be receivable, a station having a receivable area whose centroid position or boundary is closest to the current position. The channel selection controller 117 also may hold a history of relay or affiliated stations that were selected (successfully selected) by switching by the automatic channel selection in, for example, the broadcast area map storage unit 128, and determine, as the relay or affiliated station most likely to be receivable, a relay or affiliated station that has been selected by the switching many times, or a broadcast station most recently selected by the switching. Further, the channel selection controller 117 may determine, as the relay or affiliated station most likely to be receivable, a relay or affiliated station having the highest signal reception intensity in channel scans previously performed, or a relay or affiliated station having the highest transmission power that described in information included in a broadcast signal. Other methods may be used for the determination.

Next, the channel selection controller 117 selects the broadcast station determined in step S17 (S18). The channel selection controller 117 then checks whether the broadcast signal of the broadcast station to be selected can be received (S19). If it can be received (Yes in step S19), the channel selection controller 117 ends the flow. In this case, the user can view the program of the selected broadcast station. On the other hand, if it cannot be received (No in step S19), the channel selection controller 117 advances the process to step S20.

In step S20, the channel selection controller 117 determines whether all of the relay or affiliated stations having receivable areas including the current position have already been selected. If all of the relay or affiliated stations have been selected (Yes in step S20), the channel selection controller 117 advances the process to step S21. On the other hand, if at least one of the relay or affiliated stations has not been selected (No in step S20), i.e., if the relay or affiliated stations having receivable areas including the current position include a broadcast station that has not yet been selected, the channel selection controller 117 advances the process to step S17. In step S17, the broadcast station to be selected is determined from among the one or more broadcast stations that have not yet been selected.

In step S21, the channel selection controller 117 performs a channel search to detect a relay station or affiliated station viewable at the current position. At this time, the channel selection controller 117 sequentially selects the multiple physical channels to detect the relay or affiliated station. However, for example, one or more physical channels already selected in step S18 may be excluded from physical channels selected in the channel search.

If a viewable relay or affiliated station is detected in the channel search (Yes in step S22), the channel selection controller 117 ends the flow. In this case, the detected relay or affiliated station is selected and viewed by the user. On the other hand, if no viewable relay or affiliated station is detected (No in step S22), the channel selection controller 117 performs the channel search again from the beginning (S21). That is, the channel selection controller 117 repeats the search until a relay or affiliated station viewable at the current position is detected.

However, if no viewable relay or affiliated station is detected in the channel search, the channel selection controller 117 may inform the user that no broadcast station is found, and then select an alternative broadcast station (e.g., another service being broadcasted on the smallest physical channel) or select the most recently viewed broadcast station again. Alternatively, the channel selection controller 117 may wait for another operation from the user without performing selection of an alternative broadcast station after terminating the channel search.

The order of the channel search in step S21 is, for example, an ascending or descending order of the physical channel numbers. The channel selection controller 117 may change the order so as to preferentially select all of the one or more relay or affiliated stations obtained in step S14. In this case, regarding the order of selection of the relay or affiliated stations, the channel selection controller 117 may give priorities to them to perform the search. The priorities may be given by using the positional relationship between the current position and receivable areas of the relay or affiliated stations; for example, the priorities may be given according to ascending order of distance between the current position and the vertex closest to the current position of the vertexes of the receivable area, ascending order of distance between the current position and the side closest to the current position of the sides of the receivable area, ascending order of distance between the current position and the centroid position of the receivable area. The priorities may be given by using other methods.

Figure 12:
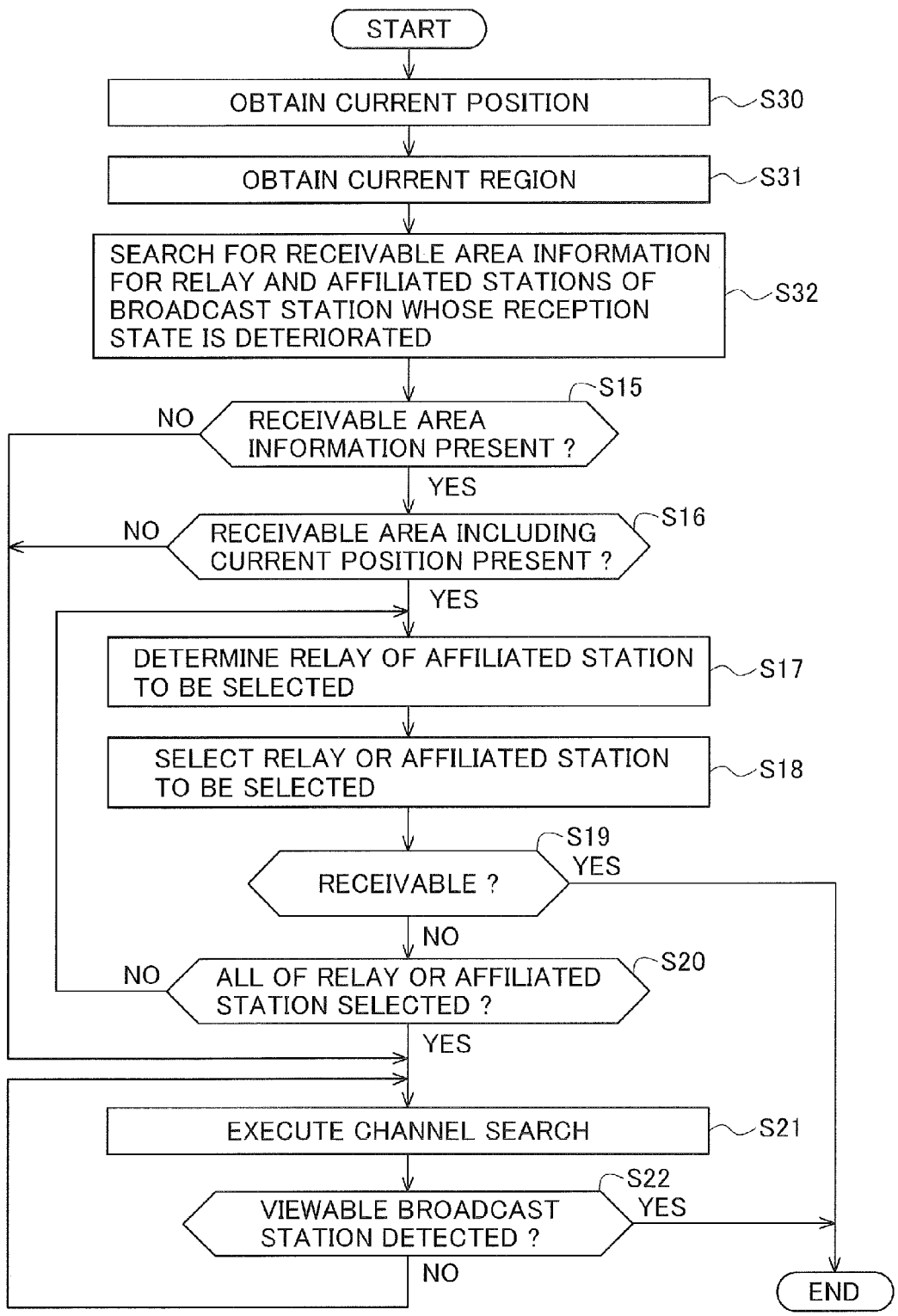
FIG. 12 is a flowchart illustrating the flow of a process of automatic channel selection when a reception state is deteriorated, in the digital broadcast receiver according to the first embodiment.

FIG. 12 is a flowchart illustrating the flow of a process of automatic channel selection when the reception state is deteriorated, in the digital broadcast receiver 100 according to the first embodiment. The flow of FIG. 12 is started when the channel selection controller 117 determines, on the basis of notifications from the first receiver 111, first demultiplexer 112, and decoder 113, that the reception state of the broadcast signal of a broadcast station to be viewed is deteriorated.

First, the channel selection controller 117 obtains, from the current position detector 125, current position information indicating the current position (S30).

Next, the channel selection controller 117 obtains, from the current region determiner 126, current region identification information indicating a region to which the current position belongs (S31). This process is the same as that in step S13 in FIG. 11.

Next, the channel selection controller 117 obtains, from the entire broadcast area map 140 stored in the broadcast area map storage unit 128, the regional broadcast area map corresponding to the current region identification information obtained in step S31, and searches for and obtains broadcast area maps for relay and affiliated stations of the broadcast station whose reception state has been determined to be deteriorated, in the regional broadcast area map (S32). The channel selection controller 117 then advances the process to step S15.

The processes in steps S15 to S22 in FIG. 12 are the same as those in steps S15 to S22 in FIG. 11. Thereby, the channel selection controller 117 can continue to receive broadcast signals by detecting, as an alternative to the broadcast station whose reception state is deteriorated, a relay or affiliated station receivable at the current position and switching the selected channel to the detected relay or affiliated station.

The above process of automatic channel selection is performed when the reception state of the broadcast signal of the currently viewed broadcast station has been deteriorated. However, this is only one example. For example, when the channel selection controller 117 detects, on the basis of the relationship between the receivable area corresponding to the broadcast station to be viewed and the current position, that the current position is near the boundary of the receivable area and detects, on the basis of a history of the current position, that the movement direction is toward the outside of the receivable area, it may perform the above automatic channel selection process, presuming that the currently viewed broadcast station will soon become unreceivable.

Figure 13:
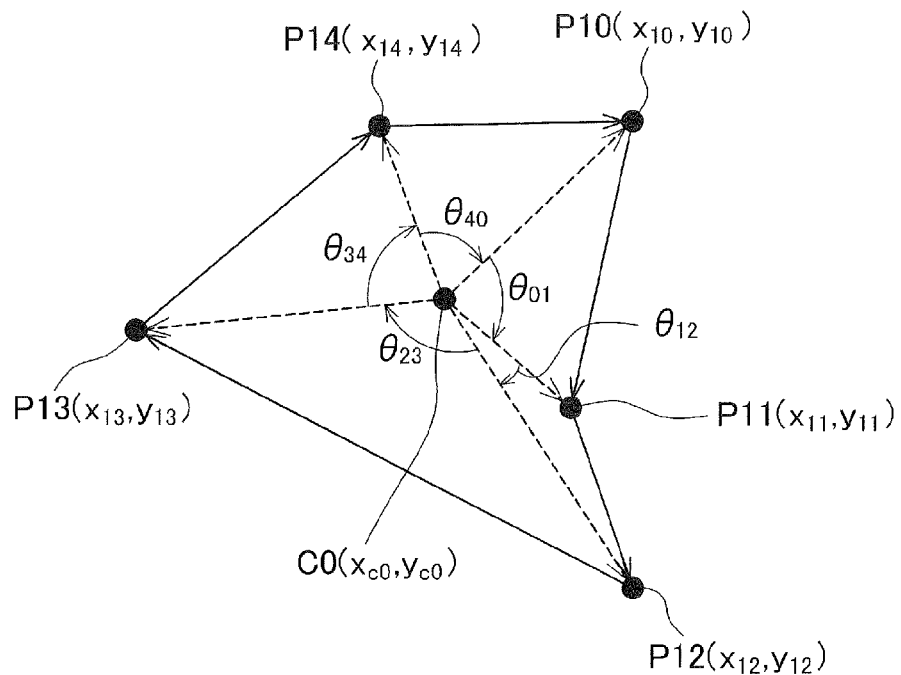
FIG. 13 is a diagram illustrating an example of the positional relationship between a current position and a receivable area.

FIG. 13 is a diagram illustrating an example of the positional relationship between a current position and a receivable area, in the digital broadcast receiver 100 according to the first embodiment. A process for determining whether the current position is included in the receivable area in step S16 in FIGS. 11 and 12 will be described below with reference to FIG. 13. The process for determining the positional relationship between a current position and a receivable area is not limited to the example described with reference to FIG. 13, and the positional relationship may be determined by using other methods.

First, the channel selection controller 117 defines five vectors from the current position C0 of the digital broadcast receiver 100 to respective vertexes P10 to P14 of the receivable area, and obtains angles θ01, θ12, θ23, θ34, and θ40 formed by the two vectors corresponding to each adjacent two vertexes. For example, when obtaining the angle θ01 formed by the vector from the current position C0 to the vertex P10 and the vector from the current position C0 to the vertex P11, the channel selection controller 117 determines an inner product and an outer product of the two vectors and determines from these values one of a tangent, a sine, and a cosine, thereby obtaining the formed angle θ01. Similarly, the channel selection controller 117 calculates the angles θ12, θ23, θ34, and θ40. The channel selection controller 117 then sums up the obtained angles θ01, θ12, θ23, θ34, and θ40, and determines whether the current position C0 is inside the receivable area, depending on whether the resultant value is equal to 360 degrees.

More specifically, in obtaining, for example, the formed angle θ01, the channel selection controller 117 calculates, for the vector from the current position C0 to the vertex P10 and the vector from the current position C0 to the vertex P11, an inner product IV11 and an outer product CV11 according to the following equations (1) and (2), respectively:

$$IV11 = (x_{10} - x_{c0}) \times (x_{11} - x_{c0}) + (y_{10} - y_{c0}) \times (y_{11} - y_{c0}) \quad (1)$$

$$CV11 = (x_{10} - x_{c0}) \times (y_{11} - y_{c0}) - (x_{11} - x_{c0}) \times (y_{10} - y_{c0}) \quad (2).$$

The channel selection controller 117 further determines a tangent TAN 11 according to the following equation (3):

$$TAN\ 11 = IV11/CV11 \quad (3).$$

The channel selection controller 117 calculates a length L010 from the current position C0 to the vertex P10 and a length L011 from the current position C0 to the vertex P11. The channel selection controller 117 then calculates a sine SIN 11 according to the following equation (4) and a cosine COS 11 according to the following equation (5):

$$SIN\ 11 = IV11/(L010 \times L011) \quad (4)$$

$$COS\ 11 = CV11/(L010 \times L011) \quad (5).$$

By applying an inverse function to one of the determined tangent TAN 11, sine SIN 11, and cosine COS 11, the channel selection controller 117 can obtain two angles within a range of 0 degrees to 360 degrees. The channel selection controller 117 can determine, depending on the signs of the inner product IV11 and outer product CV11, which range the angle is within as follows: if the inner and outer products are both positive, the angle is within a range of 0 degrees to 90 degrees; if the outer product is negative, the angle is within a range of 90 degrees to 180 degrees; if the inner and outer products are both negative, the angle is within a range of 180 degrees to 270 degrees; if the inner product is negative, the angle is within a range of 270 degrees to 360 degrees. Thereby, the channel selection controller 117 can select one of the obtained two angles. Alternatively, by applying an inverse function to at least two of the determined tangent TAN 11, sine SIN 11, and cosine COS 11, the channel selection controller 117 may obtain, for each of the at least two, two angles within a range of 0 degrees to 360 degrees, and select one common angle. The angle selected in this way is determined as the formed angle θ01. The other formed angles can be calculated similarly. In this way, the angles θ01, θ12, θ23, θ34, and θ40 formed by the current position C0 and the vertexes P10, P11, P12, P13, and P14 are determined. All of the determined angles are summed up. Depending on whether the resultant value is equal to 360 degrees, it can be determined whether the current position is within the receivable area.

Figure 14:
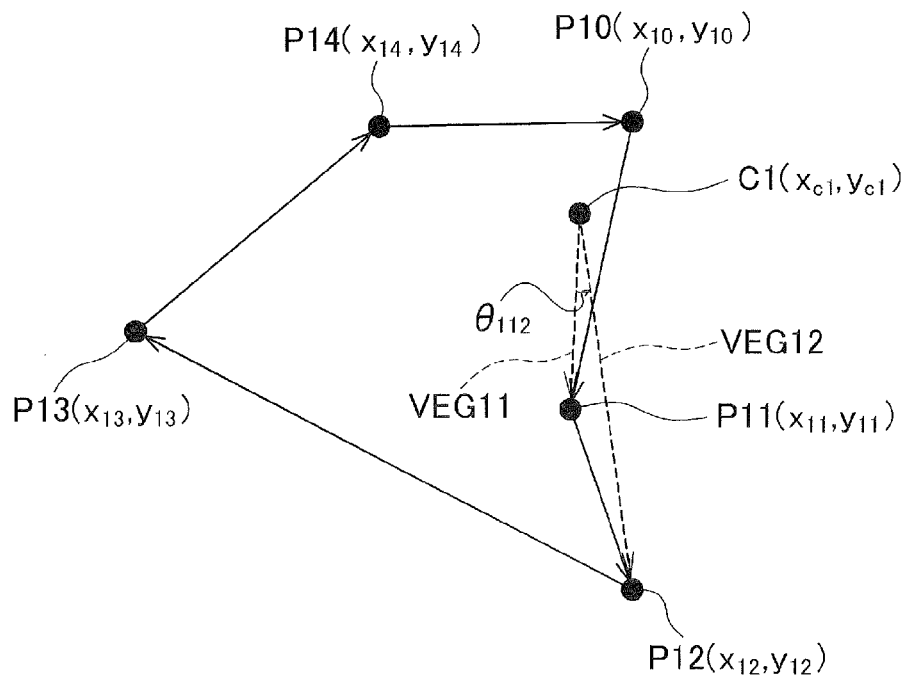
FIG. 14 is a diagram illustrating another example of the positional relationship between a current position and a receivable area.

If the line segments between the current position C0 and the vertexes P10, P11, P12, P13, and P14 are arranged in one direction (clockwise) in accordance with the order of the position information items of the respective vertexes included in the receivable area information as illustrated in FIG. 13, the respective formed angles may be summed up. On the other hand, if the line segment between the current position C1 and the vertex P12 is arranged on the counterclockwise side of the line segment between the current position C1 and the vertex P11 as illustrated in FIG. 14, the channel selection controller 117 determines an angle θ112 formed by them as a negative value, and sums up the angle θ112 and the other formed angles. Then, the channel selection controller 117 determines whether resultant value is equal to 360 degrees.

Figure 15:
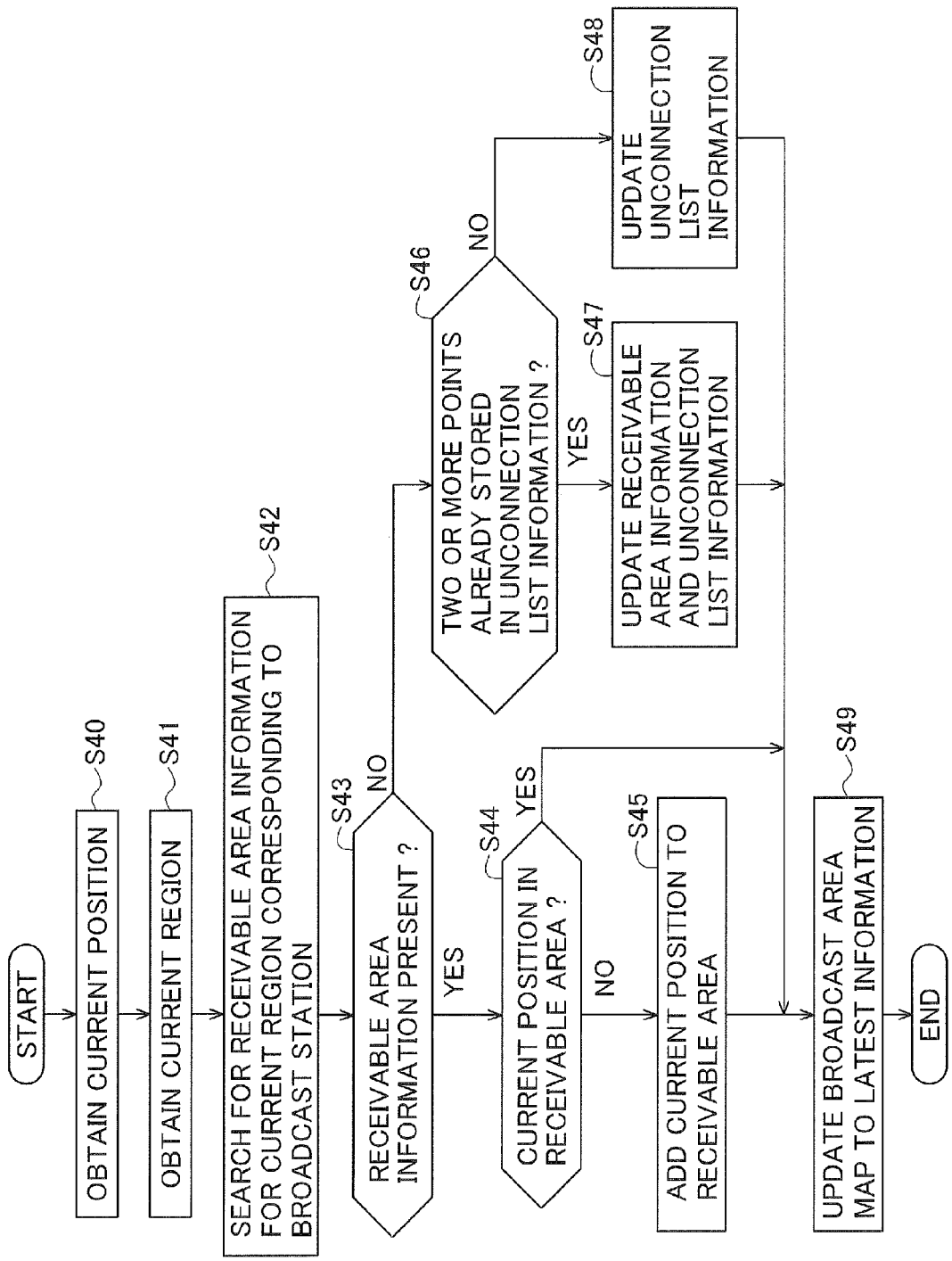
FIG. 15 is a flowchart illustrating the flow of a process of generating a broadcast area map, in the digital broadcast receiver according to the first embodiment.

FIG. 15 is a flowchart illustrating the flow of a process of generation of a broadcast area map in the digital broadcast receiver 100 according to the first embodiment. The flow of FIG. 15 is started by the broadcast area map generator 127 when a receivable broadcast station is detected in the channel scan. The flow of FIG. 15 is also started by the channel selection controller 117 at an arbitrary timing while a broadcast station is being viewed. For example, the flow is started with a predetermined period or when various service information contained in a received signal of the currently viewed broadcast station is changed. Here, a case where the broadcast area map generator 127 starts a process to update a broadcast area map on the basis of a broadcast station detected in the channel scan will be described.

First, the broadcast area map generator 127 obtains current position information from the current position detector 125 (S40), and obtains current region identification information corresponding to the current position information from the current region determiner 126 (S41).

Next, the broadcast area map generator 127 searches for and obtains a broadcast area map corresponding to the current region identification information obtained in step S41 and the broadcast station found in the channel scan, from the broadcast area map storage unit 128 (S42), and determines whether the corresponding broadcast area map is found (S43). If the corresponding broadcast area map is found (Yes in step S43), the broadcast area map generator 127 advances the process to step S44; if no corresponding broadcast area map is found (No in step S43), it advances the process to step S46.

In step S44, the broadcast area map generator 127 determines whether the current position obtained in step S40 is within the receivable area indicated by the receivable area information in the broadcast area map obtained in step S42. If the current position is within the receivable area (Yes in step S44), the broadcast area map generator 127 advances the process to step S49; if the current position is not within the receivable area (No in step S44), it advances the process to step S45.

In step S45, the broadcast area map generator 127 performs a process to add a position information item indicating the current position detected in step S40 to the receivable area information in the broadcast area map obtained in step S42. For example, the broadcast area map generator 127 determines, as connecting points (connecting positions), two points in the existing receivable area. Next, the broadcast area map generator 127 sets line segments connecting the current position and the connecting points as new sides. The broadcast area map generator 127 then combines, with the existing receivable area, a polygon formed by the new sides and one or more sides between the connecting points out of the sides formed by the vertexes included in the existing receivable area information, thereby generating a new receivable area. If an unconnected position information item is registered in the unconnection list corresponding to the current region identification information and the broadcast station detected in the channel scan, after checking the positional relationship between the unconnected point indicated by the registered unconnected position information item and the updated receivable area, the broadcast area map generator 127 may perform a process to add the unconnected point to the receivable area.

In determining, as the connecting points, two points in the existing receivable area, for example, the broadcast area map generator 127 may select vertexes closest to the current position or vertexes satisfying a condition that a line segment from the current position to the vertex is tangent to the existing receivable area, or may select the two points in other ways. The broadcast area map generator 127 may add a new point (a point other than the existing vertexes) to the existing receivable area and use the added point as a connecting point. For example, the broadcast area map generator 127 may newly add a point at a predetermined distance from the current position onto a side of the existing receivable area, and use the added point as a connecting point. There may be a case where the current position is so far away from the existing receivable area that no point at the predetermined distance from the current position can be found on the sides of the existing receivable area. In this case, the position information item of the current position may be discarded on the basis of a determination that it cannot be connected to the existing receivable area, or may be added to the unconnection list so that it can be referred to in the update process of the receivable area in the future.

In adding the current position information to the receivable area information, if there are one or more existing vertexes enclosed in the new receivable area, the broadcast area map generator 127 deletes the position information items of the one or more vertexes from the receivable area information. The broadcast area map generator 127 adds a position information item of the current position to the receivable area information in such a manner that the respective vertexes of the new polygon are stored in order along the path (in the first embodiment, the clockwise path).

Upon completion of the process of step S45, the broadcast area map generator 127 advances the process to step S49.

In step S46, the broadcast area map generator 127 determines whether two or more unconnected points different from the current position are stored in the unconnection list corresponding to the current region and the broadcast station detected in the channel scan. If the two or more unconnected points are stored (Yes in step S46), the broadcast area map generator 127 advances the process to step S47; if the two or more unconnected points are not stored (No in step S46), it advances the process to step S48.

In step S47, the broadcast area map generator 127 generates a new receivable area using the two or more unconnected points stored in the unconnection list corresponding to the current region and the current position obtained in step S40. Specifically, the broadcast area map generator 127 generates receivable area information including position information items indicating the two or more unconnected points and a position information item indicating the current position, generates a broadcast area map including the generated receivable area information, and stores the generated broadcast area map in the broadcast area map storage unit 128 in association with the broadcast station detected in the channel scan and the current region. Further, the broadcast area map generator 127 deletes the position information items indicating these unconnected points from the unconnection list.

In step S47, the broadcast area map generator 127 may generate the new receivable area using all the unconnected points registered in the unconnection list. However, for example, it may set, as the receivable area, only a polygon formed by connecting points that form sides smaller than a predetermined threshold value. Points that do not satisfy the condition may be left in the unconnection list without being used in the generation of the receivable area. It is also possible to select some points from among the points registered in the unconnection list, by another method, and generate a receivable area using the selected points.

In step S48, the broadcast area map generator 127 determines that no receivable area can be generated, and registers an unconnected position information item indicating the current position in the unconnection list corresponding to the current region and the broadcast station detected in the channel scan. The broadcast area map generator 127 then advances the process to step S49.

In step S49, the broadcast area map generator 127 updates the broadcast area maps stored in the broadcast area map storage unit 128 to the latest information detected in the channel scan. Further, for example, when one or more affiliated or relay stations are newly detected in the channel scan, the broadcast area map generator 127 adds information regarding the detected broadcast stations to the broadcast area maps. If the broadcast area maps include information other than the information illustrated in FIG. 8, the broadcast area map generator 127 updates such information to the latest information detected in the channel scan.

A process in a case where the flow of FIG. 15 is started by the channel selection controller 117 while a broadcast station is being viewed is the same as the above, so description thereof will be omitted.

The following advantages (1) to (7) are obtained from the first embodiment described above.

(1) The digital broadcast receiver determines, as a current region, a region to which the current position belongs, and when it is determined that a broadcast signal of a physical channel can be received, obtains, out of receivable area information for the physical channel, receivable area information for the current region indicating a receivable area in the current region, and performs an update process to update the receivable area information for the current region on the basis of the detected current position. This configuration obtains receivable area information for the current region to perform the update process, and thus can reduce the time required for the update process of the receivable area information, as compared with a case of obtaining receivable area information for all the regions to perform the update process. Specifically, by limiting the range of update or generation of the receivable area information to the current region, it is possible to reduce the time required for updating or generating the receivable area information, as compared with a case where the range is not limited.

(2) The above configuration in the item (1) makes it possible to reduce the possibility that an unreceivable area is incorporated in the receivable area indicated by the receivable area information, thereby reducing erroneous determination of receivability in an unreceivable area. This provides an advantage of reducing the time required for the search for a receivable physical channel (or broadcast station), for example.

Specifically, when a new receivable position is detected outside a receivable area, it is possible to connect the new point to the existing receivable area in only the current region. This makes it possible to, when a receivable area is enlarged, eliminate influence of a receivable area away from the new point in another region, and reduce the possibility of incorporating an actually unreceivable area between the existing receivable area and the current position into the new receivable area.

In particular, if an actual broadcast area consists of not one area but multiple separate areas (i.e., discrete areas), since receivable area information can be generated or updated for each region, it is possible to reduce the possibility of adding an unreceivable area between different areas (discrete areas) to the receivable area information.

(3) The digital broadcast receiver stores the receivable area information separately for each region, and in performing the update process, obtains, as the receivable area information for the current region, out of the receivable area information for each region, the receivable area information corresponding to the current region. This configuration makes it possible to quickly or easily obtain the receivable area information corresponding to the current region and reduce the time required for the update process of the receivable area information. For example, in a case where the receivable area information is stored without being separated for each region, a special process to generate information corresponding to the current region from the entire receivable area information may be necessary. However, this configuration eliminates the need for such a process.

(4) When it is determined that a broadcast signal of a physical channel can be received, the digital broadcast receiver obtains, out of unconnection information for the physical channel, unconnection information for the current region including one or more unconnected position information items of the current region, and performs an update process of the receivable area information on the basis of the unconnection information for the current region. This configuration obtains the unconnection information for the current region to perform the update process, and thus can reduce the time required for the update process, as compared with a case of obtaining the unconnection information for all the regions to perform the update process.

(5) The digital broadcast receiver stores the unconnection information separately for each region, and in performing the update process, obtains, as the unconnection information for the current region, out of the unconnection information for each region, the unconnection information corresponding to the current region. This configuration makes it possible to quickly or easily obtain the unconnection information corresponding to the current region and reduce the time required for the update process.

(6) When the reception state of the broadcast signal of a physical channel currently selected as the physical channel to be viewed is deteriorated, the digital broadcast receiver obtains, out of the stored receivable area information for each physical channel, the receivable area information for each physical channel for the current region, determines an alternative physical channel receivable at the current position on the basis of the receivable area information for each physical channel for the current region, and selects the determined alternative physical channel as the physical channel to be viewed. This configuration obtains the receivable area information for the current region to determine the alternative physical channel, and thus can reduce the time required for determination of the alternative physical channel, as compared with a case of obtaining the receivable area information for all the regions to determine the alternative physical channel. Specifically, by referring to the receivable area information while limiting the reference range to the current region, it is possible to reduce the time required for the determination of the alternative physical channel, as compared with a case where the range is not limited. As a result, it is possible to reduce the time required for selecting the alternative physical channel (e.g., the time required for automatically selecting a receivable broadcast station).

For example, even if a receivable area is broad or has a circumference complicated in shape, in determining whether the current position is within the receivable area, instead of checking the positional relationship between the entire receivable area and the current position, it is only necessary to check the positional relationship between a partial receivable area corresponding to the current region and the current position. Thus, it is possible to reduce the time required for the process to determine whether the current position is within the receivable area, and reduce the time required for the process to find an alternative physical channel (e.g., physical channel of a relay or affiliated station) receivable at the current position. Accordingly, when a currently received physical channel (or broadcast station) becomes unreceivable, a physical channel (or broadcast station) receivable at the current position is found more quickly. This provides an advantage of reducing the time period during which no broadcast signal is received.

(7) The digital broadcast receiver stores the receivable area information for each physical channel separately for each region, and in determining the alternative physical channel, obtains, as the receivable area information for each physical channel for the current region, out of the receivable area information for each physical channel for each region, the receivable area information for each physical channel corresponding to the current region. This configuration makes it possible to quickly or easily obtain the receivable area information corresponding to the current region and reduce the time required for the process to determine the alternative physical channel with reference to receivable area information. For example, if the receivable area information is stored without being separated for each region, a special process to generate information corresponding to the current region from the entire receivable area information may be necessary. However, this configuration eliminates the need for such a process.

The advantages in the first embodiment will be more specifically described below, compared with a comparative example, with reference to FIGS. 16 and 17. The digital broadcast receiver of this embodiment is configured to generate, update, store, and refer to the receivable area information for each region. On the other hand, a digital broadcast receiver of the comparative example is configured to perform the respective processes without separating it by regions. The digital broadcast receiver of the comparative example is configured to, when detecting a new receivable position outside an existing receivable area, update the receivable area to a maximum polygon including all of the positions included in the existing receivable area and the new receivable position.

FIG. 16 is a diagram for explaining an update process by the digital broadcast receiver of the comparative example. In FIG. 16, there are two mutually separated areas A1 and A2 where the broadcast signal of a certain physical channel (or broadcast station) can be actually received. It will be assumed that the digital broadcast receiver previously stores receivable area information indicating, as a receivable area, a polygon formed by connecting vertexes P1, P2, P3, P4, P5, and P6 in this order. It will also be assumed that the digital broadcast receiver moves in the area A2 and sequentially detects positions Pn0, Pn1, and Pn2 as positions where the broadcast signal can be received. First, when the digital broadcast receiver receives the broadcast signal at Pn0, it combines a triangle formed by Pn0, P1, and P3 with the existing receivable area and deletes the position information item of the vertex P2, which is enclosed in the updated receivable area, from the receivable area information. Next, when the digital broadcast receiver receives the broadcast signal at Pn1, it combines a triangle formed by Pn0, Pn1, and P4 with the existing receivable area and deletes the position information item of the vertex P3, which is enclosed in the updated receivable area, from the receivable area information. Next, when the digital broadcast receiver receives the broadcast signal at Pn2, since Pn2 is included in the existing receivable area, it performs no update process.

The above processes eventually updates the receivable area to a polygon formed by connecting vertexes P1, Pn0, Pn1, P4, P5, and P6 in this order. This updated receivable area undesirably includes an actually unreceivable area A3 between the areas A1 and A2. In this way, in a case where a newly detected receivable position is far away from the existing receivable area or other cases, the digital broadcast receiver of the comparative example undesirably incorporates an actually unreceivable area into the updated receivable area. In this case, the erroneous receivable area information is referred to in the automatic channel selection, and thus an actually unreceivable physical channel may be erroneously determined as a receivable physical channel. When such an erroneous determination occurs, an unnecessary channel selection or search is performed, and thus the time required for the automatic channel selection is prolonged.

Figure 17:
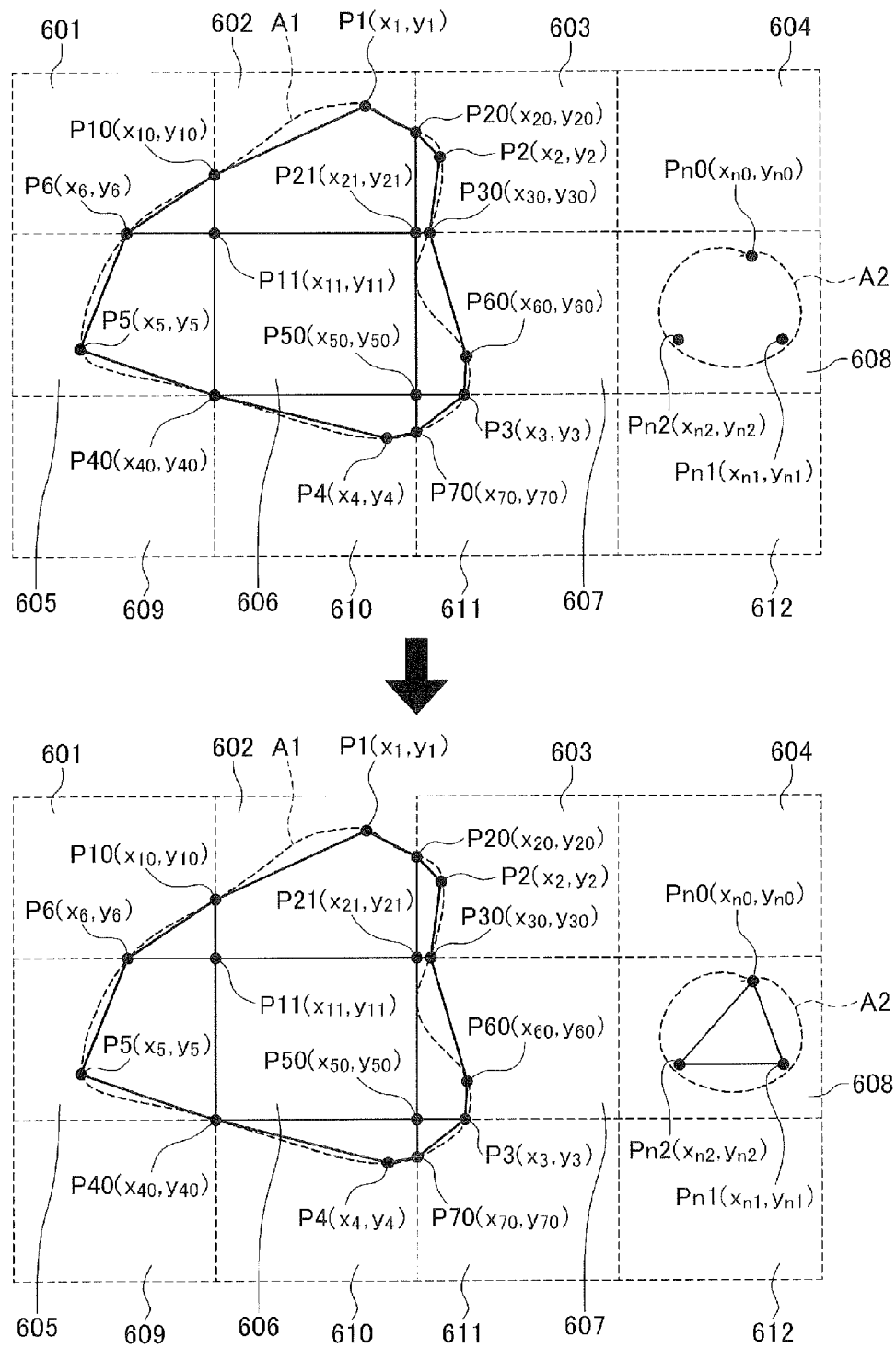
FIG. 17 is a diagram for explaining an update process by the digital broadcast receiver according to the first embodiment.

FIG. 17 is a diagram for explaining the update process by the digital broadcast receiver 100 of this embodiment. FIG. 17 illustrates, as regions that are units of processing of the digital broadcast receiver, a total of twelve rectangular regions 601 to 612. In FIG. 17, there are two mutually separated areas A1 and A2 where the broadcast signal of a certain physical channel (or broadcast station) can be actually received. The area A1 exists across multiple regions. It will be assumed that the digital broadcast receiver previously stores, as receivable area information for the regions 601, 602, 603, 605, 606, 607, 610, and 611, receivable area information indicating, as receivable areas, a polygon represented by vertexes P10, P11, and P6, a polygon represented by vertexes P1, P20, P21, P11, and P10, a polygon represented by vertexes P20, P2, P30, and P21, a polygon represented by vertexes P11, P40, P5, and P6, a polygon represented by vertexes P21, P50, P40, and P11, a polygon represented by vertexes P30, P60, P3, P50, and P21, a polygon represented by vertexes P50, P70, P4, and P40, and a polygon represented by vertexes P3, P70, and P50, respectively. It will also be assumed that the digital broadcast receiver moves in the area A2 and sequentially detects positions Pn0, Pn1, and Pn2 as positions where the broadcast signal can be received. First, when the digital broadcast receiver receives the broadcast signal at Pn0, since the region 608, to which the position Pn0 belongs, has no existing receivable area and the unconnection list is empty, the digital broadcast receiver adds Pn0 to the unconnection list. Next, when the digital broadcast receiver receives the broadcast signal at Pn1, since the number of unconnected points registered in the unconnection list is only one, the digital broadcast receiver adds Pn1 to the unconnection list. Subsequently, when the digital broadcast receiver receives the broadcast signal at Pn2, since the number of unconnected points registered in the unconnection list is two, the digital broadcast stores, as the receivable area information for the region 608, receivable area information indicating a polygon represented by connecting the vertexes Pn0, Pn1, and Pn2.

While the digital broadcast receiver of the comparative example erroneously incorporates the actually unreceivable area A3 into the receivable area, the digital broadcast receiver of this embodiment does not incorporate the area A3 into the receivable area. Accordingly, while the digital broadcast receiver of this embodiment is moving in the area A3, when a currently viewed program becomes unreceivable, the physical channel (or broadcast station) is not erroneously determined to be receivable in the automatic channel selection process, which reduces the time required for the automatic channel selection as compared with the comparative example.

For example, when the digital broadcast receiver moves repeatedly, the receivable area may become broad or complicated in shape. In such a case, in the digital broadcast receiver of the comparative example, the time required for determination as to whether the current position is within the existing receivable area, the update process of the receivable area, or the automatic channel selection process becomes long, and thus the time period during which no program can be viewed becomes long. On the other hand, according to the digital broadcast receiver of this embodiment, even if the receivable area is broad or has a circumference complicated in shape, in determining whether the current position is within the receivable area, instead of checking the positional relationship between the current position and the entire receivable area, since it is only necessary to check the positional relationship between the current position and a partial receivable area corresponding to the current region, it is possible to reduce the time required for determination as to whether the current position is within the receivable area, the update process of the receivable area, or the automatic channel selection process, thereby reducing the time period during which no program can be viewed.

For example, in FIG. 16, when the digital broadcast receiver of the comparative example performs the update process or automatic channel selection process, regardless of whether the current position is within the area A1 or A2, the digital broadcast receiver needs to determine the positional relationship between the current position and the polygon represented by the vertexes P1, Pn0, Pn1, P4, P5, and P6 to determine the positional relationship between the current position and the existing receivable area. Here, in determining the positional relationship between the current position and the existing receivable area, for example, it is necessary to compare the current position with all of the vertexes or sides representing the shape of the receivable area. In this case, as the number of vertexes or sides representing the shape of the receivable area increases, the time required for determination of the positional relationship increases. The digital broadcast receiver of the comparative example needs to compare the current position with a large polygon having many vertexes, and requires a long processing time. Further, when the existing receivable area is the polygon represented by the vertexes P1 to P6 and the current position is within the area A2, the digital broadcast receiver of the comparative example compares the current position with the existing receivable area (the polygon represented by the vertexes P1 to P6) far away from the current position. The processing time of this comparing process is unnecessary. As a result, the time required for automatically selecting a receivable broadcast station is prolonged.

On the other hand, according to the digital broadcast receiver of this embodiment, it is only necessary to determine the positional relationship between the current position and the receivable area in a region to which the current position belongs. Thus, according to this embodiment, it is possible to reduce the number of vertexes or sides to be compared and the processing time, as compared with the comparative example. This provides an advantage that the time period during which no program can be viewed is reduced, for example.

Further, the digital broadcast receiver of the comparative example has the following problem. When the digital broadcast receiver moves widely, broadcast area maps for many broadcast stations detected during the movement are stored. In such a case, many broadcast stations that are receivable in locations where the digital broadcast receiver moved in the past but are likely to be unreceivable at the current position may be stored. As such, in a case where broadcast area maps for many broadcast stations are stored, when a currently viewed broadcast station becomes unreceivable, a large number of broadcast area maps are referred to in order to find candidate broadcast stations broadcasting the same program, and determination as to whether the current position is within the receivable area of the broadcast area map is required for each of the large number of broadcast area maps. In particular, when many broadcast area maps for broadcast stations likely to be unreceivable at the current position are stored, determinations as to whether the current position is within the receivable areas of their broadcast area maps are useless.

In contrast, according to this embodiment, when a currently viewed broadcast station becomes unreceivable, in searching for a relay or affiliated station receivable at the current position, it is possible to previously exclude the receivable area information for the part other than the current region from the search range, and reduce the processing time required for searching for a relay or affiliated station receivable at the current position. Further, it is possible to previously exclude broadcast stations that are relay or affiliated stations but are unlikely to be receivable at the current position to narrow the search to only broadcast stations having a possibility of being receivable at the current region, and then search for a relay or affiliated station. Thus, it is possible to eliminate processing with respect to broadcast stations unlikely to be receivable, thereby reducing the time period during which no program can be viewed.

Second Embodiment

As illustrated in FIG. 1, a digital broadcast receiver 200 according to the second embodiment differs from the digital broadcast receiver 100 according to the first embodiment in having a current region determiner 226 instead of the current region determiner 126 and having a broadcast area map storage unit 228 instead of the broadcast area map storage unit 128, but otherwise is the same. In the description below, for parts that are the same as in the first embodiment, the same reference characters will be used and descriptions will be omitted or simplified.

The current region determiner 226 in the second embodiment performs substantially the same processing as the current region determiner 126 in the first embodiment, but differs in processing when the current region identification information is determined on the basis of the current position information received from the current position detector 125. The current region determiner 226 performs a first region determination process to determine a first region to which the current position belongs and a second region determination process to determine a second region to which the current position belongs. The current region determiner 226 notifies the broadcast area map generator 127 of current region identification information indicating the first region determined by the first region determination process, and notifies the channel selection controller 117 of current region identification information indicating the second region determined by the second region determination process.

The broadcast area map generator 127 uses, as the current region, the first region determined by the current region determiner 226 to perform various processes. Specifically, the broadcast area map generator 127 receives the current region identification information indicating the first region from the current region determiner 226 and obtains the broadcast area map corresponding to the region indicated by the current region identification information to perform the update process.

The channel selection controller 117 uses, as the current region, the second region determined by the current region determiner 226 to perform various processes. Specifically, the channel selection controller 117 receives the current region identification information indicating the second region from the current region determiner 226 and obtains the broadcast area map corresponding to the region indicated by the current region identification information to perform the automatic channel selection process.

The broadcast area map storage unit 228 in the second embodiment performs substantially the same processing as the broadcast area map storage unit 128 in the first embodiment, but differs in that: it provides the broadcast area map generator 127 with the receivable area information corresponding to the first region determined by the first region determination process; it provides the channel selection controller 117 with the receivable area information corresponding to the second region determined by the second region determination process; when applying the result of the update process by the broadcast area map generator 127 to the stored receivable area information, it applies it to the receivable area information corresponding to the first region determined by the first region determination process. Specifically, in a process to provide the broadcast area map corresponding to current region identification information specified by the broadcast area map generator 127 out of the stored entire broadcast area map, the broadcast area map storage unit 228 provides the regional broadcast area map corresponding to the region determined in the first region determination process by the current region determiner 226 (or the broadcast area map for a particular physical channel out of the regional broadcast area map). In a process to provide the regional broadcast area map corresponding to current region identification information specified by the channel selection controller 117 out of the stored entire broadcast area map, the broadcast area map storage unit 228 provides the regional broadcast area map corresponding to the region determined in the second region determination process by the current region determiner 226. In a process to apply information generated or updated by the broadcast area map generator 127 to the stored entire broadcast area map, the broadcast area map storage unit 228 applies it to the regional broadcast area map corresponding to the region determined in the first region determination process by the current region determiner 226 (or the broadcast area map for a particular physical channel out of the regional broadcast area map).

In one aspect, the first and second regions is set so that the first region is larger than the second region. In another aspect, the first and second regions is set so that the first region is smaller than the second region. In either aspect, it is desirable that one of the first and second regions should coincide with the region of the receivable area information stored in the broadcast area map storage unit 228.

Figure 18:
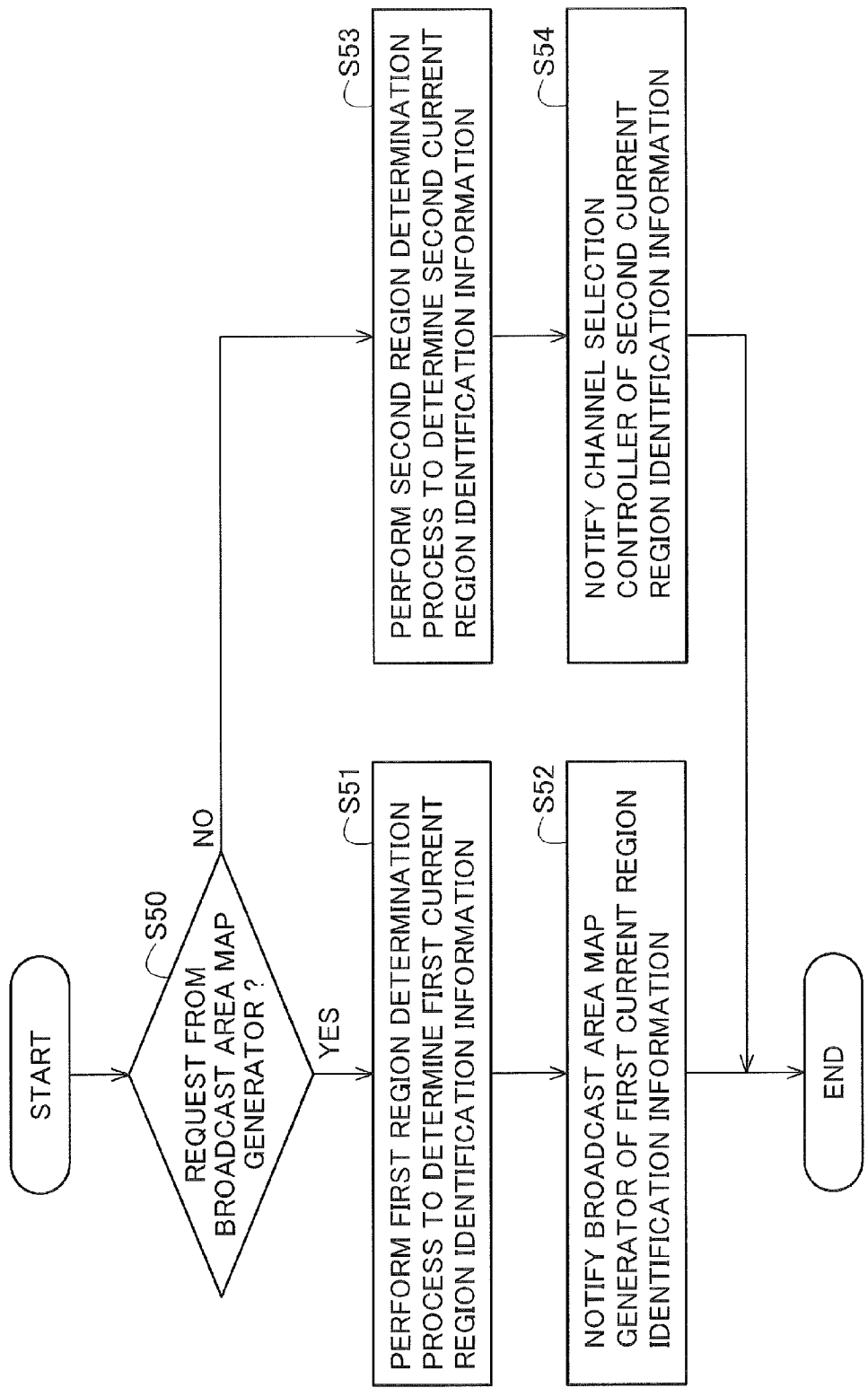
FIG. 18 is a flowchart illustrating the flow of a process of current region determination by a current region determiner in a second embodiment.

FIG. 18 is a flowchart illustrating the flow of a process of current region determination by the current region determiner 226 in the second embodiment. The flow of FIG. 18 is started when the channel selection controller 117 obtains the current region in the channel selection process (step S13 in FIG. 11 or step S31 in FIG. 12) or when the broadcast area map generator 127 obtains the current region in the update of the broadcast area map for a broadcast station detected in the channel scan (step S41 in FIG. 15). The current region determiner 226 may regularly receive notification of the latest current position information from the current position detector 125 and temporarily stored the current position information therein, or may voluntarily obtain the latest current position information from the current position detector 125 before starting the process of the flow of FIG. 18.

Upon request for the current region determination process, the current region determiner 226 first determines whether the request is from the broadcast area map generator 127 (S50). If the current region determiner 226 determines that the request is from the broadcast area map generator 127 (Yes in step S50), it performs the first region determination process to obtain first current region identification information (S51). The current region determiner 226 then notifies the broadcast area map generator 127 of the first current region identification information obtained in step S51 (S52).

On the other hand, if the current region determiner 226 determines in step S50 that the request is not from the broadcast area map generator 127 (No in step S50), it performs the second region determination process to obtain second current region identification information (S53). The current region determiner 226 then notifies the channel selection controller 117 of the second current region identification information obtained in step S52 (S54).

The flow of FIG. 18 performs the first region determination process and second region determination process in steps S51 and S53, which are immediately before the notification to the broadcast area map generator 127 and channel selection controller 117. However, the current region determiner 226 may perform the determination processes at the time of notification of current position information from the current position detector 125, store the determination results in a temporary storage area, and notify the determination results stored in the temporary storage area in steps S52 and S54.

The broadcast area map generator 127 requests, from the broadcast area map storage unit 228, the broadcast area map corresponding to the region indicated by the first current region identification information sent from the current region determiner 226 as above. The channel selection controller 117 requests, from the broadcast area map storage unit 228, the broadcast area map corresponding to the region indicated by the second current region identification information sent from the current region determiner 226 as above.

Figure 19:
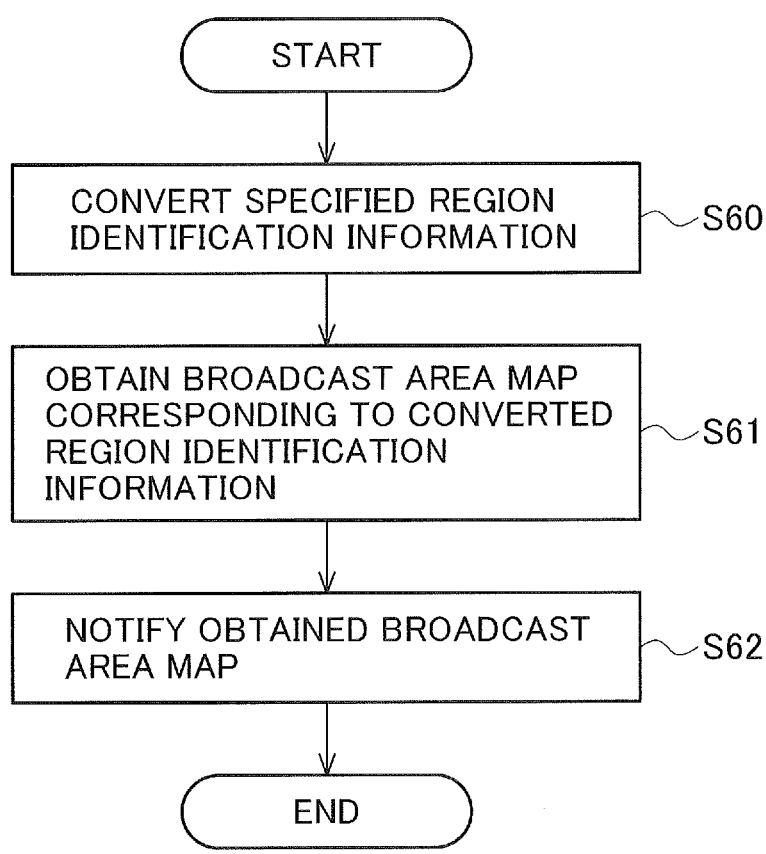
FIG. 19 is a flowchart illustrating the flow of a process of providing a broadcast area map by a broadcast area map storage unit in the second embodiment.

FIG. 19 is a flowchart illustrating the flow of a process of providing a broadcast area map by the broadcast area map storage unit 228 in the second embodiment. The flow of FIG. 19 is started when the channel selection controller 117 obtains the regional broadcast area map corresponding to the current region in the channel selection process (step S14 in FIG. 11 and step S32 in FIG. 12), or when the broadcast area map generator 127 obtains the broadcast area map corresponding to the current region in order to update the broadcast area map for a broadcast station detected in the channel scan (step S42 in FIG. 15).

When the broadcast area map storage unit 228 receives a request for the regional broadcast area maps corresponding to the current region, it first determines which one or more of the regions dividing the broadcast area maps managed by the broadcast area map storage unit 228 the specified region identification information corresponds to, and converts the specified region identification information into region identification information indicating the determined one or more regions (S60). The broadcast area map storage unit 228 then obtains, from the entire broadcast area map managed by the broadcast area map storage unit 228, one or more regional broadcast area maps corresponding to the region identification information converted in step S60 (S61). The broadcast area map storage unit 228 then provides the regional broadcast area maps obtained in step S61 to the block (the broadcast area map generator 127 or channel selection controller 117) that requested the regional broadcast area maps from the broadcast area map storage unit 228 (S62). The broadcast area map storage unit 228 may provide the broadcast area map generator 127 with only the broadcast area maps for the broadcast station detected in the channel scan out of the regional broadcast area maps.

Figure 20:
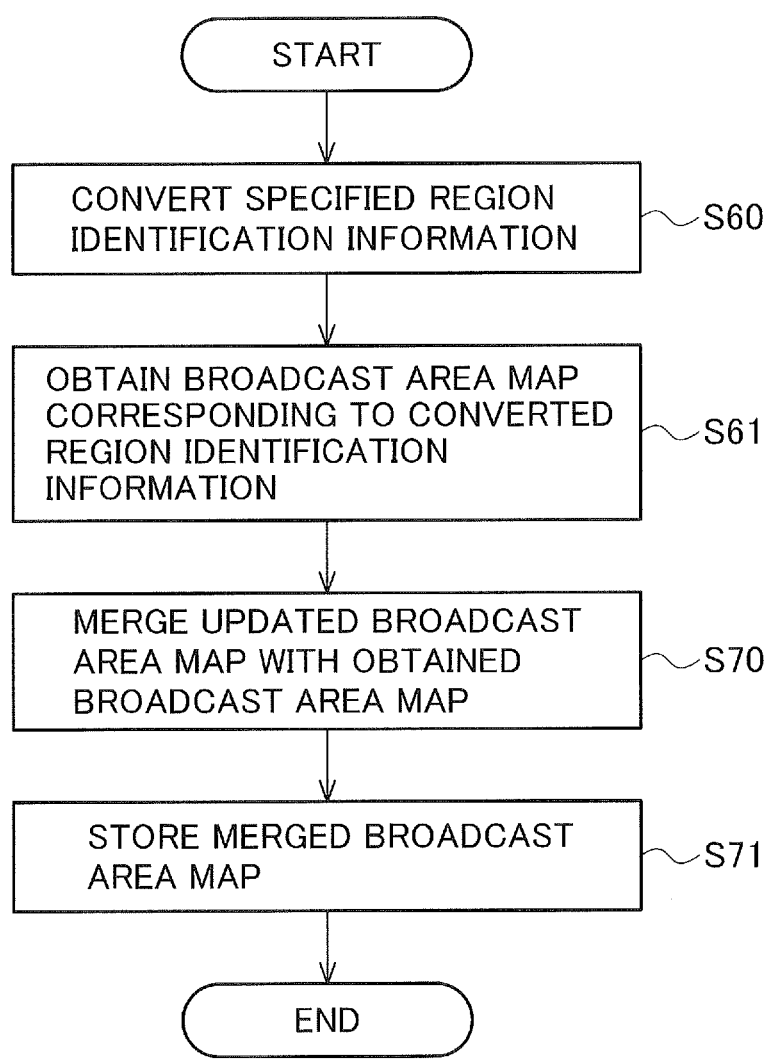
FIG. 20 is a flowchart illustrating the flow of a process of storing a broadcast area map by the broadcast area map storage unit in the second embodiment.

FIG. 20 is a flowchart illustrating the flow of a process of storing a broadcast area map by the broadcast area map storage unit 228 in the second embodiment. The flow of FIG. 20 is started when the results of the update process of a broadcast area map is stored in the broadcast area map storage unit 228 (e.g., step S49 in FIG. 15).

When the broadcast area map storage unit 228 receives a request to store updated regional broadcast area maps corresponding to the current region, it first determines which one or more of the regions dividing the broadcast area maps managed by the broadcast area map storage unit 228 the specified region identification information corresponds to, and converts the specified region identification information into region identification information indicating the determined one or more regions (S60). The broadcast area map storage unit 228 then obtains, from the entire broadcast area map managed by the broadcast area map storage unit 228, one or more regional broadcast area maps corresponding to the region identification information converted in step S60 (S61). These processes are the same as those of steps S60 and S61 in FIG. 19.

Next, the broadcast area map storage unit 228 merges one or more updated (or update target) regional broadcast area maps with the one or more regional broadcast area maps obtained in step S61 (S70), and overwrites the broadcast area maps managed by the broadcast area map storage unit 228 with the regional broadcast area maps merged in step S70, thereby updating the broadcast area maps (S71).

Although the above example obtains and updates regional broadcast area maps, it is also possible to obtain and update only broadcast area maps corresponding to an update target physical channel out of the regional broadcast area maps.

The descriptions of the flows of FIGS. 19 and 20 are made with respect to only the broadcast area maps. The flow of processing on the unconnection lists is the same as that on the broadcast area maps, so descriptions thereof will be omitted.

In addition to the foregoing advantages in the first embodiment, the following advantages (8) to (11) are obtained from the second embodiment described above.

(8) The digital broadcast receiver determines a first region and a second region to which the current position belongs, and uses, as the current region, the first region in the update process of receivable area information and the second region in the automatic channel selection process. This configuration can separately set the region used in the update process and the region used in the automatic channel selection process. This allows the respective processes to be performed more appropriately.

(9) The first and second regions are set so that the first region is larger than the second region. This makes it possible to update the receivable area information more accurately while reducing the processing amount or processing time of the automatic channel selection process.

(10) The first and second regions are set so that the first region is smaller than the second region. This makes it possible to, when extending a receivable area, add a smaller area to the existing receivable area and reduce the possibility that the extended receivable area includes an error.

(11) One of the first and second regions is set to coincide with the region of the receivable area information stored for each region. With this configuration, in one of the update process and channel selection process, it is possible to quickly or easily obtain the receivable area information corresponding to the current region and reduce the time required for the process.

Advantages of the digital broadcast receiver 200 according to the second embodiment in which the first region is larger than the second region will be specifically described below using FIGS. 21(a) and 21(b).

Figure 21A:
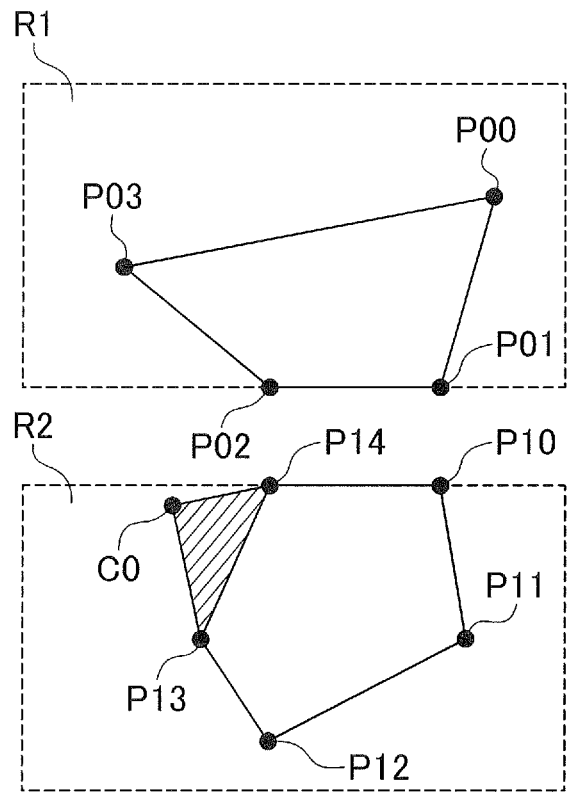
FIGS. 21(*a*) and 21(*b*) are diagrams for explaining advantages of the second embodiment.
Figure 21B:
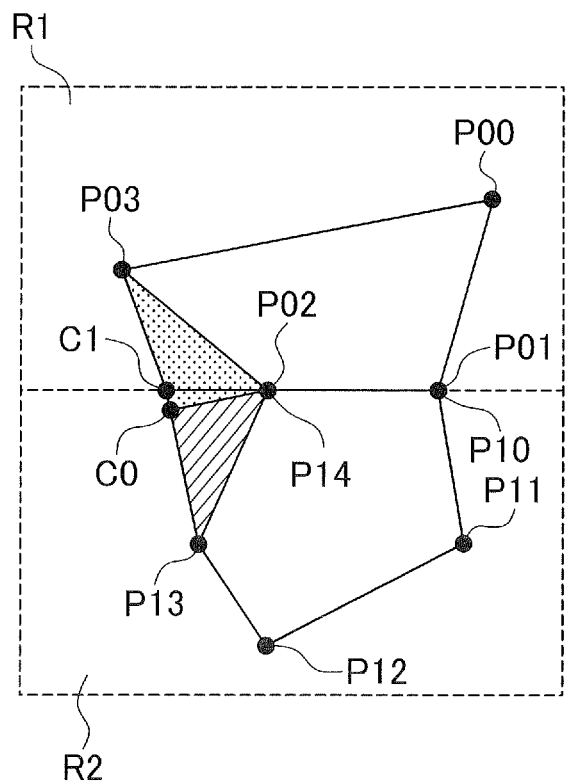

In FIGS. 21(a) and 21(b), the broadcast area map storage unit 128 stores, as receivable area information for a certain broadcast station, receivable area information for regions R1, R2, and R3. The receivable area information for the region R1 indicates, as the receivable area, a polygon formed by connecting vertexes P00, P01, P02, and P03 in this order. The receivable area information for the region R2 indicates, as the receivable area, a polygon formed by connecting vertexes P10, P11, P12, P13, and P14 in this order. The receivable area information for the region R3 is empty. The current position is a position C0. The region R3 is omitted from the drawings.

First, processing of the digital broadcast receiver 100 according to the first embodiment will be described using FIG. 21(a). When performing the channel selection process, the digital broadcast receiver 100 determines, on the basis of the current position C0, that the current region is the region R2 (step S13 in FIG. 11 and step S31 in FIG. 12), and performs the process with respect to the receivable area information for the region R2 (the receivable area information indicating the polygon specified by the vertexes P10, P11, P12, P13, and P14). Also when performing the update process of the receivable area information, the digital broadcast receiver 100 determines that the current region is the region R2 (step S41 in FIG. 15), and performs the process with respect to the receivable area information for the region R2. In this case, a triangular area formed by the points P14, P13, and C0 is added to the existing receivable area, so that the updated receivable area is a polygon formed by connecting the points P10, P11, P12, P13, C0, and P14 in this order.

Next, processing of the digital broadcast receiver 200 according to the second embodiment will be described using FIG. 21(b). When performing the channel selection process, the digital broadcast receiver 200 determines, on the basis of the current position C0, that the current region is the region R2 (step S13 in FIG. 11 and step S31 in FIG. 12), and performs the process with respect to the receivable area information for the region R2 (the receivable area information indicating the polygon specified by the points P10, P11, P12, P13, and P14). On the other hand, when performing the update process of the receivable area information, the digital broadcast receiver 100 determines that the current region is the area consisting of the regions R1, R2, and R3 (step S41 in FIG. 15), and performs the process with respect to the receivable area information for the area. In this case, the updated receivable area is a polygon formed by connecting the points P00, P01 (P10), P11, P12, P13, C0, C1, and P03 in this order. The point C1 is a point newly added on the boundary between the region R1 and the region R2. On the basis of receivable area information indicating the updated receivable area, the broadcast area map storage unit 228 updates the receivable area information for the region R1 and the receivable area information for the region R2. The updated receivable area information for the region R1 indicates a polygon formed by connecting the points P00, P01, P02, C1, and P03 in this order, i.e., a polygon obtained by adding a triangle formed by the points P02, C1, and P03 to the existing receivable area. The updated receivable area information for the region R2 indicates a polygon formed by connecting the points P10, P11, P12, P13, C0, and C1 in this order, i.e., a polygon obtained by adding a triangle formed by the points P14, P13, and C0 and a triangle formed by the points P02, C0, and C1 to the existing receivable area. As such, in the second embodiment, when the current position is near the boundary between two regions, it becomes possible to update the receivable area across the two regions.

As above, in this specific example, the digital broadcast receiver 200 performs the channel selection process using the same region as that for storage in the broadcast area map storage unit 228, and performs the update process using the region larger than that for storage. This makes it possible, when the current position is near the boundary between regions for storage, to update the receivable area information more accurately without increasing the processing time for the channel selection process. As a result, it becomes possible to successfully find an alternative program near the boundary between regions for storage in the automatic channel selection process, reducing the time period during which no program can be viewed.

The above example illustrates, for simplicity, a case where the region determined as the current region in the channel selection process (step S13 in FIG. 11 and step S31 in FIG. 12) is identical to the region for the receivable area information stored by the broadcast area map storage unit 228. However, the same applies to a case where the region determined as the current region in the update of the receivable area information (step S41 in FIG. 15) is identical to the region for the receivable area information stored by the broadcast area map storage unit 228. In this case, while the update process of the receivable area information is the same as in the first embodiment, the range of the receivable area information used in the channel selection process is smaller, and thus whether the current position is within the receivable area is determined more easily. This makes it possible to reduce the time required for the channel selection process, thereby reducing the time period during which no program can be viewed.

Next, advantages of the digital broadcast receiver 200 according to the second embodiment in which the first region is smaller than the second region will be specifically described below using FIGS. 22(a) and 22(b).

In FIGS. 22(a) and 22(b), the broadcast area map storage unit 128 stores, as receivable area information for a certain broadcast station, receivable area information for a region R0. The receivable area information for the region R0 indicates, as the receivable area, a polygon formed by connecting points P00, P01, P02, P03, and P04 in this order. The current position is a position C0.

First, processing of the digital broadcast receiver 100 according to the first embodiment will be described using FIG. 22(a). When performing the channel selection process, the digital broadcast receiver 100 determines, on the basis of the current position C0, that the current region is the region R0 (step S13 in FIG. 11 and step S31 in FIG. 12), and performs the process with respect to the receivable area information for the region R0 (the receivable area information indicating the polygon specified by the points P00, P01, P02, P03, and P04). Also when performing the update process of the receivable area information, the digital broadcast receiver 100 determines that the current region is the region R0 (step S41 in FIG. 15), and performs the process with respect to the receivable area information for the region R0. In this case, a triangular area formed by the points P04, P03, and C0 is added to the existing receivable area, so that the updated receivable area is a polygon formed by connecting the points P00, P01, P02, P03, C0, and P04 in this order.

Next, processing of the digital broadcast receiver 200 according to the second embodiment will be described using FIG. 22(b). When performing the channel selection process, the digital broadcast receiver 200 determines, on the basis of the current position C0, that the current region is the region R0 (step S13 in FIG. 11 and step S31 in FIG. 12), and performs the process with respect to the receivable area information for the region R0 (the receivable area information indicating the polygon specified by the points P00, P01, P02, P03, and P04). On the other hand, when performing the update process of the receivable area information, the digital broadcast receiver 100 determines, from among regions R1 and R2 obtained by dividing the region R0 into two parts, as the current region, the region R1 including the current position C0 (step S41 in FIG. 15), and performs the process with respect to the receivable area information for the region R1 (the receivable area information indicating a polygon specified by points P00, P10, P11, and P04). In this case, a triangular area formed by the points P04, P11, and C0 is added to the existing receivable area, so that the updated receivable area is a polygon formed by connecting the points P00, P10, P11, C0, and P04 in this order. When the region R0 is divided into the regions R1 and R2, the points P10 and P11 are newly added at positions on sides of the existing receivable area and on the boundary between the regions R1 and R2. On the basis of receivable area information indicating this updated receivable area, the broadcast area map storage unit 228 updates the receivable area information for the region R0. The updated receivable area information for the region R0 indicates a polygon formed by connecting the points P00, P01, P02, P03, P11, C0, and P04 in this order, i.e., a polygon obtained by adding a triangle formed by the points P04, P11, and C0 to the existing receivable area.

In the digital broadcast receivers according to the first and second embodiments, since a triangular part added to a receivable area in the update process is not a location where the broadcast wave is actually received, it may include an unreceivable area. This specific example in the second embodiment can reduce the size of the triangle added to the receivable area, thereby reducing the possibility that an error is included in the receivable area when the receivable area is extended. This reduces the possibility that an unreceivable broadcast station is erroneously found in detecting an alternative program when a currently viewed program becomes unreceivable. This makes it possible to reduce the time period during which no program can be viewed.

As above, in this specific example, the first region is smaller than the second region. Thus, it is possible to use more accurate receivable area information in determining whether an affiliated or relay station can be received at the current position, thereby reducing the Lime required for detecting an alternative program when a currently viewed program becomes unreceivable. This makes it possible to reduce the time period during which no program can be viewed.

The size of the first region in the second embodiment may be changed in accordance with the current position. For example, if the current position is in the upper part of a second region, an area consisting of the second region including the current position and a second region adjacent to the upper side of the second region may be determined as the first region to which the current position belongs. Similarly, if the current position is in the right part of a second region, an area consisting of the second region including the current position and a second region adjacent to the right side of the second region may be determined as the first region to which the current position belongs. If the current position is in the lower left part of a second region, an area consisting of the second region including the current position, a second region adjacent to the left side of the second region, and a second region adjacent to the lower side of the second region may be determined as the first region to which the current position belongs. If the current position is in the center of a second region, an area identical to the second region including the current position may be determined as the first region to which the current position belongs.

In the above configuration, when the current position is near the center of a second region, receivable area information for an area identical to the second region is updated; when the current position is near the boundary of a second region, receivable area information for an area that is larger than the second region and consists of the second region and its adjacent one or more regions can be updated.

In a configuration in which the first regions are the same as the second regions, even if the current position is near the boundary of a second region, only the receivable area information corresponding to the second region including the current position is updated, and receivable area information for the vicinity of the boundary of a second region adjacent to the second region is not updated. Thus, errors of the receivable area information may occur in the vicinity of the boundary of the second region adjacent to the second region including the current position. The above configuration in the second embodiment can reduce such errors and generate receivable area information with less error. This makes it possible to reduce the time required for detecting an alternative program when a currently viewed program becomes unreceivable, thereby reducing the time period during which no program can be viewed.

Third Embodiment

As illustrated in FIG. 1, a digital broadcast receiver 300 according to the third embodiment differs from the digital broadcast receiver 100 according to the first embodiment in having a broadcast area map storage unit 328 instead of the broadcast area map storage unit 128, but otherwise is the same. In the description below, for parts that are the same as in the first embodiment, the same reference characters will be used and descriptions will be omitted or simplified.

The broadcast area map storage unit 328 in the third embodiment performs substantially the same processing as the broadcast area map storage unit 128 in the first embodiment, but differs in the following points.

Figure 23:
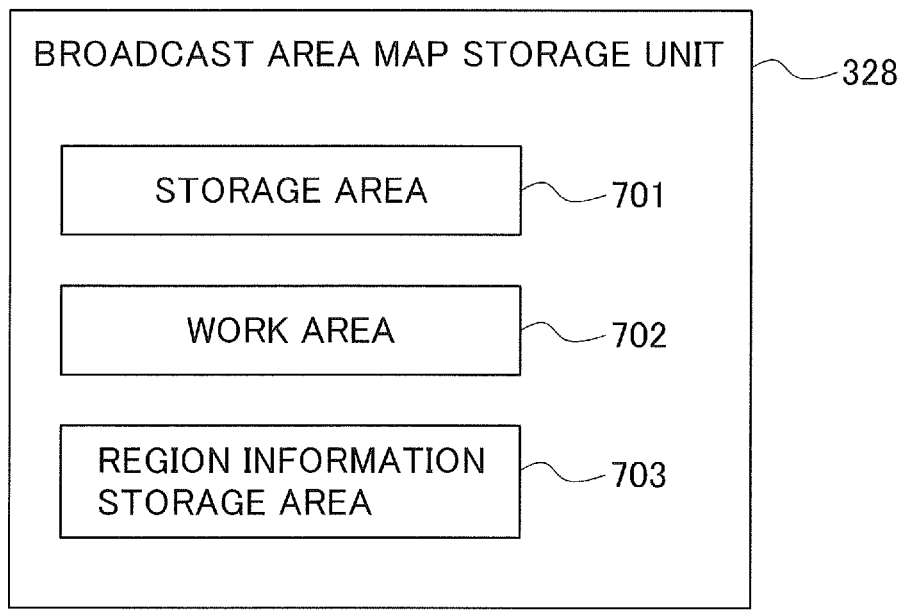
FIG. 23 is a block diagram schematically illustrating a configuration of a broadcast area map storage unit in a third embodiment.

As illustrated in FIG. 23, the broadcast area map storage unit 328 includes a storage area (first storage area) 701 that stores the receivable area information (specifically, the receivable area information for all the regions), a work area (second storage area) 702 that stores receivable area information corresponding to a partial region out of the receivable area information stored in the storage area 701, and a region information storage area 703 that stores region information indicating the region corresponding to the receivable area information stored in the work area 702. In both or one of the reading speed and writing speed, the work area 702 is faster than the storage area 701. The work area 702 and region information storage area 703 are, for example, areas that can be referred to or updated faster than the storage area (first storage area), and are provided in a temporary storage area (e.g., RAM). For example, the storage area 701 is composed of a nonvolatile memory, and the work area 702 is composed of a volatile memory.

When the broadcast area map storage unit 328 receives a request for receivable area information corresponding to a region included in the region indicated by the region information stored in the region information storage area 703, it provides the source of the request with the receivable area information stored in the work area 702 and corresponding to the region for which the request is made. When the broadcast area map storage unit 328 receives a request for receivable area information corresponding to a region outside the region indicated by the region information stored in the region information storage area 703, it applies the receivable area information stored in the work area 702 to the receivable area information stored in the storage area 701, and then stores in the work area 702 and provides to the source of the request the receivable area information corresponding to the region for which the request is made, out of the receivable area information stored in the storage area 701.

When the broadcast area map storage unit 328 receives a request to update receivable area information corresponding to a region included in the region indicated by the region information stored in the region information storage area 703, it stores, in the work area 702, updated receivable area information corresponding to the region for which the request is made. When the broadcast area map storage unit 328 receives a request to update receivable area information corresponding to a region outside the region indicated by the region information stored in the region information storage area 703, it applies the receivable area information stored in the work area 702 to the receivable area information stored in the storage area 701, and then stores, in the work area 702, updated receivable area information corresponding to the region for which the request is made.

In this embodiment, when the broadcast area map storage unit 328 receives a request for a regional broadcast area map from the channel selection controller 117 or broadcast area map generator 127, it temporarily stores, as the region information, in the region information storage area 703, region identification information (e.g., a region ID) specified in the request, and copies, from the storage area 701 to the work area 702, only the part corresponding to the specified region identification information of the entire broadcast area map (i.e., the storage entire broadcast area map) stored in the storage area 701.

After that, when the broadcast area map storage unit 328 receives a request for a regional broadcast area map from the channel selection controller 117 or broadcast area map generator 127, if region identification information (current region identification information) specified in the request is identical to the region identification information stored in the region information storage area 703, the broadcast area map storage unit 328 provides the source of the request with the regional broadcast area map (i.e., the work regional broadcast area map) stored in the work area 702. On the other hand, if the specified region identification information is different from the region identification information stored in the region information storage area 703, the broadcast area map storage unit 328 applies the work regional broadcast area map to the part corresponding to the region identification information stored in the region information storage area 703 of the storage entire broadcast area map, and then updates the region identification information stored in the region information storage area 703 to the specified region identification information. The broadcast area map storage unit 328 then writes, as the work regional broadcast area map, into the work area 702, the part corresponding to the specified region identification information of the storage entire broadcast area map, and provides the part to the source of the request.

When the broadcast area map storage unit 328 receives, from the broadcast area map generator 127, a request to update a regional broadcast area map, if the region identification information (current region identification information) specified in the request is identical to the region identification information stored in the region information storage area 703, the broadcast area map storage unit 328 updates the work regional broadcast area map. On the other hand, if the specified region identification information is different from the region identification information stored in the region information storage area 703, the broadcast area map storage unit 328 applies the work regional broadcast area map to the part corresponding to the region identification information stored in the region information storage area 703 of the storage entire broadcast area map, and then updates the region identification information stored in the region information storage area 703 to the specified region identification information. The broadcast area map storage unit 328 then writes, as the work regional broadcast area map, into the work area 702, the part corresponding to the specified region identification information of the storage entire broadcast area map, and updates the work regional broadcast area map.

In one aspect, the storage area 701 stores the receivable area information in a first data format, and the work area 702 stores the receivable area information in a second data format different from the first data format. When writing the receivable area information stored in the storage area 701 into the work area 702, the broadcast area map storage unit 328 performs a first conversion process to convert information in the first data format into information in the second data format. When applying the receivable area information stored in the work area 702 to the storage area 701, the broadcast area map storage unit 328 performs a second conversion process to convert information in the second data format into information in the first data format.

For example, the receivable area information in the first data format is information including at least one parameter indicating a rectangle as a receivable area; the receivable area information in the second data format is information including position information items indicating positions (e.g., vertex positions of a polygon) bounding a receivable area. In this case, in the second-conversion process, the broadcast area map storage unit 328 determines at least one parameter indicating a rectangle circumscribing the receivable area indicated by the position information items, thereby converting the position information items into the at least one parameter indicating the rectangle; in the first conversion process, the broadcast area map storage unit 328 determines position information items indicating vertex positions of the rectangle indicated by the at least one parameter of the rectangle, thereby converting the at least one parameter of the rectangle into the position information items.

For example, the broadcast area map storage unit 328 may perform a process to compress information in the second conversion process, and perform a process to decompress the compressed information in the first conversion process.

Figure 24:
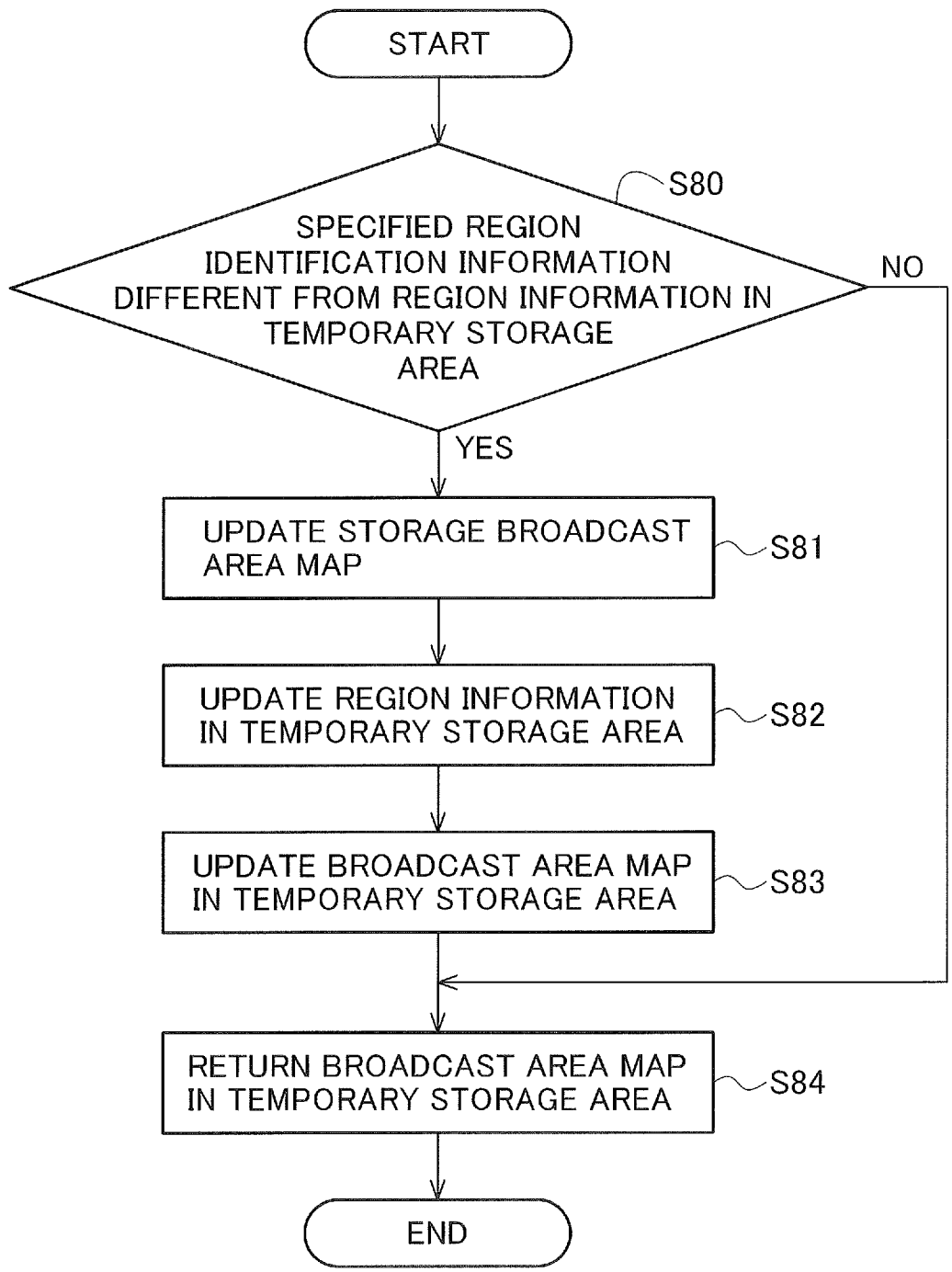
FIG. 24 is a flowchart illustrating the flow of a process of providing a broadcast area map by the broadcast area map storage unit in the third embodiment.

FIG. 24 is a flowchart illustrating the flow of a process of providing broadcast area maps by the broadcast area map storage unit 328 in the third embodiment. The flow of FIG. 24 is started when the regional broadcast area map corresponding to the current region is obtained in the channel selection process (step S14 in FIG. 11 and step S32 in FIG. 12) or when the broadcast area map corresponding to the current region for a broadcast station detected in the channel scan is obtained (step S42 in FIG. 15).

When the broadcast area map storage unit 328 receives a request for the regional broadcast area map for the current region, it first determines whether region identification information specified in the request is different from the region identification information as the region information stored in the region information storage area 703 (S80). If the region identification information is different (Yes in step S80), it advances to step S81; if the region identification information is the same (No in step S80), it advances to step S84.

In step S81, the broadcast area map storage unit 328 writes the work regional broadcast area map onto the part corresponding to the region identification information stored in the region information storage area 703 of the storage entire broadcast area map, thereby updating the storage regional broadcast area map. At this time, if the receivable area indicated by the receivable area information included in the work regional broadcast area map has a complicated shape, the broadcast area map storage unit 328 may perform conversion to simplify it, such as conversion to determine a rectangle circumscribing the shape as a new receivable area, and then perform the writing onto the storage regional broadcast area map. When the shape of the rectangle is stored, it may be stored in a vertex list format in which the four vertexes of the rectangle are recorded in order, in the same way as above. Alternatively, for example, a set of the upper left coordinates, length, and width of the rectangle may be stored. Further, it may be simplified by other methods, and information compression method such as ZIP may be used.

Next, the broadcast area map storage unit 328 stores the region identification information specified in the request in the region information storage area 703 as the region information (S82), obtains the part corresponding to the specified region identification information of the storage entire broadcast area map, and writes the obtained part into the work area 702 to update the work regional broadcast area map (S83), advancing to the process of step S84. At this time, if the storage regional broadcast area map is updated with the work regional broadcast area map subjected to the conversion as above in step S81, the broadcast area map storage unit 328 applies inverse conversion to the storage regional broadcast area map obtained in step S83 and then performs the writing into the work area 702. For example, if receivable area information is converted into a set of the upper left coordinates, length, and width of the rectangle and then stored in step S81, the broadcast area map storage unit 328 determines, from the parameters indicating the rectangle, four vertexes of the rectangle to convert the parameters into a vertex list listing the four vertexes in order. For example, if ZIP compression is performed in step S81, ZIP decompression is performed. As a result of the process in step S83, only the regional broadcast area map corresponding to the specified current region is stored in the work area 702.

In step S84, the broadcast area map storage unit 328 returns the work regional broadcast area map to the source (the channel selection controller 117 or broadcast area map generator 127) of the request for the regional broadcast area map (S84). To the broadcast area map generator 127, the broadcast area map storage unit 328 may return only the broadcast area map for a broadcast station detected in the channel scan, out of the work regional broadcast area map.

Figure 25:
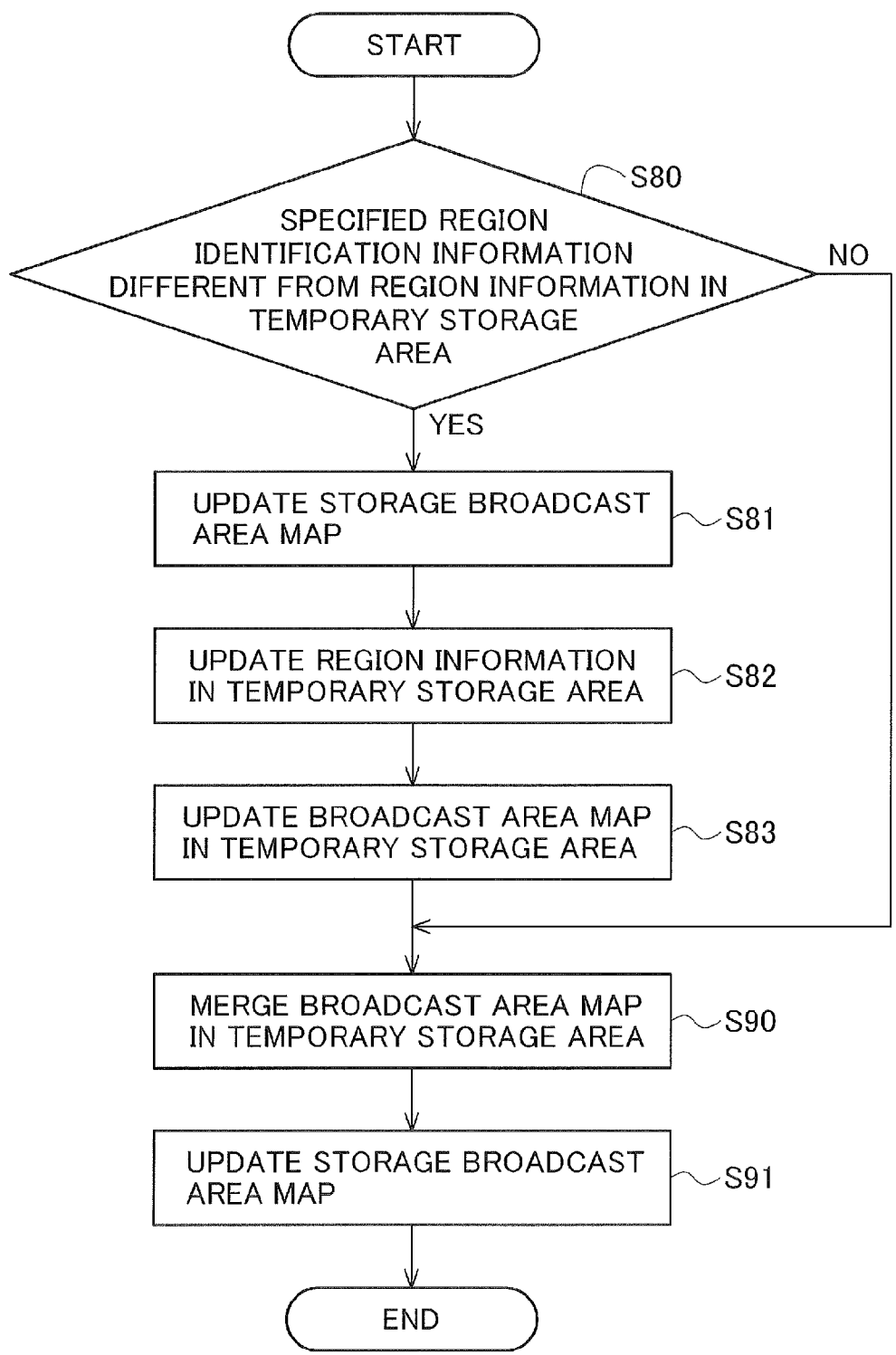
FIG. 25 is a flowchart illustrating the flow of an update process of a broadcast area map by the broadcast area map storage unit in the third embodiment.

FIG. 25 is a flowchart illustrating the flow of the update process of a broadcast area map by the broadcast area map storage unit 328 in the third embodiment. The flow of FIG. 25 is started when a result of an update of the broadcast area map for a broadcast station detected in the channel scan is stored in the broadcast area map storage unit 328 (step S49 in FIG. 15).

When the broadcast area map storage unit 328 receives a request to update the regional broadcast area map for the current region from the broadcast area map generator 127, it first determines whether region identification information specified in the request is different from the region identification information as the region information stored in the region information storage area 703 (S80). If the region identification information is different (Yes in step S80), it advances to step S81; if the region identification information is the same (No in step S80), it advances to step S90.

In step S81, the broadcast area map storage unit 328 writes the work regional broadcast area map onto the part corresponding to the region identification information stored in the region information storage area 703 of the storage entire broadcast area map, thereby updating the storage regional broadcast area map.

Next, the broadcast area map storage unit 328 stores the region identification information specified in the request in the region information storage area 703 as the region information (S82), obtains the part corresponding to the specified region identification information of the storage entire broadcast area map, and writes the obtained part into the work area 702 to update the work regional broadcast area map (S83), advancing to the process of step S90.

The above processes of steps S80 to S83 in FIG. 25 are the same as those of steps S80 to S83 in FIG. 24.

In step S90, the broadcast area map storage unit 328 merges an updated regional broadcast area map received from the broadcast area map generator 127 with the work regional broadcast area map to update the work regional broadcast area map to the latest information. The broadcast area map storage unit 328 then writes the latest broadcast area map generated in step S90 onto the part corresponding to the region identification information stored in the region information storage area 703 of the storage entire broadcast area map, thereby updating the storage broadcast area map (S91).

As above, the digital broadcast receiver in the third embodiment includes a storage area that stores receivable area information and a work area that stores receivable area information corresponding to a partial region out of the receivable area information stored in the storage area, and upon request from the channel selection controller 117 or broadcast area map generator 127, provides or updates the receivable area information stored in the work area. This makes it possible to reduce the time required for obtaining or updating the receivable area information. Further, since the work area stores receivable area information for a partial region (current region for which the request is made), the size of the work area can be reduced.

Specifically, it is expected that the regional broadcast area map for the region to which the current position belongs is likely to be referred to next and is used frequently. In the third embodiment, it is possible to store the regional broadcast area map in the work area that can be referred to faster, and update the work area at the time of change of the region. Thus, there is no need to continuously hold information for regions other than the region to which the current position belongs. This makes it possible to reduce the size of the work memory area required by the digital broadcast receiver using broadcast area maps, thereby lowering the cost.

It is also expected that the broadcast area map information for regions other than the region to which the current position belongs is unlikely to be used soon and is used with low frequency. Thus, by simplifying or compressing the information for their regions, it becomes possible to reduce the size of the storage area required for storing such information, thereby lowering the cost.

The broadcast area map storage unit 328 may be configured to store the receivable area information separately for each region that can be determined by the current region determiner 126, and for the receivable area information for each region, store at least one of a last update time when the receivable area information was last updated and a last reference time when the receivable area information was last provided (or referred to), and delete the receivable area information when the difference between the at least one time and the current time exceeds a predetermined threshold value. When the broadcast area map storage unit 328 stores both the last update time and the last reference time, it may delete the receivable area information when at least one of the difference between the last update time and the current time and the difference between the last reference time and the current time exceeds the threshold value, or may delete the receivable area information when the both exceed the threshold value.

Specifically, the broadcast area map storage unit 328 stores, for the storage regional broadcast area map for each region, the last update date and time or the last reference date and time of the storage regional broadcast area map. When the storage broadcast area maps are updated, if the difference between the last update date and time or the last reference date and time and the current time exceeds a predetermined value with respect to one or more regions, since it is considered that the regions are now outside the range of movement, the broadcast area map storage unit 328 clears the regional broadcast area maps for the regions. This can reduce the information amount of the storage entire broadcast area map. This makes it possible to reduce the size of the storage area required for the storage entire broadcast area map, thereby lowering the cost.

Fourth Embodiment

As illustrated in FIG. 1, a digital broadcast receiver 400 according to the fourth embodiment differs from the digital broadcast receiver 300 according to the third embodiment in having a broadcast area map storage unit 428 instead of the broadcast area map storage unit 328, but otherwise is the same. In the description below, for parts that are the same as in the third embodiment, the same reference characters will be used and descriptions will be omitted or simplified.

The broadcast area map storage unit 428 in the fourth embodiment performs substantially the same processing as the broadcast area map storage unit 328 in the third embodiment, but differs in the following points.

Figure 26:
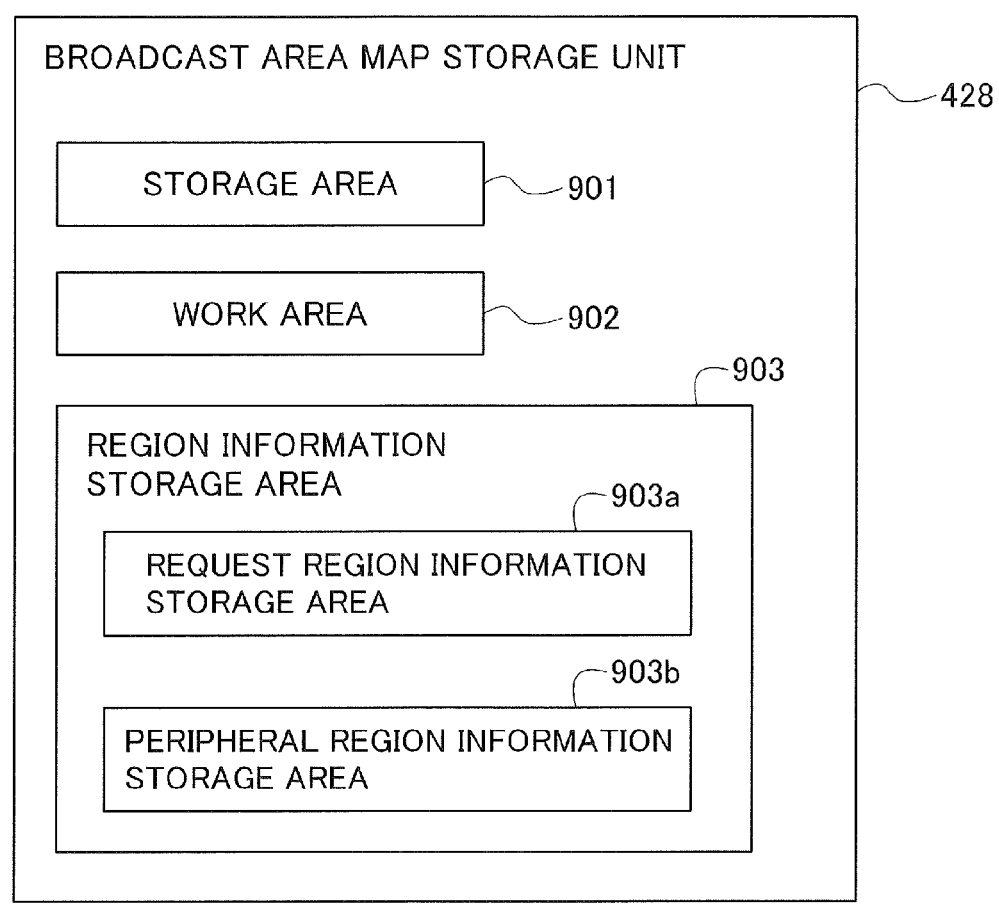
FIG. 26 is a block diagram schematically illustrating a configuration of a broadcast area map storage unit in a fourth embodiment.

As illustrated in FIG. 26, the broadcast area map storage unit 428 includes a storage area (first storage area) 901 that stores the receivable area information (specifically, the receivable area information for all the regions), a work area (second storage area) 902 that stores receivable area information corresponding to a partial region out of the receivable area information stored in the storage area 901, and a region information storage area 903 that stores region information indicating the region corresponding to the receivable area information stored in the work area 902. In both or one of the reading speed and writing speed, the work area 902 is faster than the storage area 901. The work area 902 and region information storage area 903 are, for example, areas that can be referred to or updated faster than the storage area (first storage area), and are provided in a temporary storage area (e.g., RAM). For example, the storage area 901 is composed of a nonvolatile memory, and the work area 902 is composed of a volatile memory.

In this embodiment, the work area 902 stores receivable area information corresponding to the region for which a request for receivable area information is made, and receivable area information corresponding to a region (hereinafter, referred to appropriately as the 'peripheral region') peripheral to the region for which the request is made, as described later. The region information storage area 903 stores, as the region information, request region information indicating the region for which the request is made, and peripheral region information indicating the peripheral region. In the example of FIG. 26, the region information storage area 903 includes a request region information storage area 903*a* that stores the request region information, and a peripheral region information storage area 903*b* that stores the peripheral region information. The above peripheral region is, specifically, a particular region located on the periphery of the region for which the request is made, and is determined by the broadcast area map storage unit 428. The broadcast area map storage unit 428 determines the peripheral region according to a predetermined rule, which will be described later.

When the broadcast area map storage unit 428 receives a request for receivable area information corresponding to a region included in the region indicated by the request region information stored in the region information storage area 903, it provides the source of the request with the receivable area information corresponding to the region for which the current request is made, out of the receivable area information stored in the work area 902.

When the broadcast area map storage unit 428 receives a request for receivable area information corresponding to a region included in the region indicated by the peripheral region information stored in the region information storage area 903, it provides the source of the request with the receivable area information corresponding to the region for which the current request is made, out of the receivable area information stored in the work area 902. Further, the broadcast area map storage unit 428 applies the receivable area information stored in the work area 902 to the receivable area information stored in the storage area 901. In this case, for example, the broadcast area map storage unit 428 applies only receivable area information corresponding to the region within the region indicated by the request region information and peripheral region information stored in the region information storage area 903 but outside both the region for which the current request is made and its peripheral region. That is, the broadcast area map storage unit 428 applies only receivable area information corresponding to the region other than the region for which the current request is made and its peripheral region, out of the receivable area information stored in the work area 902. Further, the broadcast area map storage unit 428 stores, in the work area 902, receivable area information corresponding to the peripheral region of the region for which the current request is made, out of the receivable area information stored in the storage area 901. In this case, for example, the broadcast area map storage unit 428 deletes, from the work area 902, only receivable area information corresponding to the region within the region indicated by the request region information and peripheral region information stored in the region information storage area 903 but outside both the region for which the current request is made and its peripheral region, and writes, into the work area 902, only receivable area information corresponding to the region within the peripheral region of the region for which the current request is made but outside the region indicated by the request region information and peripheral region information stored in the region information storage area 903. That is, the broadcast area map storage unit 428 deletes, from the work area 902, only the receivable area information corresponding to the region other than the region for which the current request is made and its peripheral region, out of the receivable area information stored in the work area 902, and writes, into the work area 902, only the receivable area information not stored in the work area 902, out of the receivable area information stored in the storage area 901 and corresponding to the peripheral region of the region for which the current request is made. Further, the broadcast area map storage unit 428 updates the request region information and peripheral region information in the region information storage area 903. Specifically, the broadcast area map storage unit 428 writes, into the request region information storage area 903*a*, request region information indicating the region for which the current request is made, and writes, into the peripheral region information storage area 903*b*, peripheral region information indicating the peripheral region described above.

When the broadcast area map storage unit 428 receives a request for receivable area information corresponding to a region outside the region indicated by the request region information and peripheral region information stored in the region information storage area 903, it applies the receivable area information stored in the work area 902 to the receivable area information stored in the storage area 901, stores, in the work area 902, receivable area information corresponding to the region for which the current request is made and its peripheral region out of the receivable area information stored in the storage area 901, and provides the source of the request with the receivable area information corresponding to the region for which the current request is made. The broadcast area map storage unit 428 also updates the request region information and peripheral region information in the region information storage area 903. Specifically, the broadcast area map storage unit 428 writes, into the request region information storage area 903*a*, request region information indicating the region for which the current request is made, and writes, into the peripheral region information storage area 903*b*, peripheral region information indicating the peripheral region.

When the broadcast area map storage unit 428 receives a request to update receivable area information corresponding to a region included in the region indicated by the request region information stored in the region information storage area 903, it stores, in the work area 902, updated receivable area information corresponding to the region for which the request is made.

When the broadcast area map storage unit 428 receives a request to update receivable area information corresponding to a region included in the region indicated by the peripheral region information stored in the region information storage area 903, it stores, in the work area 902, updated receivable area information corresponding to the region for which the request is made. Further, the broadcast area map storage unit 428 may perform the following processing. The broadcast area map storage unit 428 applies the receivable area information stored in the work area 902 to the receivable area information stored in the storage area 901. In this case, for example, the broadcast area map storage unit 428 applies only receivable area information corresponding to the region within the region indicated by the request region information and peripheral region information stored in the region information storage area 903 but outside both the region for which the current request is made and its peripheral region. That is, the broadcast area map storage unit 428 applies only the receivable area information corresponding to the region other than the region for which the current request is made and its peripheral region, out of the receivable area information stored in the work area 902. The broadcast area map storage unit 428 also stores, in the work area 902, the receivable area information corresponding to the peripheral region of the region for which the current request is made, out of the receivable area information stored in the storage area 901. In this case, for example, the broadcast area map storage unit 428 deletes, from the work area 902, only the receivable area information corresponding to the region within the region indicated by the request region information and peripheral region information stored in the region information storage area 903 but outside both the region for which the current request is made and its peripheral region, and writes, into the work area 902, only receivable area information corresponding to the region within the peripheral region of the region for which the current request is made but outside the region indicated by the request region information and peripheral region information stored in the region information storage area 903. That is, the broadcast area map storage unit 428 deletes, from the work area 902, only the receivable area information corresponding to the region other than the region for which the current request is made and its peripheral region, out of the receivable area information stored in the work area 902, and writes, into the work area 902, only the receivable area information not stored in the work area 902, out of the receivable area information stored in the storage area 901 and corresponding to the peripheral region of the region for which the current request is made. The broadcast area map storage unit 428 also updates the request region information and peripheral region information in the region information storage area 903. Specifically, the broadcast area map storage unit 428 writes, into the request region information storage area 903*a*, request region information indicating the region for which the current request is made, and writes, into the peripheral region information storage area 903*b*, peripheral region information indicating the peripheral region.

When the broadcast area map storage unit 428 receives a request to update receivable area information corresponding to a region outside the region indicated by the request region information and peripheral region information stored in the region information storage area 903, it applies the receivable area information stored in the work area 902 to the receivable area information stored in the storage area 901, and stores, in the work area 902, updated receivable area information corresponding to the region for which the request is made. Further, the broadcast area map storage unit 428 may perform the following processing. The broadcast area map storage unit 428 stores, in the work area 902, receivable area information corresponding to the peripheral region of the region for which the current request is made, out of the receivable area information stored in the storage area 901. The broadcast area map storage unit 428 also updates the request region information and peripheral region information in the region information storage area 903. Specifically, the broadcast area map storage unit 428 writes, into the request region information storage area 903*a*, request region information indicating the region for which the current request is made, and writes, into the peripheral region information storage area 903*b*, peripheral region information indicating the peripheral region.

Specifically, when the broadcast area map storage unit 428 receives a request for a regional broadcast area map from the channel selection controller 117 or broadcast area map generator 127, it temporarily stores, in the request region information storage area 903*a*, as the request region information, the region identification information item of a region specified in the request (e.g., the region ID of the current region), and temporarily stores, in the peripheral region information storage area 903*b*, as the peripheral region information, the one or more region identification information items of a peripheral region of the region specified in the request (e.g., the one or more region IDs of one or more regions peripheral to the current region). The broadcast area map storage unit 428 also copies, from the storage area 901 to the work area 902, only the part corresponding to the specified region and its peripheral region, out of the entire broadcast area map (i.e., storage entire broadcast area map) stored in the storage area 901.

After that, when the broadcast area map storage unit 428 receives a request for a regional broadcast area map from the channel selection controller 117 or broadcast area map generator 127, if the region identification information item (current region identification information item) of a region specified in the request is identical to the region identification information item stored in the request region information storage area 903*a*, the broadcast area map storage unit 428 extracts the part corresponding to the specified region from the regional broadcast area maps (i.e., work regional broadcast area maps) stored in the work area 902, and provides it to the source of the request.

If the region identification information item (current region identification information item) of the region specified in the request is identical to one of the region identification information items stored in the peripheral region information storage area 903*b*, the broadcast area map storage unit 428 extracts the part corresponding to the specified region from the regional broadcast area maps (i.e., work regional broadcast area maps) stored in the work area 902, and provides it to the source of the request. Further, the broadcast area map storage unit 428 updates the request region information stored in the request region information storage area 903*a* to the region identification information item of the specified region, and updates the peripheral region information stored in the peripheral region information storage area 903*b* to the one or more region identification information items of the peripheral region of the specified region. Then, the broadcast area map storage unit 428 applies the part corresponding to one or more region identification information items removed from the region information storage area 903 out of the work regional broadcast area maps to the part of the storage entire broadcast area map, and then obtains, from the storage area 901, the part not yet stored in the work area 902 of the storage regional broadcast area maps corresponding to the region specified in the request and its peripheral region, writing the obtained part into the work area 902.

On the other hand, if the region identification information item of the region specified in the request is different from any of the region identification information items stored in the request region information storage area 903*a* and peripheral region information storage area 903*b*, the broadcast area map storage unit 428 applies the work regional broadcast area maps to the part corresponding to the region identification information items stored in the request region information storage area 903a and peripheral region information storage area 903b of the storage entire broadcast area map, and then updates the request region information stored in the request region information storage area 903a to the region identification information item of the specified region and updates the peripheral region information stored in the peripheral region information storage area 903b to the one or more region identification information items of the peripheral region of the specified region. Then, the broadcast area map storage unit 428 writes, into the work area 902, as the work regional broadcast area maps, the part corresponding to the specified region and its peripheral region of the storage entire broadcast area map, and provides the source of the request with the part corresponding to the specified region of the regional broadcast area maps stored in the work area 902.

When the broadcast area map storage unit 428 receives a request to update a regional broadcast area map from the broadcast area map generator 127, if the region identification information item (current region identification information item) of a region specified in the request is identical to the region identification information item stored in the request region information storage area 903a, the broadcast area map storage unit 428 updates the work regional broadcast area map corresponding to the specified region.

If the region identification information item (current region identification information item) of the region specified in the request is identical to one of the region identification information items stored in the peripheral region information storage area 903b, the broadcast area map storage unit 428 updates the work regional broadcast area map corresponding to the specified region. Further, the broadcast area map storage unit 428 updates the request region information stored in the request region information storage area 903a to the region identification information item of the specified region, and updates the peripheral region information stored in the peripheral region information storage area 903b to the one or more region identification information items of the peripheral region of the specified region. Then, the broadcast area map storage unit 428 applies the part corresponding to one or more region identification information items removed from the region information storage area 903 of the work regional broadcast area maps to the part of the storage entire broadcast area map, and then obtains, from the storage area 901, the part not yet stored in the work area 902 of the storage regional broadcast area maps corresponding to the peripheral region of the region specified in the request, writing the obtained part into the work area 902.

On the other hand, if the region identification information item of the region specified in the request is different from any of the region identification information items stored in the request region information storage area 903a and peripheral region information storage area 903b, the broadcast area map storage unit 428 applies the work regional broadcast area maps to the part corresponding to the region identification information items stored in the request region information storage area 903a and peripheral region information storage area 903b of the storage entire broadcast area map, and then updates the request region information stored in the request region information storage area 903a to the region identification information item of the specified region and updates the peripheral region information stored in the peripheral region information storage area 903b to one or more region identification information items of the peripheral region of the specified region. Then, the broadcast area map storage unit 428 writes, into the work area 902, as the work regional broadcast area maps, the part corresponding to the specified region and its peripheral region of the storage entire broadcast area map, and updates the work regional broadcast area map stored in the work area 902 and corresponding to the specified region.

In one aspect, as in the third embodiment, the storage area 901 stores the receivable area information in a first data format; the work area 902 stores the receivable area information in a second data format different from the first data format. As in the third embodiment, when the broadcast area map storage unit 428 writes the receivable area information stored in the storage area 901 into the work area 902, it performs a first conversion process to convert information in the first data format into information in the second data format; when the broadcast area map storage unit 428 applies the receivable area information stored in the work area 902 to the storage area 901, it performs a second conversion process to convert information in the second data format into information in the first data format.

Figure 27:
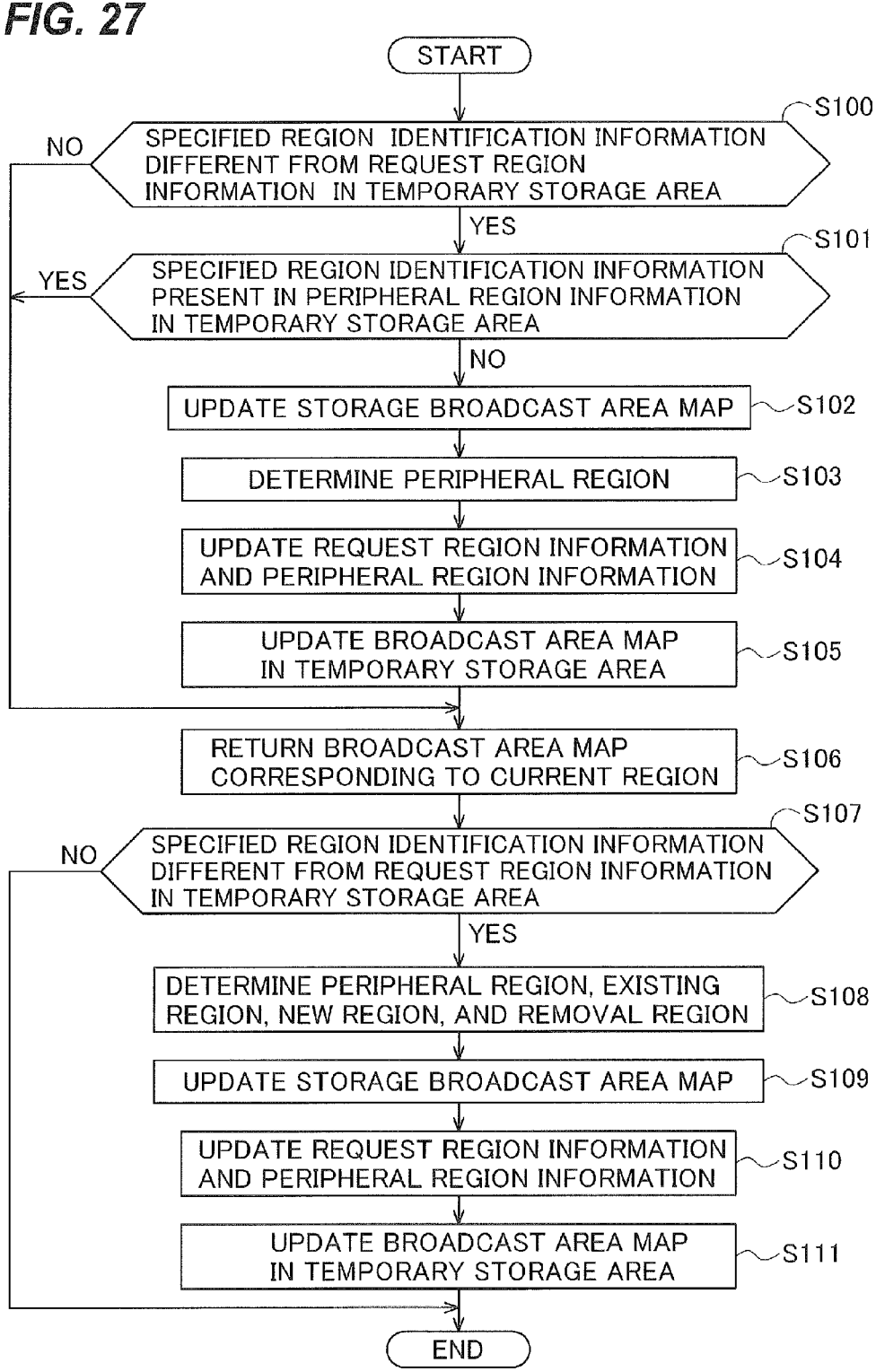
FIG. 27 is a flowchart illustrating the flow of a process of providing a broadcast area map by the broadcast area map storage unit in the fourth embodiment.

FIG. 27 is a flowchart illustrating the flow of a process of providing broadcast area maps by the broadcast area map storage unit 428 in the fourth embodiment. The flow of FIG. 27 is started when the regional broadcast area map corresponding to the current region is obtained in the channel selection process (step S14 in FIG. 11 and step S32 in FIG. 12) or when the broadcast area map corresponding to the current region for a broadcast station detected in the channel scan is obtained (step S42 in FIG. 15), similarly to the flow of FIG. 24 in the third embodiment.

When the broadcast area map storage unit 428 receives a request for the regional broadcast area map for the current region, it first determines whether a region identification information item specified in the request is different from the region identification information item as the request region information stored in the request region information storage area 903a (S100). If the region identification information items are different (Yes in step S100), it advances to step S101; if the region identification information items are the same (No in step S100), it advances to step S106.

In step S102, the broadcast area map storage unit 428 writes the work regional broadcast area maps onto the part corresponding to the region identification information items stored in the request region information storage area 903a and peripheral region information storage area 903b, out of the storage entire broadcast area map, thereby updating the storage regional broadcast area maps. At this time, a conversion process similar to that of step S81 in the third embodiment may be performed.

Next, the broadcast area map storage unit 428 determines the peripheral region of the region specified in the request (S103), and stores the region identification information item of the region specified in the request in the request region information storage area 903a as the request region information and the one or more region identification information items of the peripheral region in the peripheral region information storage area 903b as the peripheral region information (S104).

Further, the broadcast area map storage unit 428 updates the work regional broadcast area maps by obtaining, from the storage entire broadcast area map, the part corresponding to the region identification information items stored in the request region information storage area 903a and peripheral region information storage area 903b and writing the obtained part into the work area 902 (S105), advancing to the process of step S106. At this time, an inverse conversion process may be performed, similarly to step S83 in the third embodiment. As a result of the process of step S105, only the regional broadcast area maps corresponding to the specified current region and its peripheral region are stored in the work area 902.

In step S106, the broadcast area map storage unit 428 extracts the part corresponding to the specified region from the work regional broadcast area maps and returns it to the source (channel selection controller 117 or broadcast area map generator 127) of the request for the regional broadcast area map. To the broadcast area map generator 127, the broadcast area map storage unit 428 may return only the broadcast area map for the broadcast station detected in the channel scan, out of the work regional broadcast area map.

Next, the broadcast area map storage unit 428 determines whether the region identification information item specified in the request is different from the region identification information item stored in the request region information storage area 903a (S107). If the region identification information items are different (Yes in step S107), it advances to step S108; if the region identification information items are the same (No in step S107), it ends the process. If Yes in both steps S100 and S101, the determination in step S107 is Yes and the process proceeds to step S108.

In step S108, the broadcast area map storage unit 428 determines the peripheral region of the region specified in the request. Then, the broadcast area map storage unit 428 specifies, from among the region specified in the request and the determined peripheral region, as an existing region, one or more regions indicated by the region identification information items stored in the request region information storage area 903a and peripheral region information storage area 903b (i.e., one or more regions whose regional broadcast area maps are already stored in the work area 902); the broadcast area map storage unit 428 specifies, from among the region specified in the request and the determined peripheral region, as a new region, one or more regions other than the regions indicated by the region identification information items stored in the request region information storage area 903a and peripheral region information storage area 903b (i.e., one or more regions whose regional broadcast area maps are not yet stored in the work area 902); the broadcast area map storage unit 428 specifies, from among the regions indicated by the region identification information items stored in the request region information storage area 903a and peripheral region information storage area 903b, as a removal region, one or more regions other than the region specified in the request and the determined peripheral region.

Figure 28:
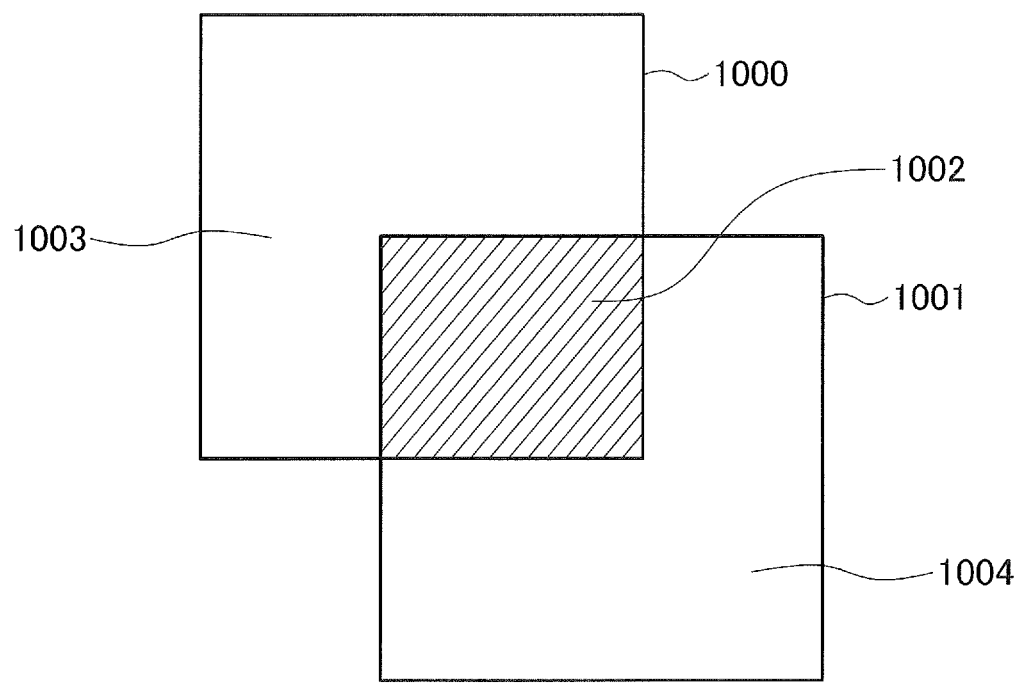
FIG. 28 is a diagram for explaining a process of step S108 in FIG. 27.

The process of step S108 will be specifically described using FIG. 28. FIG. 28 illustrates a region 1000 indicated by the region identification information items stored in the request region information storage area 903a and peripheral region information storage area 903b, and a region 1001 consisting of the region specified in the request and the determined peripheral region. The broadcast area map storage unit 428 specifies, as the existing region, the part (hatched part) 1002 within both the regions 1000 and 1001, specifies, as the removal region, the part 1003 within the region 1000 but outside the region 1001, and specifies, as the new region, the part 1004 within the region 1001 but outside the region 1000.

Returning to FIG. 27, next, the broadcast area map storage unit 428 extracts, from the work regional broadcast area maps, the part corresponding to the removal region specified in step S108 and writes the extracted part onto the part corresponding to the removal region of the storage entire broadcast area map, thereby updating the storage regional broadcast area maps (S109). At this time, a conversion process similar to that of step S81 in the third embodiment may be performed.

Then, the broadcast area map storage unit 428 stores the region identification information item specified in the request in the request region information storage area 903a and the one or more region identification information items of the peripheral region specified in step S108 in the peripheral region information storage area 903b (S110), and updates the work regional broadcast area maps by obtaining from the storage entire broadcast area map the part corresponding to the new region specified in step S108, adding the obtained part into the work area 902, and deleting from the work area 902 the part corresponding to the removal region (S111), ending the process. The process of step S110 is the same as that of step S104 described above.

In step S109, the update of the storage entire broadcast area map is performed on the part corresponding to the removal region specified in step S108. However, this is not mandatory. It is also possible to update the storage entire broadcast area map by writing the information in the work area 902 onto the entire part (i.e., the part corresponding to the region 1000 in FIG. 28) corresponding to the region identification information items stored in the request region information storage area 903a and peripheral region information storage area 903b of the storage entire broadcast area map. Further, in step S111, the update of the work regional broadcast area maps is performed on the part corresponding to the removal region and new region specified in step S108. However, this is not mandatory. It is also possible to update the work regional broadcast area maps by deleting the work regional broadcast area maps for all the regions (i.e., the region 1000 in FIG. 28) stored in the work area 902, obtaining from the storage entire broadcast area map the entire part (i.e., the part corresponding to the region 1001 in FIG. 28) corresponding to the region identification information items stored in the request region information storage area 903a and peripheral region information storage area 903b, and writing the obtained part into the work area 902.

Figure 29:
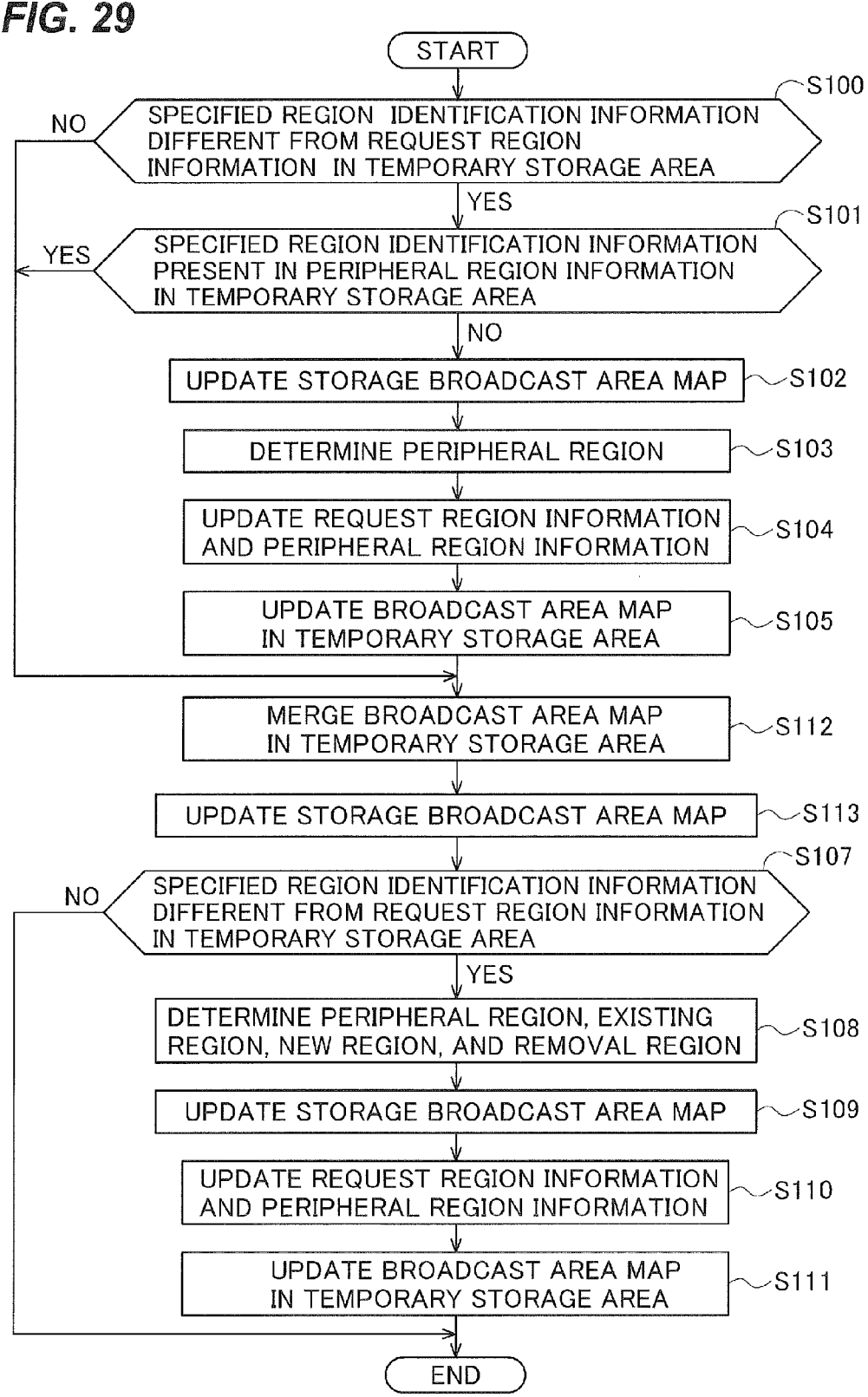
FIG. 29 is a flowchart illustrating the flow of an update process of a broadcast area map by the broadcast area map storage unit in the fourth embodiment.

FIG. 29 is a flowchart illustrating the flow of the update process of the broadcast area maps by the broadcast area map storage unit 428 in the fourth embodiment. The flow of FIG. 29 is started when a result of an update of the broadcast area map for a broadcast station detected in the channel scan is stored in the broadcast area map storage unit 428 (step S49 in FIG. 15), similarly to the flow of FIG. 25 in the third embodiment.

When the broadcast area map storage unit 428 receives a request to update the regional broadcast area map for the current region, it first determines whether a region identification information specified in the request is different from the region identification information item as the request region information stored in the request region information storage area 903a (S100). If the region identification information items are different (Yes in step S100), it advances to step S101; if the region identification information items are the same (No in step S100), it advances to step S112.

In step S101, the broadcast area map storage unit 428 determines whether the region identification information item specified in the request is present in the region identification information items as the peripheral region information stored in the peripheral region information storage area 903b. If the region identification information item is not present (No in step S101), it advances to step S102; if the region identification information item is present (Yes in step S101), it advances to step S112.

The processes of steps S102 to S105 are the same as those of steps S102 to S105 in FIG. 27, so descriptions thereof will be omitted. Upon completion of the process of step S105, the process proceeds to step S112.

In step S112, the broadcast area map storage unit 428 merges an updated regional broadcast area map received from the broadcast area map generator 127 with the work regional broadcast area map for the specified region, thereby updating the work regional broadcast area map to the latest information.

Next, the broadcast area map storage unit 428 writes the latest broadcast area maps generated in step S112 onto the part corresponding to the specified region of the storage entire broadcast area map, thereby updating the storage broadcast area maps (S113). After that, it performs the same processes as those of steps S107 to S111 in FIG. 27 and then ends the process.

As in the case of FIG. 27, in step S109, it is also possible to update the storage entire broadcast area map by writing the information in the work area 902 onto the entire part corresponding to the region identification information items stored in the request region information storage area 903a and peripheral region information storage area 903b of the storage entire broadcast area map. Further, in step S111, it is also possible to update the work regional broadcast area maps by deleting the work regional broadcast area maps for all the regions stored in the work area 902, obtaining from the storage entire broadcast area map the entire part corresponding to the region identification information items stored in the request region information storage area 903a and peripheral region information storage area 903b, and writing the obtained part into the work area 902. Further, the update process of step S109 may be performed in step S113.

Next, the determination of the peripheral region will be described using FIGS. 30 to 35. In FIGS. 30 to 34, each of the square cells represents a unit region that is a predetermined region (e.g., a region that can be determined by the current region determiner 126 and to which a region ID is assigned). In the following description, upper, lower, left, and right indicate the directions in the drawings.

Figure 30:
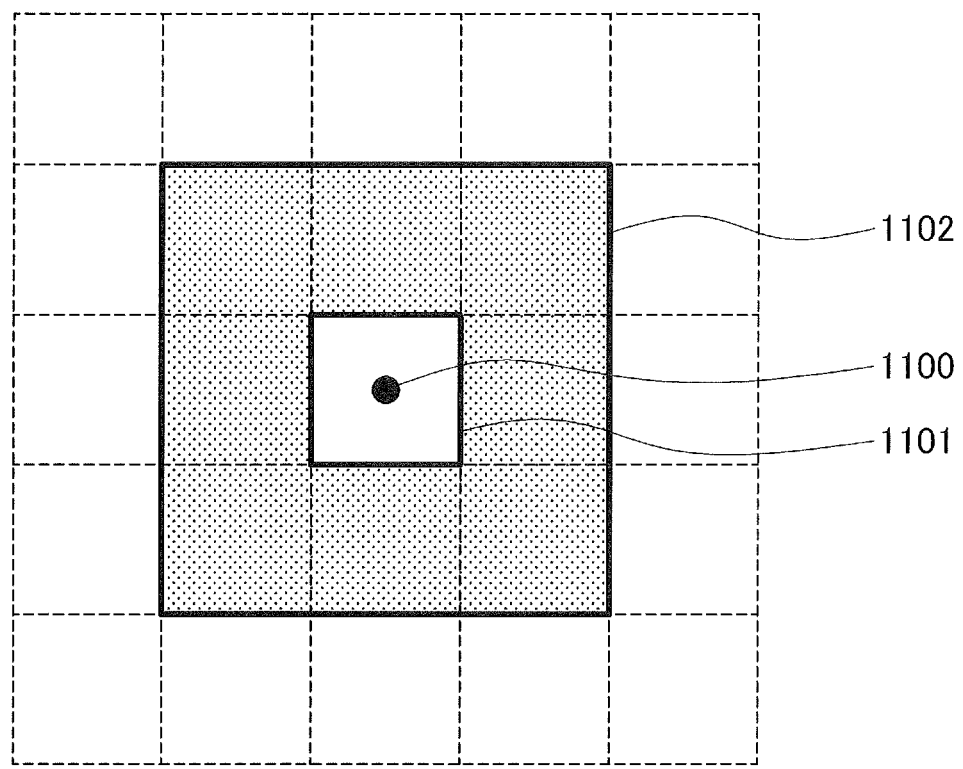
FIG. 30 is a diagram illustrating an example of a peripheral region of a specified current region, in the fourth embodiment.

In one aspect, the broadcast area map storage unit 428 determines, as the peripheral region, one or more regions adjacent to the region for which the request is made. For example, as illustrated in FIG. 30, for the current region 1101 including the current position 1100, the broadcast area map storage unit 428 determines, as the peripheral region, a region 1102 adjacent to the current region 1101 over the entire circumference of the current region 1101. At this time, for example, the broadcast area map storage unit 428 determines, from among unit regions existing within a predetermined range near the current region 1101, one or more unit regions satisfying a predetermined condition, and determines, as the peripheral region, a region consisting of the determined unit regions. The above condition includes the following conditions (c1) to (c5), although other conditions may be used.

(c1) The boundary of the unit region abuts the current region 1101.

(c2) A part of the unit region is within a predetermined distance from the boundary of the current region 1101.

(c3) The whole of the unit region is within a predetermined distance from the boundary of the current region 1101.

(c4) A part of the unit region is within a predetermined distance from a particular position (e.g., centroid position) of the current region 1101.

(c5) The whole of the unit region is within a predetermined distance from a particular position (e.g., centroid position) of the current region 1101.

In the example of FIG. 30, eight unit regions adjacent to the current region 1101 in the upper, lower, left, right, and oblique directions are determined as the peripheral region.

Figure 31A:
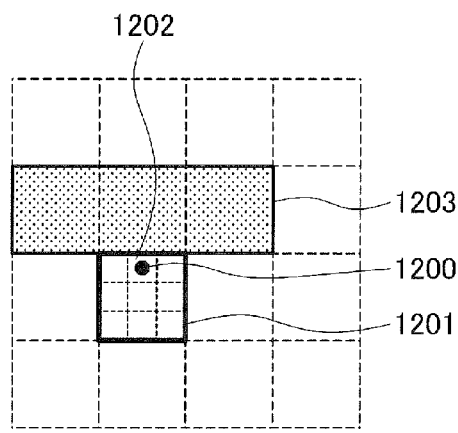
FIGS. 31(*a*) to 31(*d*) are diagrams each illustrating another example of a peripheral region of a specified current region, in the fourth embodiment.
Figure 31B:
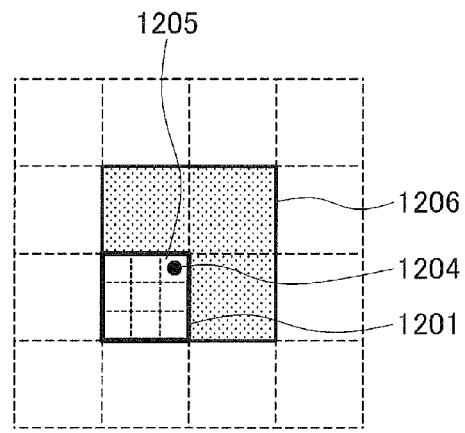
Figure 31C:
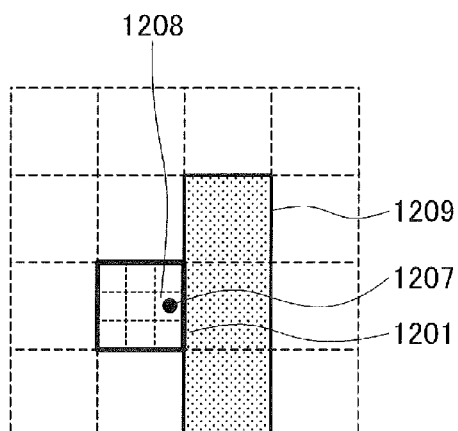
Figure 31D:
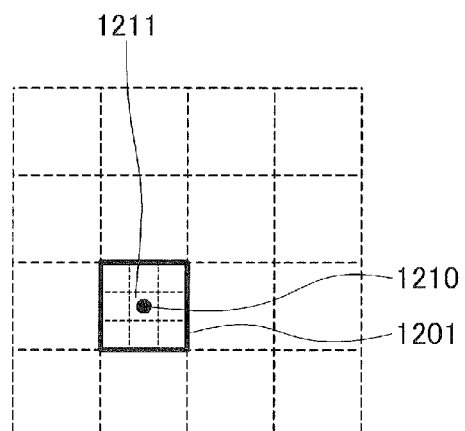

In another aspect, the broadcast area map storage unit 428 determines the peripheral region in accordance with the positional relationship between the region for which the request is made and the current position. For example, the broadcast area map storage unit 428 extracts the peripheral region from a region near the region for which the request is made, changing the extracted range in accordance with the positional relationship between the region for which the request is made and the current position. For example, the broadcast area map storage unit 428 determines, as the peripheral region, a part corresponding to the location of the current position in the region for which the request is made (e.g., a part close to the current position), out of a region adjacent or close to the region for which the request is made. For example, the broadcast area map storage unit 428 determines, as the peripheral region, out of a region adjacent or close to the region for which the request is made, a part located in a direction from the centroid of the region for which the request is made toward the current position. As illustrated in FIGS. 31(a) to 31(d), one example divides the current region 1201 into multiple parts and determines which of the multiple parts the current position exists in, changing the area determined as the peripheral region in accordance with the part in which the current position exists. In the example of FIGS. 31(a) to 31(d), the current region 1201 is divided into three in each of the upper-lower direction and left-right direction, thereby being divided into nine parts. As illustrated in FIG. 31(a), if the current position 1200 exists in the upper center part 1202 of the current region 1201, a region 1203 located on the upper side of the current region 1201 is determined as the peripheral region. Similarly, if the current position exists in the lower center part of the current region 1201, a region located on the lower side of the current region 1201 is determined as the peripheral region. As illustrated in FIG. 31(b), if the current position 1204 exists in the upper right end part 1205 of the current region 1201, a region 1206 located on the upper right side of the current region 1201 is determined as the peripheral region. Similarly, if the current position exists in the lower right end part of the current region 1201, a region located on the lower right side of the current region 1201 is determined as the peripheral region; if the current position exists in the upper left end part of the current region 1201, a region located on the upper left side of the current region 1201 is determined as the peripheral region; if the current position exists in the lower left end part of the current region 1201, a region located on the lower left side of the current region 1201 is determined as the peripheral region. As illustrated in FIG. 31(c), if the current position 1207 exists in the center right end part 1208 of the current region 1201, a region 1209 located on the right side of the current region 1201 is determined as the peripheral region. Similarly, if the current position exists in the center left end part of the current region 1201, a region located on the left side of the current region 1201 is determined as the peripheral region. As illustrated in FIG. 31(d), if the current position 1210 exists in the center part 1211 of the current region 1201, it is determined that there is no peripheral region. At this time, for example, the broadcast area map storage unit 428 determines, from among unit regions (e.g., eight unit regions adjacent to the current region 1201) existing within a predetermined range near the current region 1201, one or more unit regions satisfying the following conditions (d1) to (d8), and determines a region consisting of the determined unit regions as the peripheral region. The following conditions (d1) to (d8) use an angle formed by a half line extending from the centroid position of the current region 1201 in the upper direction and a line segment connecting the centroid position of the current region 1201 and the centroid position of the unit region. The formed angle is positive when measured clockwise from the half line.

(d1) In a case where the current position exists in the upper center part of the current region, the formed angle is not less than −45 degrees and not more than +45 degrees.

(d2) In a case where the current position exists in the upper right end part of the current region, the formed angle is not less than 0 degrees and not more than +90 degrees.

(d3) In a case where the current position exists in the center right end part of the current region, the formed angle is not less than +45 degrees and not more than +135 degrees.

(d4) In a case where the current position exists in the lower right end part of the current region, the formed angle is not less than +90 degrees and not more than +180 degrees.

(d5) In a case where the current position exists in the lower center part of the current region, the formed angle is not less than +135 degrees and not more than +225 degrees.

(d6) In a case where the current position exists in the lower left end part of the current region, the formed angle is not less than +180 degrees and not more than +270 degrees.

(d7) In a case where the current position exists in the center left end part of the current region, the formed angle is not less than +225 degrees and not more than +315 degrees.

(d8) In a case where the current position exists in the upper left end part of the current region, the formed angle is not less than +270 degrees and not more than +360 degrees.

However, another point, such as a vertex on the boundary, other than the centroid position may be used as a reference, and conditions, such as the following conditions (e1) to (e5), other than the above-described conditions may be used.

(e1) The boundary of the unit region abuts the part in which the current position exists.

(e2) A part of the unit region is within a predetermined distance from the boundary of the part in which the current position exists.

(e3) The whole of the unit region is within a predetermined distance from the boundary of the part in which the current position exists.

(e4) A part of the unit region is within a predetermined distance from a particular position (e.g., centroid position) of the part in which the current position exists.

(e5) The whole of the unit region is within a predetermined distance from a particular position (e.g., centroid position) of the part in which the current position exists.

Figure 32:
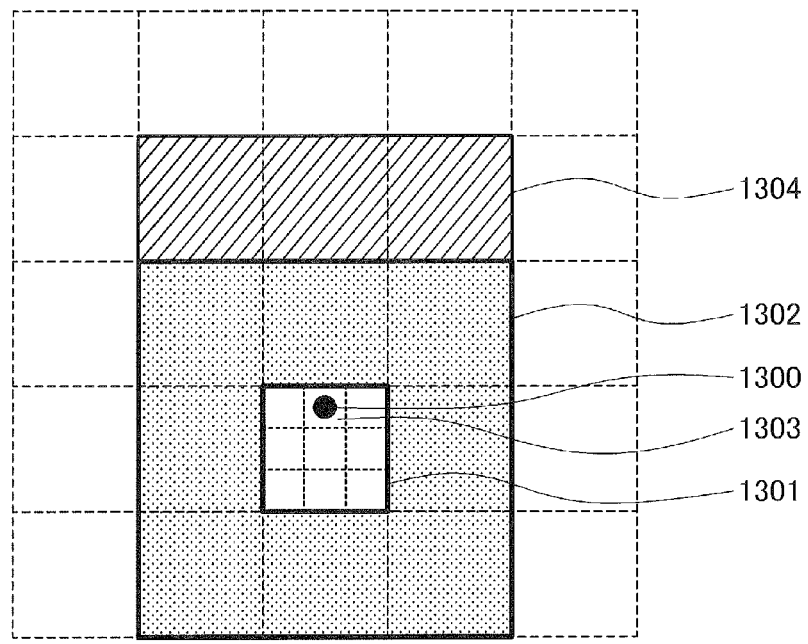
FIG. 32 is a diagram illustrating another example of a peripheral region of a specified current region, in the fourth embodiment.

In another aspect, the broadcast area map storage unit 428 determines, as the peripheral region, an adjacent region adjacent to the region for which the request is made and a region that is adjacent to the outer side of the adjacent region and corresponds to the location of the current position in the region for which the request is made. For example, as illustrated in FIG. 32, with respect to the current region 1301 including the current position 1300, the broadcast area map storage unit 428 determines, as the peripheral region, a region 1302 adjacent to the current region 1301 as in the case of FIG. 30, and determines, as the peripheral region, a region 1304 corresponding to the location of the current position 1300 in the current region 1301 as in the case of FIG. 31. In the example of FIG. 32, since the current position 1300 is located in the upper center part 1303 in the current region 1301, a region 1304 on the upper side of the current region 1301 is determined as the peripheral region. If the current position 1300 is located in a part other than the upper center part 1303 of the current region 1301, a region at a location corresponding to the part is determined as the peripheral region.

Figure 33:
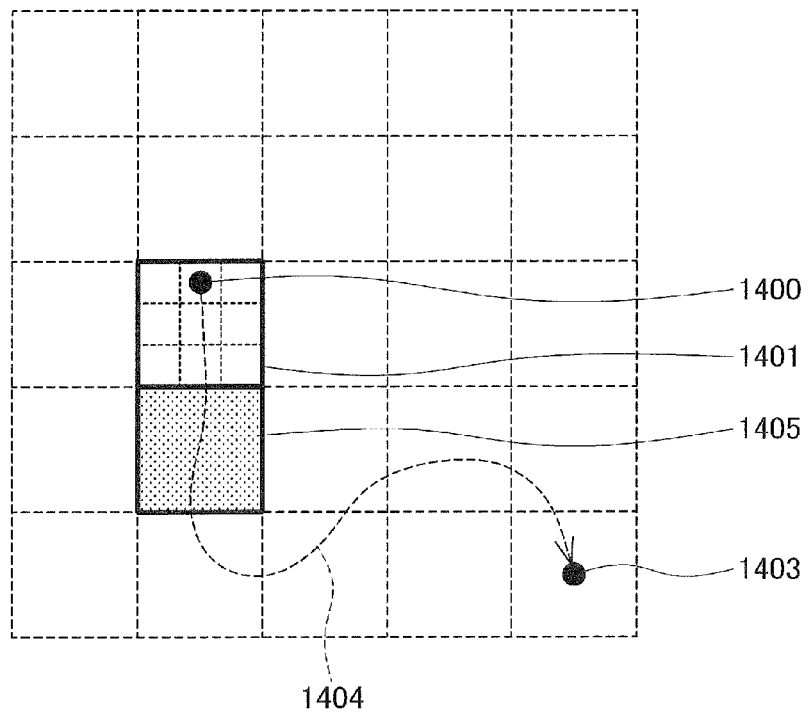
FIG. 33 is a diagram illustrating another example of a peripheral region of a specified current region, in the fourth embodiment.

In yet another aspect, the broadcast area map storage unit 428 predicts a region to which the digital broadcast receiver 400 or a mobile body therewith is likely to move next, and determines the predicted region as the peripheral region. Specifically, the broadcast area map storage unit 428 performs a next destination region prediction process to predict a destination region next to the current region on the basis of the destination or movement history of the mobile body with the digital broadcast receiver 400, thereby predicting a region to which the mobile body is likely to move next from among regions adjacent to the current region and determining the region as the peripheral region. For example, as illustrated in FIG. 33, on the basis of information on the current position 1400, current region 1401, and destination 1403, the broadcast area map storage unit 428 calculates a route 1404 from the current position 1400 to the destination 1403, and determines, as the peripheral region, a unit region 1405 adjacent to the current region 1401 from among unit regions including the route 1404.

The broadcast area map storage unit 428 may determine the peripheral region in accordance with the rate at which the current position changes or the movement speed of the digital broadcast receiver 400. For example, the broadcast area map storage unit 428 extracts the peripheral region from a region near the current region, increasing or decreasing the extracted range in accordance with the rate at which the current position changes.

Figures 34, 35:
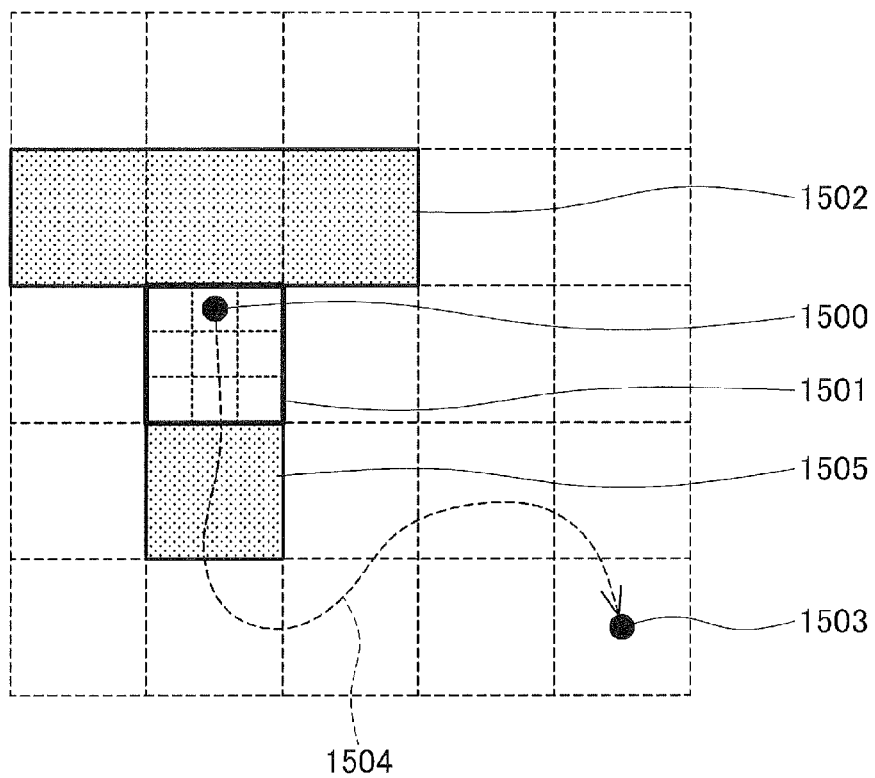
FIG. 34 is a diagram illustrating another example of a peripheral region of a specified current region, in the fourth embodiment.
FIG. 35 is a diagram illustrating an example of peripheral region information in the fourth embodiment.

The above-described various determination methods may be combined appropriately. For example, it is also possible to perform the determination of the peripheral region illustrated in FIG. 30 if the movement speed of the mobile body is low, and perform the determination of the peripheral region illustrated in FIG. 31 if the movement speed is high. It is also possible to perform the determination of the peripheral region illustrated in FIG. 30 if the movement speed of the mobile body is low, and perform the determination of the peripheral region illustrated in FIG. 32 if the movement speed is high. It is also possible to combine the determination method illustrated in FIGS. 31(*a*) to 31(*d*) and the determination method illustrated in FIG. 33. For example, as illustrated in FIG. 34, it is possible to determine a region 1502 as the peripheral region from the positional relationship between the current position 1500 and the current region 1501 as in FIG. 31(*a*), and then, from the current position 1500, current region 1501, and destination 1503, calculate a route 1504 to predict a region 1505 to which it is likely to move next as in FIG. 33, adding the region 1505 to the peripheral region.

The method of determining the peripheral region is not limited to the above-described methods, and other methods may be used. Further, the broadcast area map storage unit 428 may perform the above-described determination process at the time of determination of the peripheral region, or may determine the peripheral region using a result of a previously performed determination process. For example, the broadcast area map storage unit 428 may previously store peripheral region information generated by performing the above-described determination process in advance, and determine the peripheral region by referring to the peripheral region information. FIG. 35 illustrates an example of the peripheral region information. In this peripheral region information, the region ID of the current region and the region IDs of regions included in the peripheral region corresponding to the current region are associated with each other. The peripheral region information may be stored in the storage area 901 or work area 902 in the broadcast area map storage unit 428, or may be stored in other storage areas.

As above, in the fourth embodiment, the digital broadcast receiver includes a storage area that stores the receivable area information and a work area that stores part of the receivable area information stored in the storage area, and stores, in the work area, receivable area information corresponding to a region for which a request from the channel selection controller 117 or broadcast area map generator 127 is made and its peripheral region. Thus, when the digital broadcast receiver has moved to the peripheral region, since the receivable area information corresponding to the region to which the digital broadcast receiver has moved is already stored in the work area, the receivable area information can be obtained or referred to quickly. For example, the third embodiment requires, when the digital broadcast receiver has moved to an adjacent region, a process to apply the content of the work area to the storage area and then copy from the storage area to the work area the receivable area information corresponding to the region to which the digital broadcast receiver has moved. However, in the fourth embodiment, when the digital broadcast receiver has moved to an adjacent region, since the receivable area information corresponding to the region to which the digital broadcast receiver has moved is already stored in the work area, it is possible to quickly refer to the receivable area information corresponding to the region to which the digital broadcast receiver has moved and perform processing more quickly.

In the fourth embodiment, since the peripheral region is determined on the basis of the positional relationship between the region for which the request is made and the current position, the rate at which the current position changes, or a result of prediction of a region to which the digital broadcast receiver is likely to move next, it is possible to store, in the work area, receivable area information for an appropriate region corresponding to them. This can reduce the size of the work area. For example, since the fourth embodiment stores, in the work area, not only the receivable area information for a region for which a request from the channel selection controller 117 or broadcast area map generator 127 is made but also the receivable area information for its peripheral region, the size of the work area required in the fourth embodiment is larger than the size of the work area required in the third embodiment. However, by using the positional relationship between the region for which the request is made and the current position, the rate at which the current position changes, or a result of prediction of a region to which the digital broadcast receiver is likely to move next, it is possible to store, in the work area, only receivable area information for a region to which the digital broadcast receiver is likely to move next and prevent receivable area information for a region to which the digital broadcast receiver is unlikely to move from the current position from being stored in the work area, thereby reducing the size of the work area. The third and fourth embodiments can be selected according to the purpose. For example, if it is desired to reduce the work area more, the third embodiment may be selected; if it is desired to make the processing speed faster, the fourth embodiment may be selected.

In the first to fourth embodiments, the functions of the digital broadcast receiver may be implemented purely by hardware resources such as electronic circuits, or may be implemented by cooperation between hardware resources and software. When implemented by cooperation between hardware resources and software, the functions of the digital broadcast receiver are implemented by, for example, execution of a computer program by a computer. More specifically, a computer program recorded on a recording medium such as a read only memory (ROM) is read into a main memory and executed by a central processing unit (CPU), thereby implementing the functions of the digital broadcast receiver, such as the function of updating the receivable area information. The computer program may be provided by being recorded on a computer-readable recording medium such as an optical disc, or may be provided through a communication line such as the Internet.

The present invention is not limited to the embodiments described above; it can be practiced in various aspects without departing from the invention scope.

APPENDIXES (Appendix 1)
A digital broadcast receiver comprising:
a receiver that receives a broadcast signal of a physical channel in digital broadcasting;
a current position detector that detects a current position;
a current region determiner that determines, as a current region, a region to which the current position detected by the current position detector belongs;
a receivability determiner that controls the receiver to determine whether the broadcast signal of the physical channel can be received;
an area information storage unit that stores receivable area information indicating a receivable area where the broadcast signal of the physical channel can be received; and
an area information updating unit that, when the receivability determiner determines that the broadcast signal of the physical channel can be received, obtains, out of the receivable area information stored in the area information storage unit, receivable area information for the current region indicating a receivable area in the current region determined by the current region determiner, and performs an update process to update the receivable area information for the current region on a basis of the current position detected by the current position detector.

( Appendix 2)
The digital broadcast receiver of Appendix 1, wherein the area information storage unit stores the receivable area information separately for each region that can be determined by the current region determiner, and
wherein the area information updating unit obtains, as the receivable area information for the current region, out of the receivable area information for each region, receivable area information corresponding to the current region.

(Appendix 3)
The digital broadcast receiver of Appendix 1 or 2, wherein in performing the update process, if the current position is outside the receivable area indicated by the receivable area information for the current region, the area information updating unit performs a process to extend the receivable area to the current position.

(Appendix 4)
The digital broadcast receiver of any one of Appendixes 1 to 3, wherein the receivable area information for the current region is information that includes three or more position information items each indicating a position where the broadcast signal of the physical channel can be received and indicates, as the receivable area, an area bounded by the three or more positions indicated by the position information items, and wherein in performing the update process, if the current position is outside the receivable area indicated by the receivable area information for the current region, the area information updating unit selects, as connecting positions, two positions from among the three or more positions indicated by the position information items included in the receivable area information for the current region, adds a position information item indicating the current position to the receivable area information for the current region, and performs a process to extend the receivable area indicated by the receivable area information for the current region to include an area bounded by the two connecting positions and the current position.

(Appendix 5)

The digital broadcast receiver of any one of Appendixes 1 to 4, wherein the area information storage unit stores unconnection information including at least one unconnected position information item indicating a position where the broadcast signal of the physical channel can be received outside the receivable area indicated by the receivable area information, and wherein when the receivability determiner determines that the broadcast signal of the physical channel can be received, the area information updating unit obtains, out of the unconnection information stored in the area information storage unit, unconnection information for the current region including at least one unconnected position information item for the determined current region, and performs the update process on a basis of the unconnection information for the current region.

(Appendix 6)

The digital broadcast receiver of Appendix 5, wherein the area information storage unit stores the unconnection information separately for each region that can be determined by the current region determiner, and wherein the area information updating unit obtains, as the unconnection information for the current region, out of the unconnection information for each region, unconnection information corresponding to the current region.

(Appendix 7)

The digital broadcast receiver of Appendix 5 or 6, wherein in performing the update process, if the current position is outside the receivable area indicated by the receivable area information for the current region, the area information updating unit:

determines, on a basis of a positional relationship between the receivable area and the current position, whether the current position can be connected to the receivable area;

if it is determined that the current position can be connected, performs a process to extend the receivable area to the current position; and if it is determined that the current position cannot be connected, adds a position information item indicating the current position to the unconnection information as an unconnected position information item.

(Appendix 8)

The digital broadcast receiver of any one of Appendixes 5 to 7, wherein the receivable area information for the current region is information that includes three or more position information items each indicating a position where the broadcast signal of the physical channel can be received and indicates, as the receivable area, an area bounded by the three or more positions indicated by the position information items, and wherein in performing the update process, if the current position is outside the receivable area indicated by the receivable area information for the current region, the area information updating unit:

performs a process to find, as connecting positions, two positions from among the three or more positions indicated by the position information items included in the receivable area information for the current region;

if the two connecting positions are successfully found, adds a position information item indicating the current position to the receivable area information for the current region and performs a process to extend the receivable area indicated by the receivable area information for the current region to include an area bounded by the two connecting positions and the current position; and if the two connecting positions are not found, adds a position information item indicating the current position to the unconnection information as an unconnected position information item.

(Appendix 9)

The digital broadcast receiver of any one of Appendixes 5 to 8, wherein the receivable area information for the current region is information that includes three or more position information items each indicating a position where the broadcast signal of the physical channel can be received and indicates, as the receivable area, an area bounded by the three or more positions indicated by the position information items, and wherein in performing the update process, if the current position is outside the receivable area indicated by the receivable area information for the current region, the area information updating unit:

finds, as connecting positions, a plurality of positions from among the at least one position indicated by the at least one unconnected position information item included in the unconnection information for the current region;

adds position information items indicating the found connecting positions and the current position to the receivable area information for the current region; and performs a process to extend the receivable area indicated by the receivable area information for the current region to include an area bounded by the connecting positions and the current position.

(Appendix 10)

The digital broadcast receiver of any one of Appendixes 5 to 9, wherein the receivable area information for the current region is information that includes three or more position information items each indicating a position where the broadcast signal of the physical channel can be received and indicates, as the receivable area, an area bounded by the three or more positions indicated by the position information items, and wherein in performing the update process, if the current position is outside the receivable area indicated by the receivable area information for the current region, the area information updating unit:

finds, as connecting positions, two positions from among the positions indicated by the position information items included in the receivable area information for the current region and the at least one position indicated by the at least one unconnected position information item included in the unconnection information for the current region;

adds, to the receivable area information for the current region, a position information item indicating the current position and at least one position information item indicating at least one connecting position found from the unconnection information out of the found two connecting positions; and performs a process to extend the receivable area indicated by the receivable area information for the current region to include an area bounded by the two connecting positions and the current position.

(Appendix 11)

The digital broadcast receiver of any one of Appendixes 5 to 10, wherein when the receivability determiner determines that the broadcast signal of the physical channel can be received, if there is no receivable area information for the current region, the area information updating unit adds a position information item indicating the current position to the unconnection information as an unconnected position information item.

(Appendix 12)

The digital broadcast receiver of any one of Appendixes 5 to 11, wherein when the receivability determiner determines that the broadcast signal of the physical channel can be received, if there is no receivable area information for the current region, the area information updating unit:

obtains the unconnection information for the current region;

generates receivable area information for the current region on a basis of the unconnection information for the current region and the current position; and stores the generated receivable area information for the current region in the area information storage unit.

(Appendix 13)

The digital broadcast receiver of any one of Appendixes 1 to 12, wherein:

the receiver receives broadcast signals of a plurality of the physical channels in the digital broadcasting;

the receivability determiner determines, for each physical channel, whether the broadcast signal can be received;

the area information storage unit stores, for each physical channel, the receivable area information; and the area information updating unit performs, for each physical channel, the update process of the receivable area information.

(Appendix 14)

The digital broadcast receiver of any one of Appendixes 5 to 12, wherein:

the receiver receives broadcast signals of a plurality of the physical channels in the digital broadcasting;

the receivability determiner determines, for each physical channel, whether the broadcast signal can be received;

the area information storage unit stores, for each physical channel, the receivable area information and the unconnection information; and the area information updating unit performs, for each physical channel, the update process of the receivable area information and the update of the unconnection information.

(Appendix 15)

The digital broadcast receiver of Appendix 13 or 14, wherein the receivability determiner controls the receiver to perform a channel scan to detect, from among the plurality of the physical channels, a physical channel whose broadcast signal can be received, and wherein when a physical channel whose broadcast signal can be received is detected in the channel scan, the area information updating unit performs, for the detected physical channel, the update process or the update of the unconnection information.

(Appendix 16)

The digital broadcast receiver of any one of Appendixes 13 to 15, further comprising a channel selection controller that controls the receiver to select a physical channel to be viewed, wherein when a reception state of the broadcast signal of the physical channel selected as the physical channel to be viewed is deteriorated, the channel selection controller:

obtains, out of the receivable area information for each physical channel stored in the area information storage unit, receivable area information for each physical channel for the current region determined by the current region determiner;

determines an alternative physical channel receivable at the current position detected by the current position detector on a basis of the receivable area information for each physical channel for the current region; and selects the determined alternative physical channel as the physical channel to be viewed.

(Appendix 17)

The digital broadcast receiver of Appendix 16, wherein the area information storage unit stores the receivable area information for each physical channel, separately for each region that can be determined by the current region determiner, and wherein the channel selection controller obtains, as the receivable area information for each physical channel for the current region, out of the receivable area information for each physical channel stored for each region, receivable area information for each physical channel corresponding to the current region.

(Appendix 18)

The digital broadcast receiver of Appendix 16 or 17, wherein the channel selection controller determines, as the alternative physical channel, on a basis of the receivable area information for each physical channel for the current region, a physical channel receivable at the current position, from among at least one physical channel of a relay station or an affiliated station of a currently viewed broadcast station using the physical channel whose reception state is deteriorated.

(Appendix 19)

The digital broadcast receiver of any one of Appendixes 16 to 18, wherein the area information storage unit further stores, for each physical channel, at least one of relay station information indicating a physical channel of a relay station of a broadcast station using the physical channel and affiliated station information indicating a physical channel of an affiliated station of the broadcast station using the physical channel, and wherein the channel selection controller:

determines at least one physical channel of at least one of a relay station and an affiliated station of a currently viewed broadcast station using the physical channel whose reception state is deteriorated, with reference to at least one of the relay station information and the affiliated station information;

selects, from among the determined at least one physical channel, on a basis of the receivable area information for each physical channel for the current region, a physical channel whose receivable area includes the current position;

determines whether the broadcast signal of the selected physical channel can be received by the receiver; and if it is determined that the physical channel can be received, determines the physical channel as the alternative physical channel.

(Appendix 20)

The digital broadcast receiver of any one of Appendixes 16 to 19, wherein when the channel selection controller determines that the broadcast signal of the physical channel selected as the physical channel to be viewed can be received, the area information updating unit performs, for the physical channel selected as the physical channel to be viewed, the update process or the update of the unconnection information.

(Appendix 21)

The digital broadcast receiver of any one of Appendixes 16 to 20, wherein:

the current region determiner performs a first region determination process to determine a first region to which the current position belongs and a second region determination process to determine a second region to which the current position belongs;

the area information updating unit uses, as the current region, the first region determined by the current region determiner; and the channel selection controller uses, as the current region, the second region determined by the current region determiner.

(Appendix 22)

The digital broadcast receiver of any one of Appendixes 1 to 21, wherein the area information storage unit:

includes a first storage area that stores the receivable area information, a second storage area that stores receivable area information corresponding to a partial region out of the receivable area information stored in the first storage area, and a region information storage area that stores region information indicating the region corresponding to the receivable area information stored in the second storage area;

when receiving a request for receivable area information corresponding to the same region as the region indicated by the region information stored in the region information storage area, provides a source of the request with the receivable area information stored in the second storage area;

when receiving a request for receivable area information corresponding to a region different from the region indicated by the region information stored in the region information storage area, applies the receivable area information stored in the second storage area to the receivable area information stored in the first storage area, and then writes into the second storage area and provides to a source of the request the receivable area information that is stored in the first storage area and corresponds to the region for which the request is made;

when receiving a request to update receivable area information corresponding to the same region as the region indicated by the region information stored in the region information storage area, writes updated receivable area information corresponding to the region for which the request is made, into the second storage area; and when receiving a request to update receivable area information corresponding to a region different from the region indicated by the region information stored in the region information storage area, applies the receivable area information stored in the second storage area to the receivable area information stored in the first storage area, and then writes updated receivable area information corresponding to the region for which the request is made, into the second storage area.

(Appendix 23)

The digital broadcast receiver of Appendix 22, wherein:

the first storage area stores the receivable area information in a first data format;

the second storage area stores the receivable area information in a second data format different from the first data format; and the area information storage unit:

when writing the receivable area information stored in the first storage area into the second storage area, performs a first conversion process to convert information in the first data format into information in the second data format; and when applying the receivable area information stored in the second storage area to the first storage area, performs a second conversion process to convert information in the second data format into information in the first data format.

(Appendix 24)

The digital broadcast receiver of Appendix 23, wherein:

the receivable area information in the first data format is information including at least one parameter indicating a rectangle as a receivable area;

the receivable area information in the second data format is information including position information items indicating positions bounding a receivable area; and the area information storage unit:

in the second conversion process, determines at least one parameter indicating a rectangle circumscribing the receivable area indicated by the position information items, thereby converting the position information items into the at least one parameter indicating the rectangle; and in the first conversion process, determines position information items indicating vertex positions of the rectangle indicated by the at least one parameter of the rectangle, thereby converting the at least one parameter of the rectangle into the position information items.

(Appendix 25)

The digital broadcast receiver of Appendix 23, wherein the area information storage unit:

in the second conversion process, performs a process to compress information; and in the first conversion process, performs a process to decompress the compressed information.

(Appendix 26)

The digital broadcast receiver of any one of Appendixes 1 to 25, wherein the area information storage unit:

stores the receivable area information separately for each region that can be determined by the current region determiner; and for the receivable area information for each region, further stores a last update time or a last reference time and deletes the receivable area information when a difference between the last update time or the last reference time and a current time exceeds a predetermined threshold value.

(Appendix 27)

An information updating method for a digital broadcast receiver including a receiver that receives a broadcast signal of a physical channel in digital broadcasting, the information updating method comprising:

a current position detection step for detecting a current position;

a current region determination step for determining, as a current region, a region to which the current position detected in the current position detection step belongs;

a receivability determination step for controlling the receiver to determine whether the broadcast signal of the physical channel can be received;

an area information updating step for, when the receivability determination step determines that the broadcast signal of the physical channel can be received, obtaining, out of receivable area information that is stored in an area information storage unit and indicates a receivable area where the broadcast signal of the physical channel can be received, receivable area information for the current region indicating a receivable area in the current region determined in the current region determination step, and performing an update process to update the receivable area information for the current region on a basis of the current position detected in the current position detection step.

DESCRIPTION OF REFERENCE CHARACTERS 100, 200, 300, 400 digital broadcast receiver, 111 first receiver, 117 channel selection controller, 121 second receiver, 123 channel scan controller, 125 current position detector, 126, 226 current region determiner, 127 broadcast area map generator, 128, 228, 328, 428 broadcast area map storage unit.

What is claimed is:

1. A digital broadcast receiver comprising:
a receiver that receives a broadcast signal of a physical channel in digital broadcasting;
a current position detector that detects a current position;
a current region determiner that determines, as a current region, a region to which the current position detected by the current position detector belongs and which is specified by at least one parameter indicating a position and a shape of the region;
a receivability determiner that controls the receiver to determine whether the broadcast signal of the physical channel can be received;
an area information storage unit that stores receivable area information indicating a receivable area where the broadcast signal of the physical channel can be received; and
an area information updating unit that, when the receivability determiner determines that the broadcast signal of the physical channel can be received, obtains, out of the receivable area information stored in the area information storage unit, receivable area information for the current region indicating a receivable area in the current region determined by the current region determiner, and performs an update process to update the receivable area information for the current region on a basis of the current position detected by the current position detector,
wherein the area information storage unit includes:
a first storage area that stores the receivable area information;
a second storage area that stores receivable area information corresponding to a partial region out of the receivable area information stored in the first storage area; and
a region information storage area that stores region information indicating the region corresponding to the receivable area information stored in the second storage area, and
wherein the area information storage unit:
when receiving a request for receivable area information corresponding to a region included in the region indicated by the region information stored in the region information storage area, provides a source of the request with the receivable area information that is stored in the second storage area and corresponds to the region for which the request is made;
when receiving a request to update receivable area information corresponding to a region included in the region indicated by the region information stored in the region information storage area, stores, in the second storage area, updated receivable area information corresponding to the region for which the request is made; and
when receiving a request for receivable area information corresponding to a region outside the region indicated by the region information stored in the region information storage area, applies the receivable area information stored in the second storage area to the receivable area information stored in the first storage area, and then stores in the second storage area and provides to a source of the request the receivable area information that is stored in the first storage area and corresponds to the region for which the request is made.

2. The digital broadcast receiver of claim 1, wherein:
the second storage area stores receivable area information corresponding to a region for which a request for the receivable area information is made, and receivable area information corresponding to a peripheral region of the region for which the request is made;
the region information storage area stores, as the region information, request region information indicating the region for which the request is made and peripheral region information indicating the peripheral region; and
when receiving a request for receivable area information corresponding to a region included in the region indicated by the peripheral region information stored in the region information storage area, the area information storage unit provides a source of the request with the receivable area information that is stored in the second storage area and corresponds to the region for which the current request is made, applies the receivable area information stored in the second storage area to the receivable area information stored in the first storage area, and stores, in the second storage area, receivable area information that is stored in the first storage area and corresponds to a peripheral region of the region for which the current request is made.

3. The digital broadcast receiver of claim 2, wherein when receiving the request for the receivable area information corresponding to the region included in the region indicated by the peripheral region information stored in the region information storage area, in applying the receivable area information stored in the second storage area to the receivable area information stored in the first storage area, the area information storage unit applies only receivable area information corresponding to a region within the region indicated by the request region information and the peripheral region information stored in the region information storage area but outside both the region for which the current request is made and its peripheral region.

4. The digital broadcast receiver of claim 2, wherein when receiving the request for the receivable area information corresponding to the region included in the region indicated by the peripheral region information stored in the region information storage area, in storing, in the second storage area, the receivable area information that is stored in the first storage area and corresponds to the peripheral region of the region for which the current request is made, the area information storage unit:

deletes, from the second storage area, only receivable area information corresponding to a region within the region indicated by the request region information and the peripheral region information stored in the region information storage area but outside both the region for which the current request is made and its peripheral region; and writes, into the second storage area, only receivable area information corresponding to a region within the peripheral region of the region for which the current request is made but outside the region indicated by the request region information and the peripheral region information stored in the region information storage area.

5. The digital broadcast receiver of claim 2, in storing, in the second storage area, the receivable area information that is stored in the first storage area and corresponds to the peripheral region of the region for which the current request is made, the area information storage unit determines the peripheral region in accordance with a positional relationship between the region for which the current request is made and the current position.

6. The digital broadcast receiver of claim 2, in storing, in the second storage area, the receivable area information that is stored in the first storage area and corresponds to the peripheral region of the region for which the current request is made, the area information storage unit determines the peripheral region in accordance with a rate at which the current position changes.

7. The digital broadcast receiver of claim 2, in storing, in the second storage area, the receivable area information that is stored in the first storage area and corresponds to the peripheral region of the region for which the current request is made, the area information storage unit predicts a region to which the digital broadcast receiver is likely to move next, and determines the predicted region as the peripheral region.

8. The digital broadcast receiver of claim 1, wherein:
the first storage area stores the receivable area information in a first data format;
the second storage area stores the receivable area information in a second data format different from the first data format; and
the area information storage unit:
when writing the receivable area information stored in the first storage area into the second storage area, performs a first conversion process to convert information in the first data format into information in the second data format; and
when applying the receivable area information stored in the second storage area to the first storage area, performs a second conversion process to convert information in the second data format into information in the first data format.

9. The digital broadcast receiver of claim 8, wherein:
the receivable area information in the first data format is information including at least one parameter indicating a rectangle as a receivable area;
the receivable area information in the second data format is information including position information items indicating positions bounding a receivable area; and
the area information storage unit:
in the second conversion process, determines at least one parameter indicating a rectangle circumscribing the receivable area indicated by the position information items, thereby converting the position information items into the at least one parameter indicating the rectangle; and in the first conversion process, determines position information items indicating vertex positions of the rectangle indicated by the at least one parameter of the rectangle, thereby converting the at least one parameter of the rectangle into the position information items.

10. The digital broadcast receiver of claim 8, wherein the area information storage unit:
in the second conversion process, performs a process to compress information; and
in the first conversion process, performs a process to decompress the compressed information.

11. The digital broadcast receiver of claim 1, wherein the area information storage unit:
stores the receivable area information separately for each region that can be determined by the current region determiner; and
for the receivable area information for each region, stores at least one of a time when the receivable area information was last updated and a time when the receivable area information was last provided, and deletes the receivable area information when a difference between the at least one time and a current time exceeds a predetermined threshold value.

12. The digital broadcast receiver of claim 1, wherein:
the receiver receives broadcast signals of a plurality of the physical channels in the digital broadcasting;
the receivability determiner determines, for each physical channel, whether the broadcast signal can be received;
the area information storage unit stores, for each physical channel, the receivable area information;
the area information updating unit performs, for each physical channel, the update process of the receivable area information;
the digital broadcast receiver further comprises a channel selection controller that controls the receiver to select a physical channel to be viewed from among the plurality of the physical channels;
when the channel selection controller determines that the broadcast signal of the physical channel to be viewed can be received, the current region determiner determines, as the current region, an update current region on a basis of the current position detected by the current position detector, and the area information updating unit performs an update process to update receivable area information for the physical channel to be viewed corresponding to the update current region determined by the current region determiner, on a basis of the current position detected by the current position detector; and
when the channel selection controller determines that the broadcast signal of the physical channel to be viewed cannot be received, the current region determiner determines, as the current region, a reference current region on a basis of the current position detected by the current position detector, and the channel selection controller determines an alternative physical channel receivable at the current position detected by the current position detector, on a basis of receivable area information for each physical channel that is stored in the area information storage unit and corresponds to the reference current region determined by the current region determiner and selects the determined alternative physical channel.

13. An information updating method for a digital broadcast receiver including a receiver that receives a broadcast signal of a physical channel in digital broadcasting, the information updating method comprising:

detecting a current position;

determining, as a current region, a region to which the detected current position belongs and which is specified by at least one parameter indicating a position and a shape of the region;

controlling the receiver to determine whether the broadcast signal of the physical channel can be received; and when it is determined that the broadcast signal of the physical channel can be received, obtaining, out of receivable area information that is stored in an area information storage unit and indicates a receivable area where the broadcast signal of the physical channel can be received, receivable area information for the current region indicating a receivable area in the determined current region, and performing an update process to update the receivable area information for the current region on a basis of the detected current position, wherein the area information storage unit includes:

a first storage area that stores the receivable area information;

a second storage area that stores receivable area information corresponding to a partial region out of the receivable area information stored in the first storage area; and a region information storage area that stores region information indicating the region corresponding to the receivable area information stored in the second storage area, and wherein the area information storage unit:

when receiving a request for receivable area information corresponding to a region included in the region indicated by the region information stored in the region information storage area, provides a source of the request with the receivable area information that is stored in the second storage area and corresponds to the region for which the request is made;

when receiving a request to update receivable area information corresponding to a region included in the region indicated by the region information stored in the region information storage area, stores, in the second storage area, updated receivable area information corresponding to the region for which the request is made; and when receiving a request for receivable area information corresponding to a region outside the region indicated by the region information stored in the region information storage area, applies the receivable area information stored in the second storage area to the receivable area information stored in the first storage area, and then stores in the second storage area and provides to a source of the request the receivable area information that is stored in the first storage area and corresponds to the region for which the request is made.

* * * * *